US008521359B1

(12) United States Patent
Trytten et al.

(10) Patent No.: US 8,521,359 B1
(45) Date of Patent: Aug. 27, 2013

(54) APPLICATION-INDEPENDENT AND COMPONENT-ISOLATED SYSTEM AND SYSTEM OF SYSTEMS FRAMEWORK

(75) Inventors: Chad D. Trytten, Vancouver (CA); Anthony J. V. Angerilli, Vancouver (CA); Kenneth J. Mackay, Vancouver (CA)

(73) Assignee: Spark Integration Technologies Inc., Vancouver, British Columbia (CA)

( * ) Notice: Subject to any disclaimer, the term of this patent is extended or adjusted under 35 U.S.C. 154(b) by 0 days.

(21) Appl. No.: 13/295,993

(22) Filed: Nov. 14, 2011

Related U.S. Application Data

(63) Continuation of application No. 12/135,125, filed on Jun. 6, 2008, now Pat. No. 8,078,357.

(60) Provisional application No. 60/942,395, filed on Jun. 6, 2007.

(51) Int. Cl.
*G06F 19/00* (2011.01)

(52) U.S. Cl.
USPC ............................. 701/36; 700/245; 700/248

(58) Field of Classification Search
USPC ...................... 701/36, 28; 709/202, 203, 201, 709/219, 221; 707/999.203, 999.1; 717/173, 717/178; 700/245, 257, 248, 95, 181, 2, 700/249, 250, 83, 255, 253; 713/100; 706/20, 706/14, 25, 26, 10, 50, 46, 59, 61
See application file for complete search history.

(56) References Cited

U.S. PATENT DOCUMENTS

| | | |
|---|---|---|
| 4,881,263 A | 11/1989 | Herbison et al. |
| 5,115,495 A | 5/1992 | Tsuchiya et al. |
| 5,291,479 A | 3/1994 | Vaziri et al. |
| 5,557,780 A | 9/1996 | Edwards et al. |
| 5,948,055 A | 9/1999 | Pulsipher |
| 6,167,450 A | 12/2000 | Angwin et al. |
| 6,434,628 B1 | 8/2002 | Bowman-Amuah |
| 6,558,201 B1 | 5/2003 | Begley et al. |
| 6,633,560 B1 | 10/2003 | Albert et al. |
| 6,636,895 B1 | 10/2003 | Li et al. |
| 6,754,699 B2 | 6/2004 | Swildens et al. |
| 6,760,648 B2 | 7/2004 | Sakamoto et al. |
| 6,769,032 B1 | 7/2004 | Katiyar et al. |
| 6,816,753 B2 | 11/2004 | Sakamoto et al. |
| 6,832,241 B2 | 12/2004 | Tracton et al. |
| 6,874,010 B1 | 3/2005 | Sargent |
| 6,889,118 B2 | 5/2005 | Murray, IV et al. |
| 7,076,336 B2 | 7/2006 | Murray, IV et al. |
| 7,080,372 B1 * | 7/2006 | Cole .............................. 717/173 |
| 7,103,680 B1 | 9/2006 | Holdsworth et al. |
| 7,302,312 B2 | 11/2007 | Murray, IV et al. |
| 7,346,370 B2 | 3/2008 | Spaur et al. |
| 7,363,204 B2 | 4/2008 | Colombo |
| 7,516,242 B2 | 4/2009 | Furukawa et al. |
| 7,725,412 B2 | 5/2010 | Aoyama et al. |
| 8,078,357 B1 | 12/2011 | Trytten et al. |

(Continued)

*Primary Examiner* — Marthe Marc-Coleman

(74) *Attorney, Agent, or Firm* — Knobbe, Martens, Olson & Bear, LLP

(57) ABSTRACT

Embodiments of an application-independent and component-isolated system and system of systems framework are provided. In some embodiments, a Distributed Integration Operating Schema ("DIOS") framework allows integration of disparate software and hardware components and permits addition, removal, modification, failure of, and information exchange among such components. In some embodiments, DIOS uses an information model that comprises a user-defined hierarchy of information objects to facilitate communication of information among agents of a control system.

20 Claims, 44 Drawing Sheets

(56) References Cited

U.S. PATENT DOCUMENTS

| | | |
|---|---|---|
| 2003/0132967 A1 | 7/2003 | Gangadharan |
| 2004/0073558 A1 | 4/2004 | Schrijvers et al. |
| 2005/0245272 A1 | 11/2005 | Spaur et al. |
| 2006/0123174 A1 | 6/2006 | Nguyen et al. |
| 2007/0101173 A1* | 5/2007 | Fung ............................. 713/300 |
| 2007/0208442 A1* | 9/2007 | Perrone ........................... 700/95 |
| 2007/0233280 A1 | 10/2007 | Bacon et al. |

* cited by examiner

Interface Approach to Control Systems

Sample System-Information Model Abstractions Expanded

Combined Input Device Information as an InformationModel Layer

APPLICATION-INDEPENDENT AND COMPONENT-ISOLATED SYSTEM AND SYSTEM OF SYSTEMS FRAMEWORK

CROSS-REFERENCE TO RELATED APPLICATIONS

This application is a continuation of U.S. patent application Ser. No. 12/135,125, filed Jun. 6, 2008, entitled "APPLICATION-INDEPENDENT AND COMPONENT-ISOLATED SYSTEM AND SYSTEM OF SYSTEMS FRAMEWORK," now U.S. Pat. No. 8,078,357, which claims the benefit under 35 U.S.C. §119(e) of U.S. Provisional Patent Application No. 60/942,395, filed Jun. 6, 2007, entitled "APPLICATION-INDEPENDENT AND DEVICE-ISOLATED ROBOTIC CONTROL SYSTEMS;" the entire disclosure of each of the foregoing applications is hereby incorporated by reference herein and made part of this specification.

BACKGROUND

1. Field

This application relates generally to techniques for reducing the engineering time and effort required to integrate heterogeneous components into a final system and/or system of systems. Embodiments relate to a software framework, with hardware options, to enable integration of a disparate set of software and hardware components into a final system and/or system of systems that does not require the components to match a standard agreed upon before integration.

2. Description of Related Art

A robot is any system, having one or more processors (where a processor can be a hardware or software entity that performs calculations), that is able to perform a task, and includes zero or more devices, where a device can be a hardware actuator/sensor/system or software application/system producing and/or receiving one or more signals, attached to said processor(s). Note that embodiments of robots can be mobile (such as unmanned vehicles) or immobile (such as automated banking machines). A robotic control system is a system to control a robot and may, in some implementations, be embodied as a purely software solution running atop generic hardware or as a solution with both software and hardware components (machines). In some cases, a purely software solution is a subset of the functionality of a machine solution.

Machines are used in almost every facet of life, and as such, many control systems have been developed to control the behavior of these machines. Robotic control systems include the categories of informal systems that are used to control any piece of hardware and those formal control systems designed for the sole purpose of coordinating a set of hardware in a given task. In some implementations, the latter is primarily of interest. Typically, a specific robotic task, which may encapsulate both physical work and digital signal processing, is organized as a standard control problem whereby the behavior of a dynamic system has a desired output called the reference. When the behavior of a system needs to follow a certain reference over time, a controller utilizes, for example, inputs to the system, historic states, and trends to manipulate the outputs and obtain the desired effect of the system.

The simple approach to integrating components into a system is to build a system where the components work together directly. This 'stovepipe' approach in robotic control systems (see, e.g., FIG. 1) is to define a unique set of input devices with known attributes, capabilities, and means of communication with a unique set of output devices also having known attributes, capabilities, and means of communication, and to specify a control system that depends directly on the devices used in the application. In this approach, the flow of control follows the standard control systems formula: $f(I)=O$, where the output O of the system is the controller function $f$ applied to the input I given a goal G. In this approach, there is a complete dependence on the input and output devices' attributes, capabilities, and means of communication. This approach is still the most common method in use today due to the simplicity and ease of defining a system with these properties. By customizing a control system to the specific signal(s) received from input devices to match against a set of expected inputs, the system controller can send signal(s) to output devices to match against a set of expected outputs.

In many cases, the stovepipe approach will not satisfy higher-level control requirements of a robotic control system. Often, as more complex control constructs are required to fully describe the appropriate behavior of a system, a level of abstraction is added between each of the inputs, the controller, and the outputs. This 'interface' approach to robotic control systems (see, e.g., FIG. 2) builds on the stovepipe approach by abstracting away from the exact signals that are delivered by the inputs to the system controller and from the exact signals delivered by the controller to the outputs. This approach favors a generalized form of communication between each component. With a new level of abstraction, the controller can be given access to a variety of information that matches a particular interface form from both input and output devices, so that the controller need not know about the specific means of communication the devices employ. In this sort of approach, the flow of control follows a modified control systems formula: $f(g(I))=h(O)$, where the output O of the system is a transformation h of the controller function $f$ applied to the transformation g of input I given goal G. In this equation, g and h are abstraction layers that convert the exact input signal I and exact output signal O, respectively, to match the signal interface of the controller (which may be an exact signal or an interface signal of the controller). Note, however, that the interface approach still depends entirely on the inputs' and outputs' attributes, capabilities, and means of communication, in order to achieve the goals of the system, because the interface abstraction(s) require this knowledge in order to effect the translation.

Several groups have developed specifications for robotic control systems that address some of the limitations of the standard control-theory inspired approaches. The leading technologies rely on the same principles already discussed and have been created to be adaptable to existing standards in the combined domains of robotic control systems and software engineering, which is a subset of robotic control systems. These architectural frameworks facilitate component and interface standards development, including: command and control, communication, operating environments, safety, security, software architectures, user interface, data formats for transmission, and more.

Systems designed using the interface abstraction methodology explicitly define the g(x) and h(x) interfaces mentioned above, as well as a complete architecture for the controller $f(x)$ and often the internal interfaces of the controller, because complex controllers are comprised of many smaller components (which can lead to integration problems). In this methodology, a robotic control system designer is free to implement the specified control architecture in whatever manner is most appropriate when following the specifications of current systems, since specifications for the control architecture seldom define more than a set of modules and how they work together to solve a problem. Likewise, the current approach of agreeing a priori to specification details of how the device abstraction communication should be presented to the control architecture leaves the designer to determine the details of transforming the data presented by the input and output devices. Current robotic control system specifications may or may not specify exact devices required for a control system. Nevertheless, these specifications require that the type of input and output devices available to the system be determined before the design of the system. One reason for this is that data is passed from one component to another according to control systems theory in a well specified manner. The data format is defined by the interface abstractions which depend on the type of device(s) using the interface abstraction in order to determine what data can be exchanged via the interface, rather than for the type of information produced/required by the device.

Several robotic control system specifications have been developed and trialed in the lab and in real world applications with varying degrees of success. A specific type of robotic control system, known as a real-time high-availability system, has gained the greatest adoption rate across all industries. In order to build a real-time high-availability system which is highly-efficient and customized for a given application, state of the art specifications require all available resources be known a priori before the system is designed. Several existing systems attempt to define cross-platform device standards. But the typical result is a system that is only capable of being used with another exactly-mapped set of devices instead of a truly unique and flexible set of devices. Standards cannot anticipate all future device capabilities and thus a standard's template will eventually fail to encompass the needed functionality unless it is updated, which often breaks backwards-binary compatibility.

Relating to hardware, it is not easy to connect general purpose peripheral devices (such as, e.g., a display device like a monitor, etc., an input device like a keyboard, etc., and a telecommunications device like a network, etc) to the data bus and to the robot control apparatus, since architecture of the hardware such as the data bus is a customized component. It is therefore typically necessary to prepare a separate custom-made interface individually for connecting the robot control apparatus to each of these devices, in order to use them. Since there is a great deal of restriction to the kind of peripheral devices that can be connected and used with the robot control apparatus, this presents yet another problem that makes it difficult to expand the system easily.

Relating to software, the tasks performed by robots are defined programmatically using a software development system. The software implementation, however, is subject to similar constraints of hardware in that the software system as a whole is customized as well. Similar to a hardware device's connection, a software module's interface should be compatible in order to use it with other software module interfaces. The manner by which software modules are combined is highly variable and often custom to each particular system architecture.

In general, current robotic control systems require a well-defined structure for control architecture and data specifications that system designers should ensure components adhere to, in order to maintain interoperability. If a component does not meet the specification exactly, either selection of an exactly-mapped component (as mentioned above) or the re-development/re-engineering of the interface abstraction(s) is usually required. One possible problem with the abstraction methodology is that systems have many components that rely on the same template(s) for information exchange—otherwise there would be little interoperability advantage to templates—that support certain capabilities but not others. This may lead to inherent dependencies on shared templates that, when the template changes to allow additional functionality to meet a new need, breaks compatibilities with many related, as well as unrelated, components.

SUMMARY

In a system which may include both hardware and software components, which can include, for example, newly-created components, existing components, third-party components, and legacy components, there may be incompatibilities between components of the system including, but not limited to multiple different representations of information (e.g., form of the data), multiple different programming languages, multiple different operating systems, multiple different hardware architectures, multiple different hardware connectors, and multiple different network topologies. Reasons for why incompatible components exist include, for example, the independent design of components, whether by different organizations or by different teams within the same organization. Independent components are often designed to interoperate based on an initial design.

In some implementations described herein, components may be developed independently within a system and system of systems framework that allows developers to use a heterogeneous mix of specifications, hardware, and software rather than the current approach of attempting to force the use of a single standard. In some examples, this framework allows previously incompatible components and technologies, developed independently or not, to be integrated into a system without the re-development or re-engineering of each component. In some embodiments, Interface Modules—for example, Hardware, Conversion, Legacy, and Virtual, known as HIM, CIM, LIM, and VIM respectively—create abstract interfaces that allow a particular element (for example a device) to be treated in terms of the information the component produces/requests. In some implementations, an Information Model replaces (and/or augments) the customized and/or shared templates that have been used heretofore, and through customized objects allows dynamic access to specific parts of the model, persisting through the addition, modification, and deletion of the model as a whole.

Some embodiments advantageously provide a way to have software and hardware cooperate in an identity-independent fashion that adapts to changing software and/or hardware components in a simple, easy to understand and easy to implement operation and without the need for human intervention (or with relatively minimal human intervention). In some such embodiments, relatively inexperienced programmers or managers may be able to implement systems customized for their needs.

In certain embodiments, an application-independent and component-isolated system and system of systems framework is used. In certain such embodiments, a framework, hereafter referred to as "DIOS" for Distributed Integration Operating Schema, allows a user to integrate disparate software and hardware components and governs the addition, removal, modification, failure of, and information exchange between such components. In some embodiments, DIOS accomplishes this task by enabling a user to create an Information Model—which comprises a user defined hierarchy of information (such as information objects). In some embodiments, the DIOS architecture employs, although hidden from the developer, a thin-client thick-server approach in which DIOS Clients connect to DIOS Servers that handle information routing/delivery. In some embodiments, a DIOS system may comprises hybrid Publish/Subscribe architecture, Service Oriented Architecture, and Model Driven Architecture.

In some embodiments, the Information Model is managed via a graphical user interface tool that uses the Information Model to automatically generate code for the programmer. With this tool, the user is able to define agents and the other resources in the system. In some implementations, agents comprise a special type of component described in detail below. Using drag-and-drop operations, desired parts (or all) of the Information Model may be associated with each agent (e.g., each component/subsystem) to give the agent, for example, read, write, or read/write access to information in the Information Model. In one embodiment the Information Model is defined in a schema which the tool then parses to generate an optional agent code stub and custom software objects that exactly match the characteristics, e.g., information representations, programming language, operating system, hardware architecture, and network topology, of each component to be integrated. The generated custom software objects may include a DIOS Client. In some embodiments, the user does not need to specify any parameters to the initialization call.

In certain implementations, not all information is given to each agent, for example, only the information the agent needs (e.g., that it has registered to request and/or produce). A "need to know" policy may be strictly enforced by some DIOS implementations as Information Models are dynamically managed for each agent. Dynamic changes may be made to the encryption schema and permissions associated with each agent. In certain embodiments, information arrives at or leaves from an agent if the agent is able to both support the information exchange and has the security rights to do so.

To address the issue of legacy software systems and legacy hardware devices, Hardware Interface Modules (HIMs) are used in some embodiments. HIMs may be implemented to both conceptually and physically isolate and abstract the software and hardware legacy input(s) and output(s) from the rest of the system. In some implementations, a Legacy Interface Module (LIM) may also be used to connect to an existing software system, where a LIM may comprise a custom software object without an agent template. In one example, a HIM comprises a hardware component that comprises a DIOS Standard Board (e.g., for Control/Communication/Power) and a Device (specific) I/O Board. The DIOS Board may include hardware and software, including a processor that runs a DIOS Client, to power the HIM and to communicate over a network with at least one DIOS Server. The DIOS Device I/O Board may include device-specific physical connectors for data and power as well as any other circuitry used to connect to a particular device that is not supported by the DIOS Standard Board hardware. An agent may reside on the DIOS Standard Board processor that interacts with a specific device and relays information to-and-from the device through its own Information Model (e.g., a custom object).

A modular approach has been taken with certain DIOS implementations. For example, each characteristic that the Information Model abstract, e.g., information representations, programming language, operating system, hardware architecture, security model, and network topology, etc., is implemented as a separate module. During the generation of a custom object, code may be created by these modules that turn the abstract Information Model registrations into relevant native code. Possible advantages of this modular approach include that it allows currently unsupported characteristics to be added easily and new and not-yet-created characteristics to be added in the future. For example, the information representation module may automatically generate the code needed to convert between the form, e.g., data structure(s), units, format, and name, etc., of the same object (or between two objects) in the Information Model. Technical limits in some systems may require a human to create the conversion(s). In such cases, DIOS may implements these as Conversion Interface Modules (CIMs). When two forms of an Information Model object (or a field within an object) are registered for by agents in the system, DIOS embodiments may attempt to automatically generate a CIM to convert between the two information model forms. If the conversion is unsuccessful, DIOS may generate a CIM stub and notify the user that human action may be needed. Additionally, if multiple forms of an object are not used, the CIM need not be generated in some embodiments. Also, if conversion is only desired in one direction, then in some cases a human may implement half of the CIM.

Through the use of HIMs, or any other shared communication link, DIOS embodiments may enable a user to connect two or more separate DIOS systems and integrate them quickly via a graphical user interface tool (which may be provided as one of the DIOS SystemTools). A user may create object-to-object associations between the various objects in the separate Information Models via drag-and-drop operations. After creating associations for information to be exchanged between the systems, DIOS generates one or more CIMs. In some implementations, the tool first uses existing CIMs that match the form of both objects that are used automatically, then prompts the user to re-use existing CIMs that are not exact matches, and finally generates code stubs for any remaining CIMs.

This disclosure describes embodiments of methods and apparatus for integrating a variety of disparate sensors, actuators, and other software and hardware components to form a system. Possible advantages of these embodiments include that the system can be re-used and re-combined to integrate into another system without re-development or re-engineering of each component. Though some embodiments address the issue of interoperability in mixed software and hardware environments, other embodiments may include software environments as well. A possible advantage of this approach is that components may be isolated from one another and may not communicate with each other based on a priori knowledge. For example, the components may not need to be coded with specific knowledge of the implementation details of other components, but rather exchange information anonymously in a non-dependent manner: identity-independent communication.

In a conceptual example intended to illustrate certain embodiments, this communication abstraction may be thought of as if there were no data, where data (in this example) is a specific and likely proprietary form of facts, but rather information, where information (in this example) is a set of facts in a general form, exchanged in the system. Such identity-independent communication may allow for each component to be combined with other components without regard to the other components in the control system. Without subscribing to or requiring any particular theory, in this illustrative example information may be thought of as a subset of data because information is data, but data is not always information (for example, a random string of bits contains zero information, but may still be considered data).

This disclosure describes embodiments of a system with methods of representation for data from different components and the supporting framework that is use to maintain system cohesiveness. The framework is advantageous for the fast and easy development and deployment of robotic control systems, which may be used, for example, to control any machine that provides a degree of mechanized or digital work, in a variety of differing applications with a variety of differing components. This disclosure describes embodiments of a method for enabling disparate components to communicate in a manner such that if a component is removed and replaced with a differing component that produces the same information, the system will automatically, if relevant CIMs/HIMs/LIMs/VIMs are present, adjust and compensate for the new component such that normal operation is maintained without the need for human interaction. The method may be advantageous for the practical design and implementation of any robotic control system. It also may be advantageous for systems that are desired to scale from a single, specific set of hardware and software components to another unique, potentially disparate, set of hardware and software components with minimal or no modification to the remaining original components of the system.

In one embodiment, a computer-implemented method of providing an information model for a control system is provided. The information model may facilitate communication of information among agents of the control system. The method comprises organizing information in the information model into a hierarchy of information objects stored in a memory. The information objects may comprise one or more fields defined using abstract primitives in a schema. In some embodiments, at least one of the information objects has a first form and a second form that is different from the first form. The method also comprises associating a publishing agent with a first subset of the information objects in the hierarchy. The first subset represents information that the publishing agent can produce for other agents. The method also comprises associating a subscribing agent with a second subset of the information objects in the hierarchy. The second subset represents information that the subscribing agent can request from other agents. The method also comprises communicating to the subscribing agent information produced by the publishing agent if there is at least one information object in common between the first subset and the second subset. In some embodiments, the information is communicated without requiring knowledge by the subscribing agent of the publishing agent prior to the communication or knowledge by the publishing agent of the subscribing agent prior to the communication.

In some embodiments, a computer-readable medium may have executable instructions stored thereon, that when implemented by a processor, cause the processor to perform embodiments of the method of providing an information model for a control system. In some embodiments, a control system comprises an information model for communication of information among agents of the control system. The control system may comprise a memory and a processor. The processor may be configured with one or more software modules configured to execute embodiments of the method of providing an information model of the control system.

An embodiment of a distributed robotic control system comprises one or more processors each configured to execute at least one agent. An agent may comprise an implementation of a behavior based at least in part on an information representation of data available through access associations between information representations of other agents. The agents may be configured to exchange information through an information model that comprises a hierarchy of information objects. Each agent may be associated with some or all of the information objects in the hierarchy. The robotic control system also comprises an input device configured to receive an input signal from an environment in which a robot operates and, in response to the received input signal, to provide input data. At least one of the one or more processors comprises a first client processor that is configured to receive the input data. The first client processor may execute a first input agent configured to provide an input information representation of the input data. At least one of the one or more processors may comprise a first server processor that is configured to communicate with the agents executed on the one or more processors. The first server processor may comprise a distribution module for communicating with access associations of the agents and distribution modules of other processors, a model service module configured to synchronize information exchange between each of the one or more agents' access associations and between the one or more processors, and a first control agent configured to provide a control information representation based at least in part on the input information representation. The robotic control system may also comprise an output device configured to output an output signal for causing an action by the robot in the environment. The output signal may be generated in response to output data. At least one of the one or more processors may comprise a second client processor that comprises a first output agent configured to receive the control information representation and to provide the output data to the output device. Additional processors may be used in some embodiments.

In this application, certain aspects, advantages, and novel features are described. It is to be understood that not necessarily all such advantages may be achieved in accordance with any particular embodiment. Thus, for example, those skilled in the art will recognize that the systems and methods may be embodied or carried out in a manner that achieves one advantage or group of advantages as taught herein without necessarily achieving other advantages as may be taught or suggested herein. Furthermore, embodiments may include several novel features, no single one of which is solely responsible for the embodiment's desirable attributes or which is essential to practicing the systems and methods described herein. Additionally, in any method or process disclosed herein, the acts or operations of the method or process may be performed in any suitable sequence and are not necessarily limited to any particular disclosed sequence.

BRIEF DESCRIPTION OF THE DRAWINGS

The following drawings and the associated descriptions are provided to illustrate embodiments of the present disclosure and do not limit the scope of the claims.

DETAILED DESCRIPTION OF PREFERRED EMBODIMENTS

Certain example embodiments will now be described with reference to the figures. These example embodiments are intended to illustrate various features and aspects of the disclosed systems and methods and are not intended to limit the scope of the claims.

1. Example DIOS System

Figure 1:
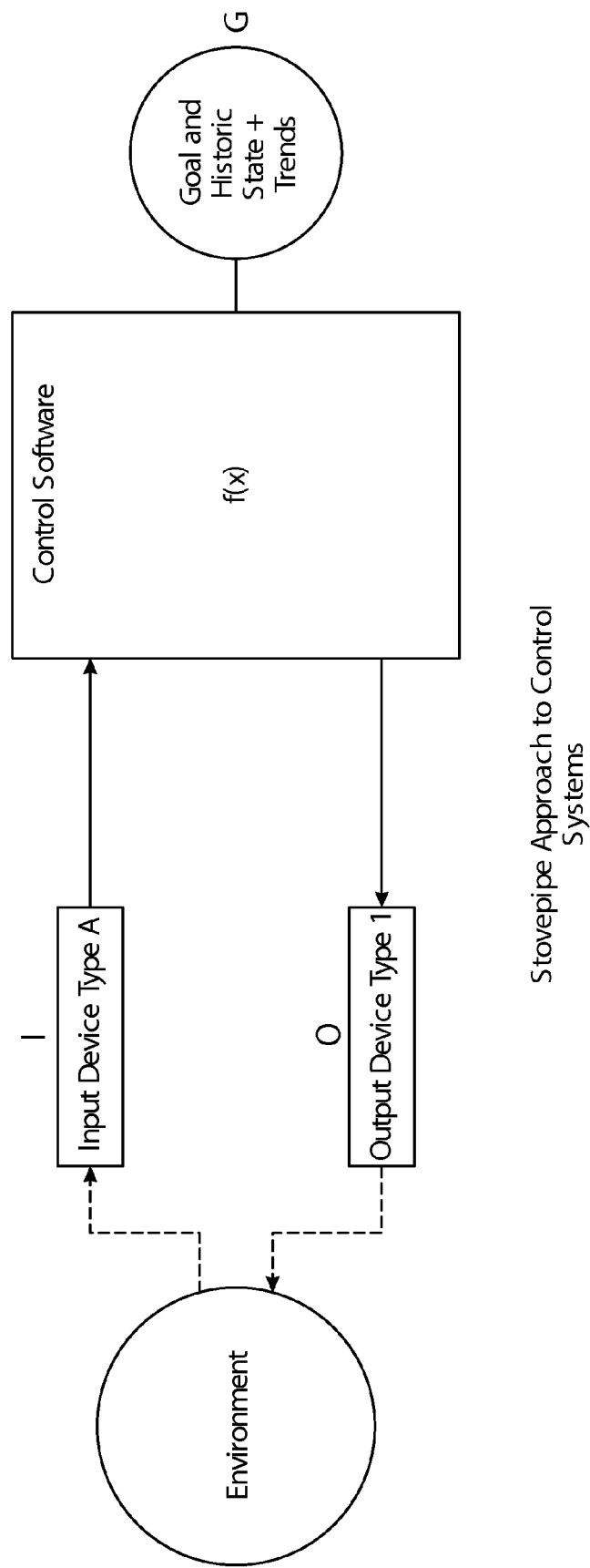
FIG. 1 schematically depicts a standard 'stovepipe' architecture of an example control system.
Figure 2:
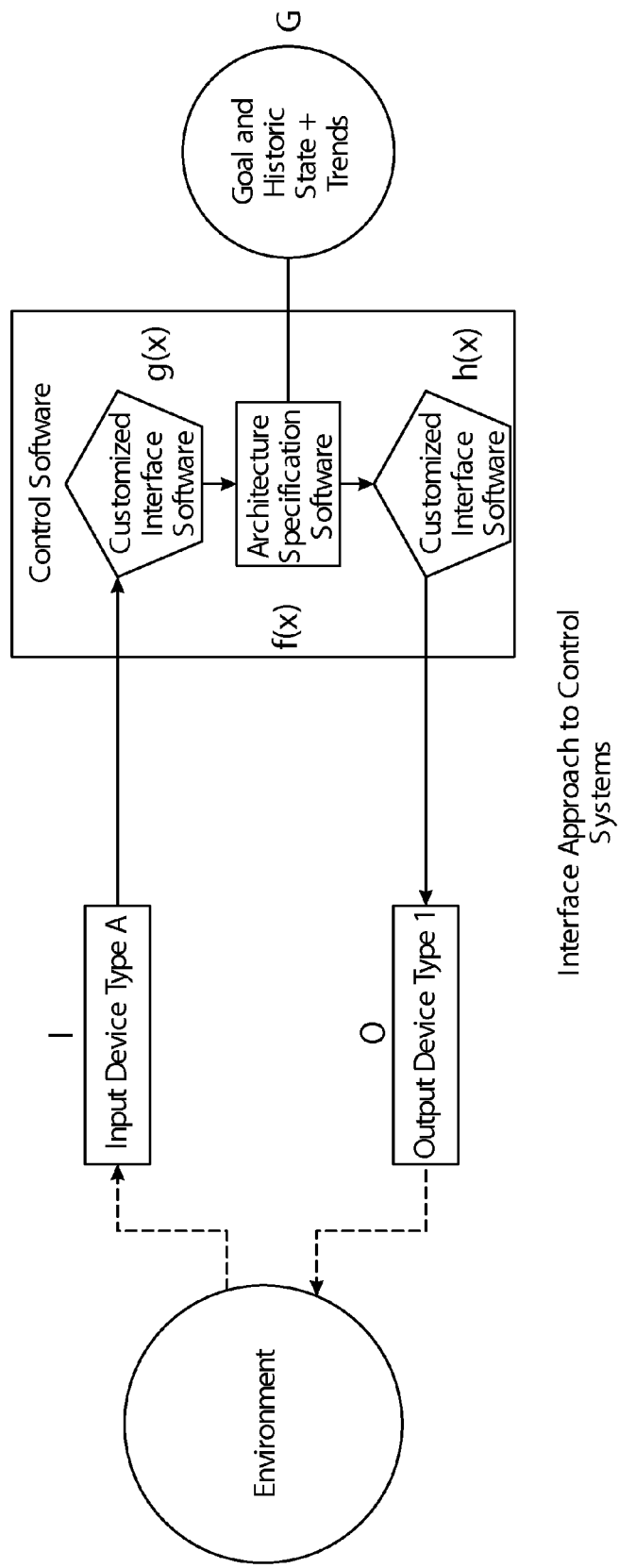
FIG. 2 schematically depicts a modified 'interface' architecture of an example control system.
Figure 3:
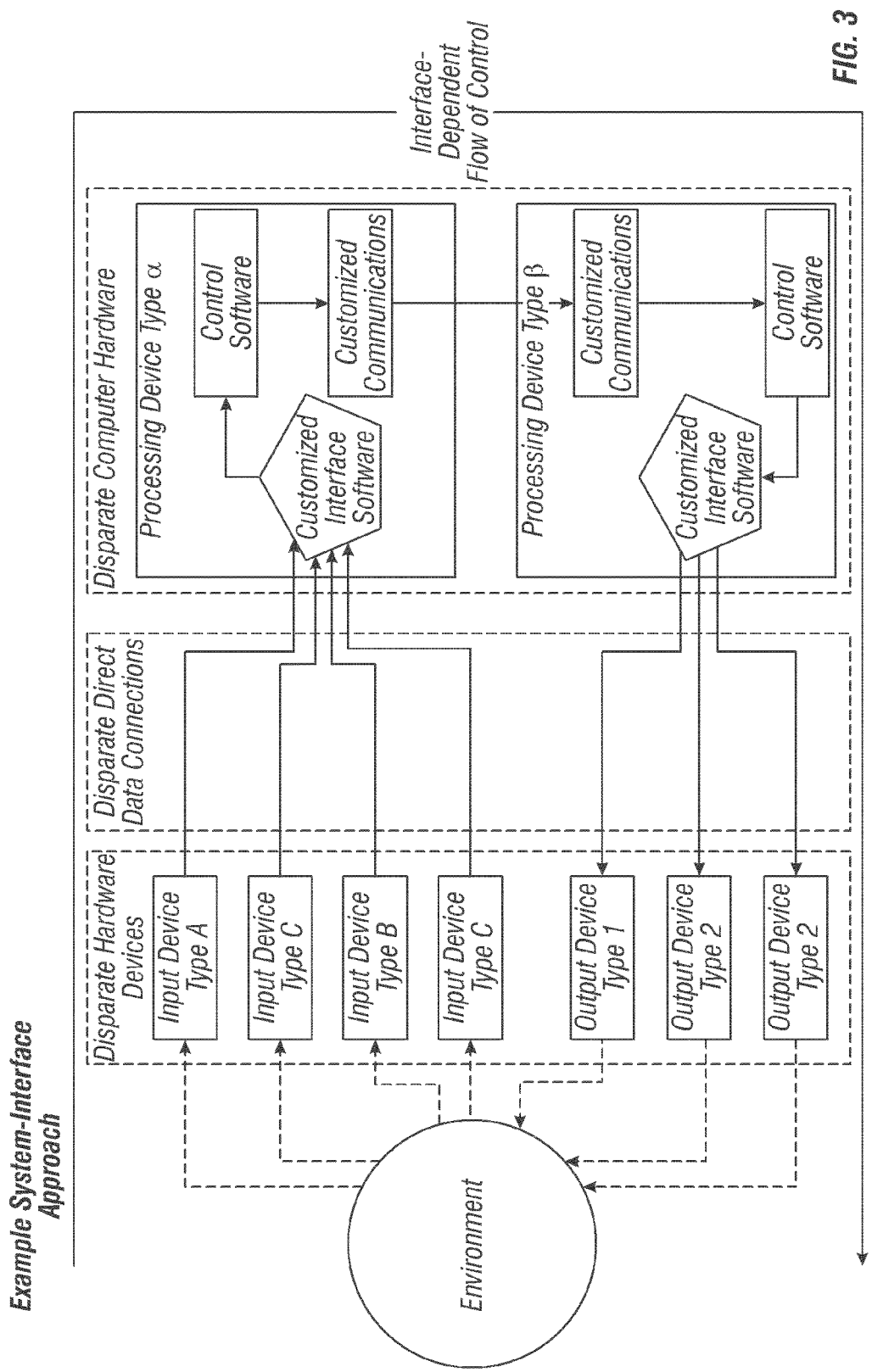
FIG. 3 schematically depicts an example system implemented with the interface approach.
Figure 4:
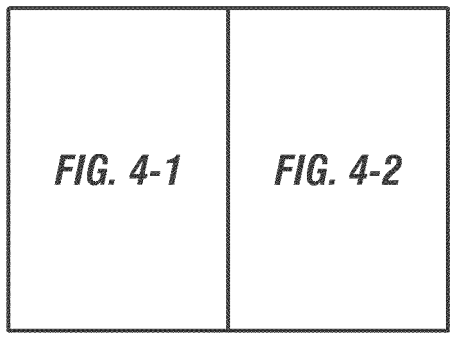
FIG. 4 schematically depicts a logical view of a sample system that implements an embodiment of a DIOS architecture in which information exchange occurs through an Information Model.
Figures 1, 4:
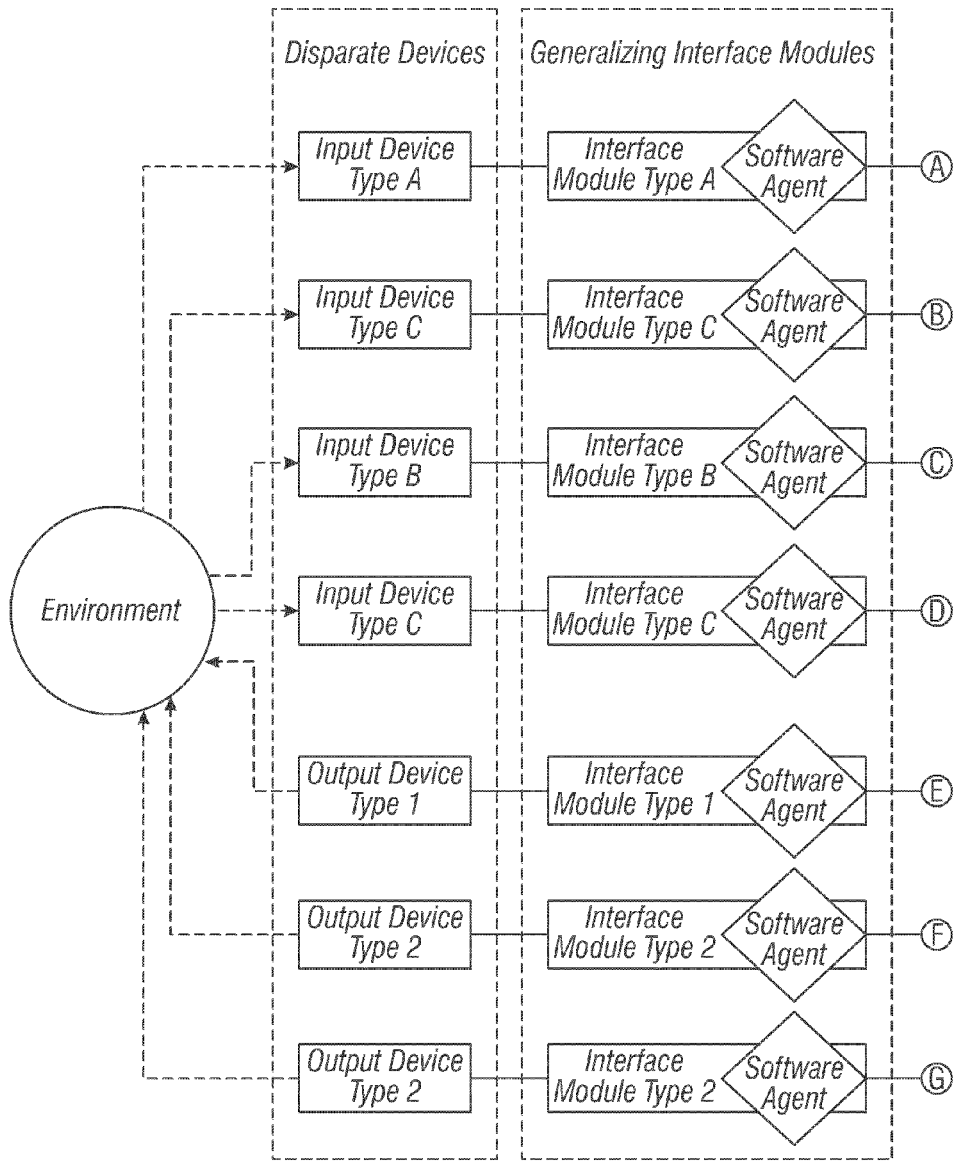
Figures 2, 4:
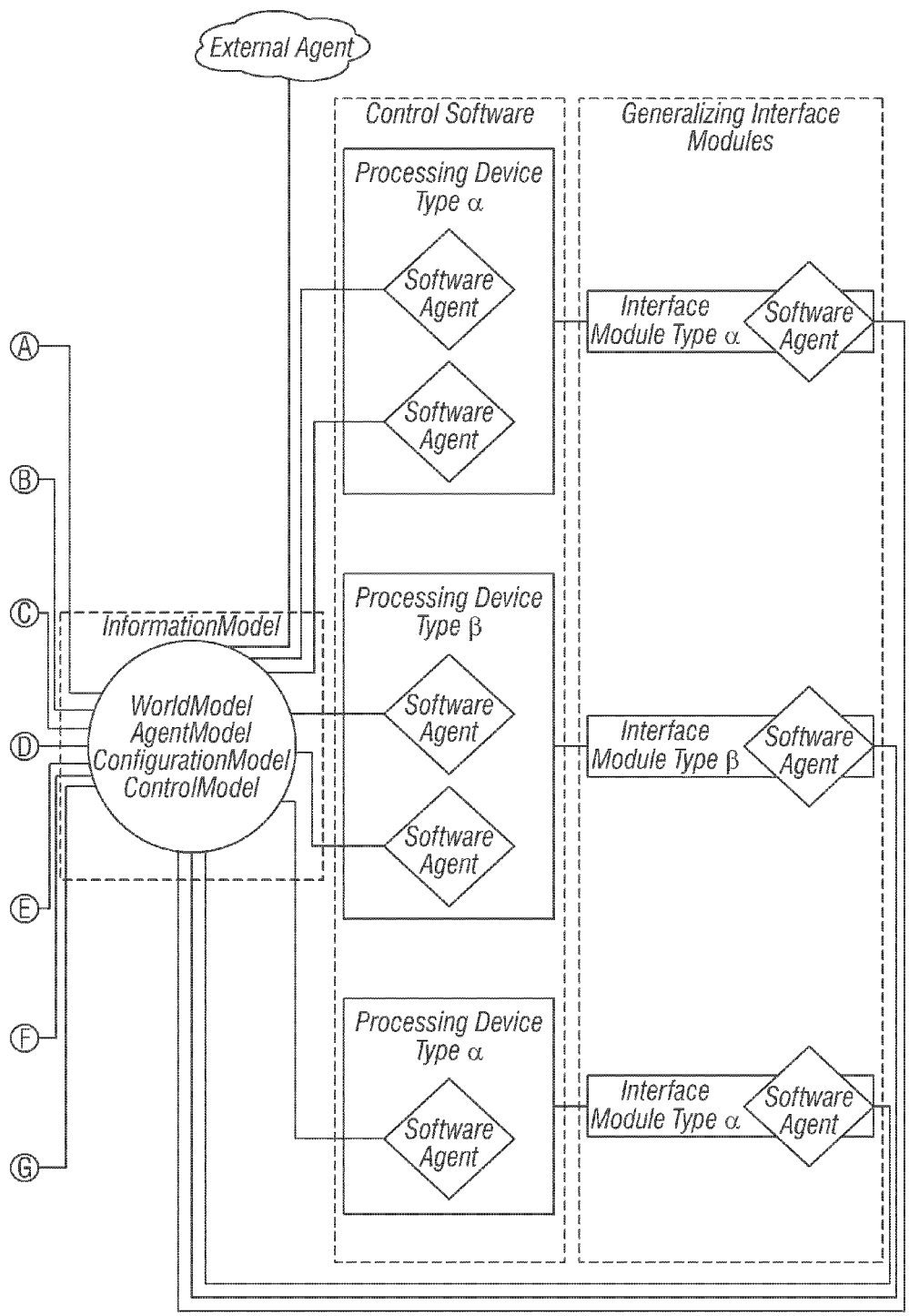

FIG. 3 schematically depicts an approach to abstracting hardware devices from control software, and is provided for comparison with FIG. 4, which schematically illustrates an example robotic control system that has been augmented with an embodiment of an Information Model and embodiments of Hardware Interface Modules (HIMs). As with traditional robotic control systems, the sample system illustrated in FIG. 4 shows that the input devices communicate with the control software and the control software then communicates with the output devices. In the sample system of FIG. 4, as an alternative to employing a customized interface software between each component, an embodiment of the Information Model is used. In this example implementation, the Information Model can be conceptualized as if it were a single entity in one location shared by all components, although the Information Model is commonly distributed, in part or in whole, across one or more DIOS Servers. The Information Model enables each component to not be concerned with the implementation details of other components; instead, each component interacts with its own customized version of the Information Model that matches its view of the world.

In FIG. 3, interaction with hardware devices requires converting the information from the input to the output devices at the same location as the control software. In the sample system of FIG. 4, a HIM resides between the device and control software, acting as an independent agent in the system, and is thus de-coupled from the location of the control software. In this embodiment, an agent is more than a passive data transformation and is an active component in the system that represents the information that its connected device can accept and produce. Embodiments of systems described in this disclosure may be formed around the idea of agency. For example, in some such embodiments, a component in the system is an agent that actively represents the work and information that it can provide to the rest of the system, and negotiates the work and information that it requires from the rest of the system.

Information exchange in DIOS may occur through the Information Model via an agent's custom software object. A DIOS Client (e.g., inside the custom software object) connects to a DIOS Server (present but not shown in FIG. 4) that synchronizes information across other DIOS Servers as well as the connected DIOS Clients. An advantage of certain embodiments is that a DIOS Server does not need to reside on the same computer (or processor) as the agent that to which it is connected. Therefore, a DIOS Server is not necessarily required on each processor.

In one illustrative conceptualization, the data held in Information Models can be thought of as more than variables, but rather as information and services that are available to the system. Information in a model is populated by one or more agents and transferred between agents via customized software objects managed by the Model Service's Information Model. By utilizing a data transmission medium that does not require a connection-oriented link between two devices, agents can join the system and gain access to all information provided by the Information Model by simply connecting to the physical data medium. For example, Ethernet may be used as a data transmission (or communication) medium in some implementations. The flexibility of various system embodiments is shown by the sample system in FIG. 5, because most components in the system communicate over a direct wire link to the data communication medium, but by adding a wireless access point to the communications backbone that bridges a wireless gap, an external agent that has no direct physical connection to the system may access information as if it were a local agent.

Figure 5:
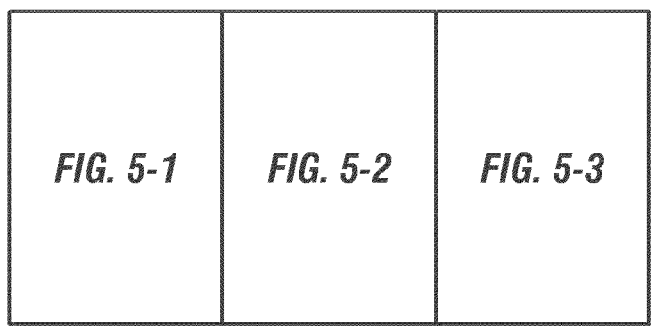
FIG. 5 schematically depicts a physical view of the sample system shown in FIG. 4.
Figures 1, 5:
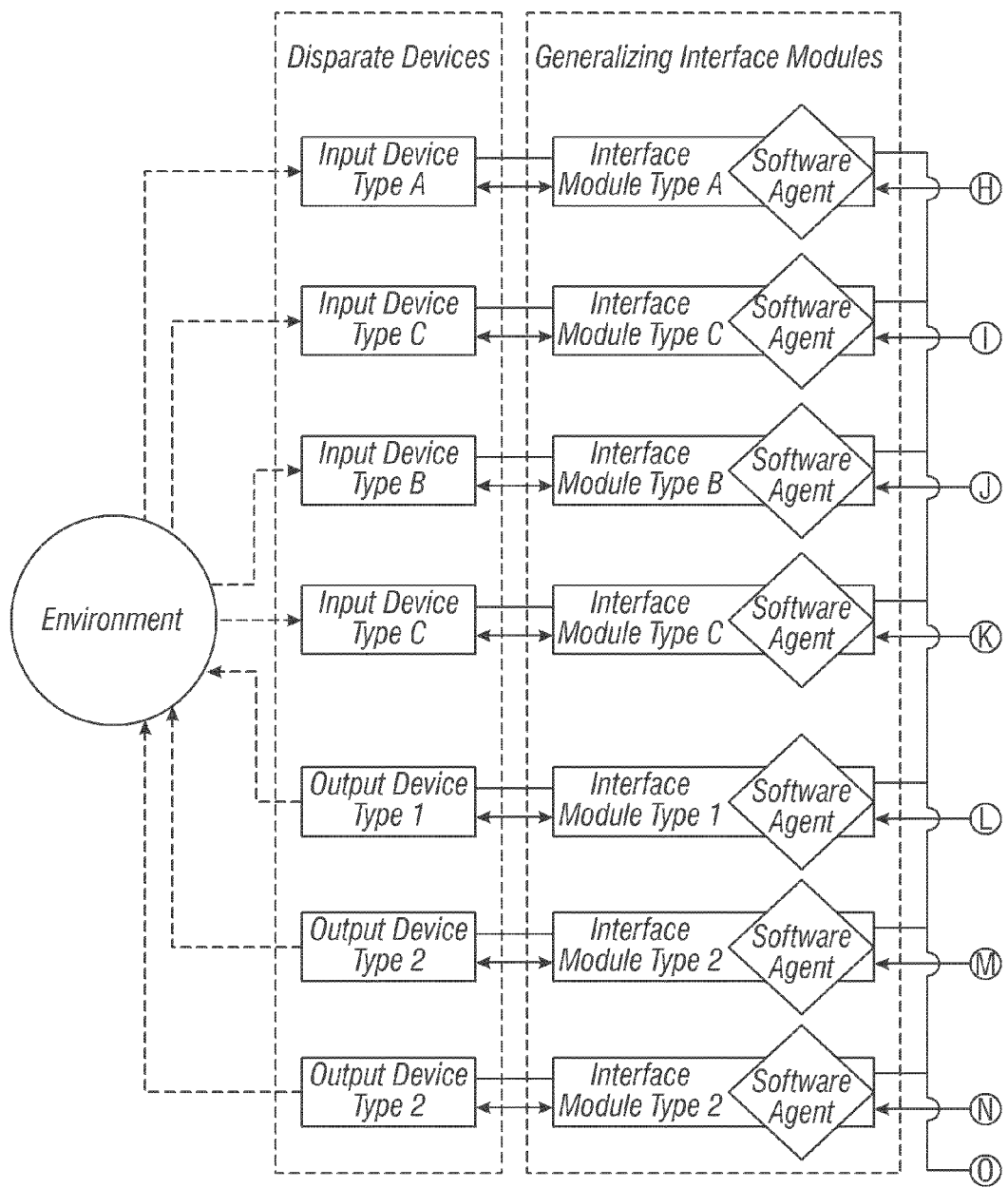
Figures 2, 5:
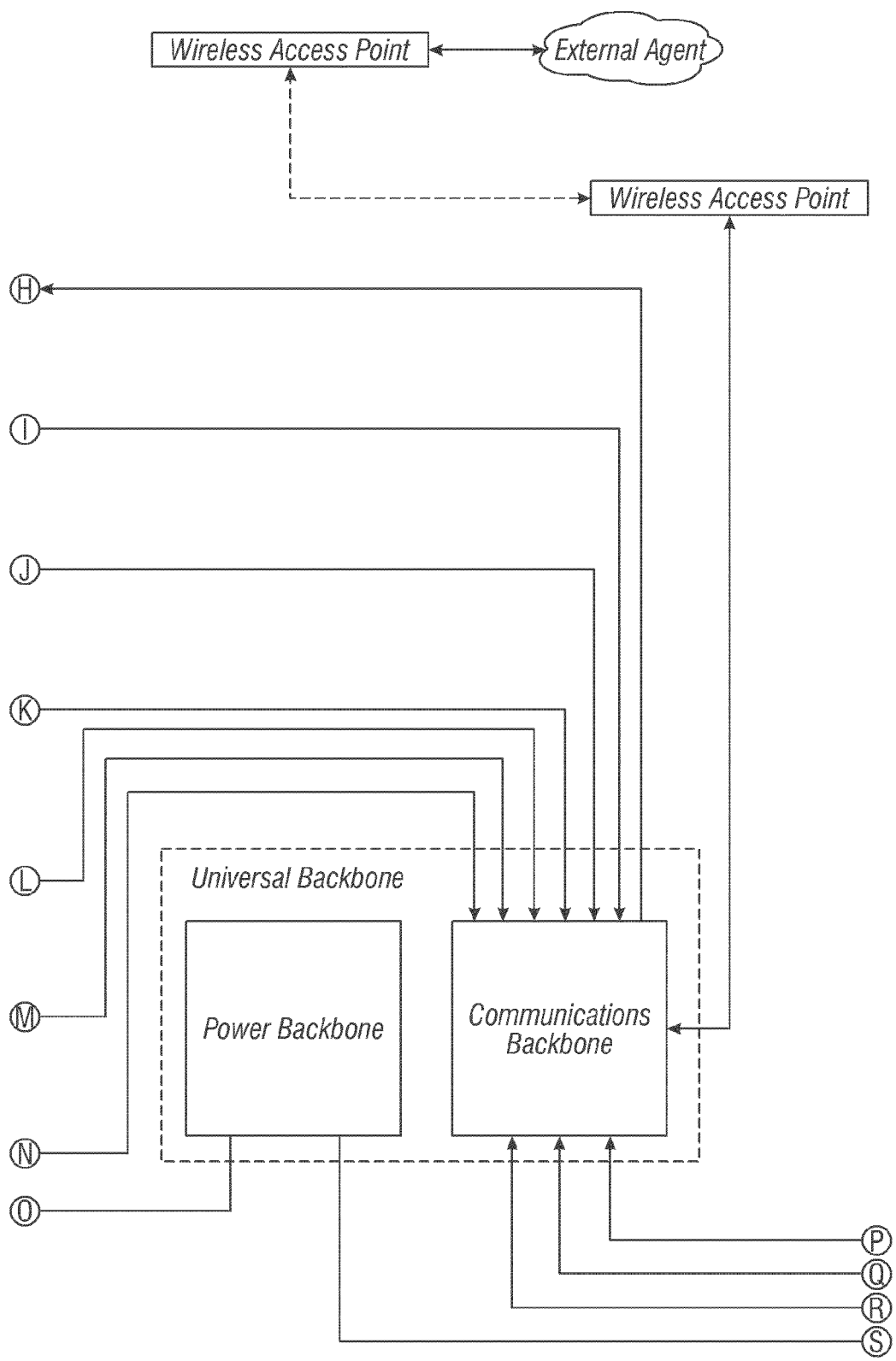
Figures 3, 5:
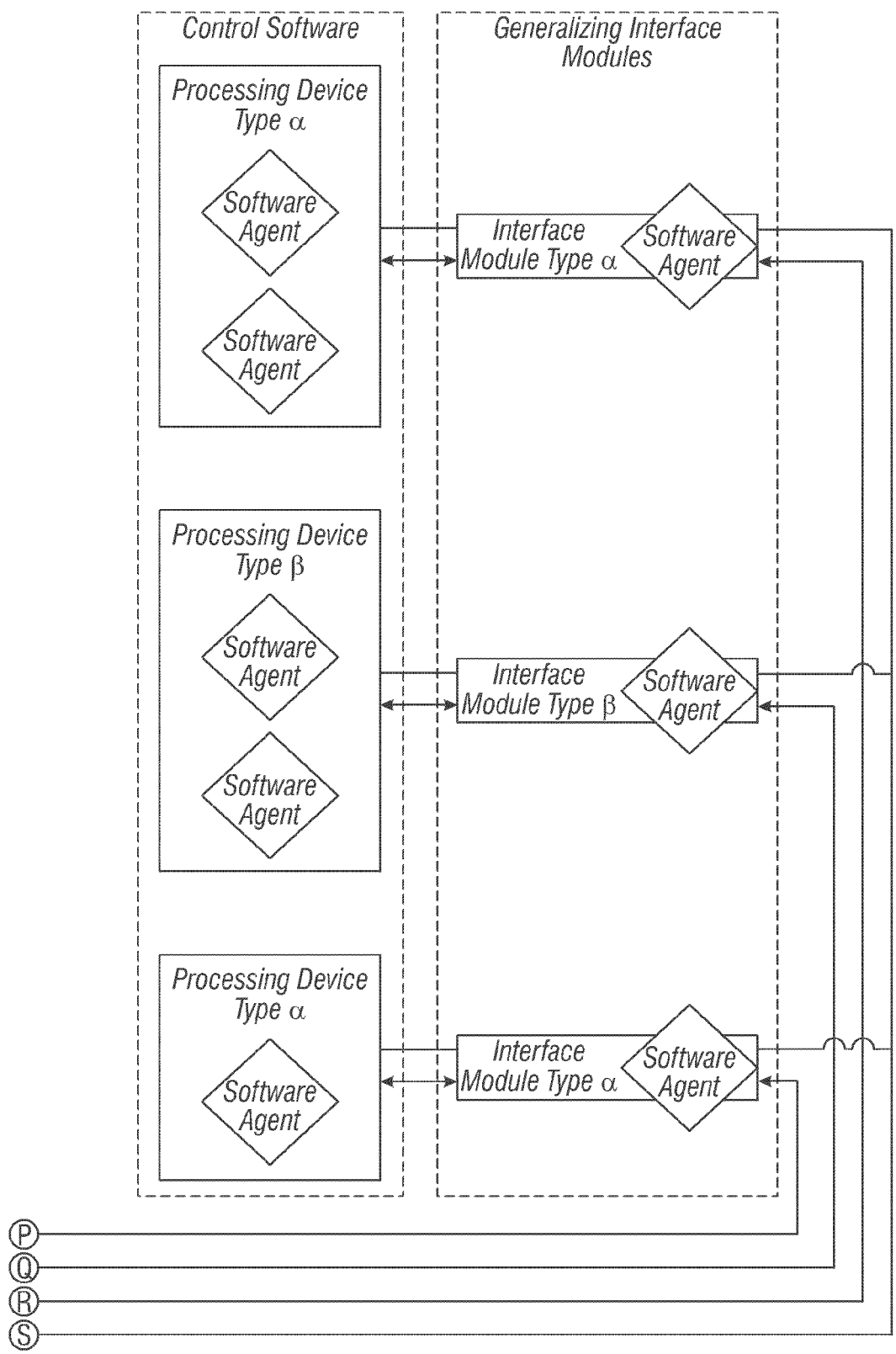

The abstraction, independence, and isolation of components in a control system, for example, the logical aspects shown in FIG. 4 and the physical aspects shown in FIG. 5, may be achieved by transforming each component in the system into an agent. Embodiments of a fully distributed abstract control system can be created without a priori knowledge of the devices involved. Embodiments of the system may be able to adapt to the replacement or addition (and even failure) of components without modification to the control software. In some embodiments, as the control software is compartmentalized into separate units (e.g., agents), new agents can be added without necessarily modifying the existing system agents. In some embodiments, an agent can be completely redesigned and recreated without substantially affecting or impacting other agents. The abstraction/isolation/independence objective is more commonly known as "plug-and-play". Depending upon the application, embodiments of an agent representation of a component may be embodied in software (e.g., using an algorithm), in firmware, in hardware circuitry, or a combination thereof.

In some implementations, an agent that is dependent on the functionality of specific device/system/subsystem/resource may be referred to as a "situated agent." This includes both dependent hardware resources, such as HIM embodiments that include a situated agent dependent on a piece of hardware physically connected to the HIM, and dependent software resources, such as a LIM or VIM that may be dependent on a legacy software system or virtual/simulated device respectively. Those agents which are not dependent on a specific resource may be referred to as "distributed agents" that can move between some or all computing platforms that can support their processing needs. Communication and access through the Information Model may be implemented consistently for both situated and distributed agents. Publishing agents (situated and/or distributed) populate various objects within the Information Model based on a set of features. Such features include, for example, information type and physical boundaries (both of which could be null or any other value.) Subscribing agents (situated and/or distributed) receive information that matches a set of features, for example, based on information type and physical boundaries (both of which could be null or any other value.) In some embodiments, as publishing agents go online and offline, the information returned to the subscribing agents changes accordingly based on the available publishing agents.

In some implementations of DIOS, publisher-specific knowledge may not be required on the subscriber side, because the subscribing agent interacts with an Information Model object that returns a set of information without particular order (which can be any number of entries, including none if there are no publishers of the specified information), that matches the features requested. Such system implementations may allow for a single interface for information via the agent's customized software object regardless of whether the information originated directly from a physical device, is processed information from a physical device, originated from a simulated device, is processed information from a simulated device, or is information from control software and independent of the physical location of the information source. By having information exchanged through an Information Model, a developer may create a system that is in not directly dependent on any device-specific knowledge. In some implementations, all information may be exchanged through the Information Model. In some embodiments, there is no initialization or management of information providing agents. For example, a developer may simply specify a type of information and/or a space of interest (and potentially other features) via a drag-and-drop procedure in a graphical user interface and receives a set of information that is currently available. In some embodiments, as the number of producers of said information increases, so does the number of entries returned by the Information Model object. Conversely, in some embodiments, as the number of producers of said information decreases so does the number of entries returned by the Information Model object. Developers may create a system based on information without any knowledge (or with relatively little knowledge) of physical or network topology by simply using the drag-and-drop interface that in turn specifies a set of features used by the custom software object to define specific information (in the form of messages) to be delivered to the object.

Embodiments of some DIOS systems comprise a hybrid Server-Client Architecture (SCA), Service Oriented Architectures (SOA), and Model Driven Architecture (MDA) in that the communication between agents is facilitated by a server-client architecture. In some such embodiments, access to information may not require knowledge of a specific provider, and knowledge of the service provider may not be required, because a model is used to interface information registration/association. Certain implementations of DIOS may be distinguished from traditional approaches in that 1) with SCAs knowledge of the exact server contact information is required; 2) with SOAs, the exact server dependence is addressed by abstracting server details to service provider descriptors instead, but specific knowledge of the service providers for which to request the service is still required; and/or 3) with MDAs, templates (models) are static and cannot be changed once registration occurs without breaking binary dependence with original registrants. In other implementations, DIOS may share certain features with SCAs, SOAs, and/or MDAs.

1.1 Examples of Logical and Physical Abstraction

In some example implementations of DIOS, some or all components, e.g., devices, subsystems, software, hardware, etc., are logically and/or physically abstracted and isolated as functional units that in some cases, are implemented in the form of agents. In some embodiments, if a component is an agent, the component can be thought of, developed like, and treated as an isolated entity. Since an agent, in some cases, is active and announces itself and the information it can provide to the system and makes active requests of the system for information it requires, components represented by agents are Plug and Play.

In some embodiments, distributed agents can be started to add certain functionality and stopped in order to remove functionality. As there is no need for a direct dependence between software agents, a new agent can be added to a system with a new behavior that adds new functionality without modifying existing software agents. In one embodiment of DIOS, software agents are simpler to develop as they can truly be defined and tested independently of any other agent. Agents may be developed to expect any information that matches the request, for example, whether there is a single source of information, multiple sources, or no sources. In one embodiment, information from other robots could be returned by searching for features in relation to the local robot and having neighbors send back information that covers the same space as if it were from the original robot.

In some embodiments, a HIM accesses the device it is connected to and sends information to the node (e.g., via the Model Service) chosen to be its entry point to the system so that any interested agents running on the processing devices are able to access the information. Some hardware may also receive data that any agent can send. Since the HIMs may be communicated with as if they were software agents, this allows for a division between information sent to the devices and the method of delivery to the device.

As described, in certain embodiments new implementations or versions of a distributed agent can be swapped without affecting the rest of the system. Such behavior may be implemented for a HIM and its situated agent(s). Because details of the hardware are abstracted away, a simulator may easily be used instead of the actual hardware. For example, by using a Virtual Interface Module (VIM), the simulator can use (or provide) the same information that the hardware uses; and the rest of the agents in the system will continue to operate as if they are communicating with real hardware (rather than virtual or simulated hardware).

In some implementations, the logical and physical abstraction and independence also makes it possible to re-allocate the functionality running on a piece of equipment that has failed to another piece of (redundant) equipment for as long as this surrogate equipment has the necessary resources to perform the task. Agents may be able to communicate with the input/output devices (e.g., HIMs) even if they are not running on one of the processing devices physically located on the same component (e.g., vehicle in a vehicular system) as the original agent if the component (e.g., vehicle) with the HIM is attached to the same communication medium (e.g., wired and/or wireless network) as the computer running the agent it can be accessed through the Information Model. More generally, in certain embodiments, any agent can share information with any other agent through the Information Model if they can communicate on a communication medium (e.g., Ethernet).

1.2 Agent Locations 1.2.1 Situated Agents

In some embodiments of the DIOS system, each HIM/LIM/VIM agent is tied to the specific resource instance that it represents, and the situated agent can be treated as if it were a driver for such a specific device (resource). In some such embodiments, the agent is configured so that it cannot be used on a platform without access to the device. In certain embodiments, a situated agent may be separated into two (or more) parts: a first situated agent exists to broker information, in its original or minimally modified state, into and out of an Information Model for the specific resource. A second situated agent performs the majority of the work for acting as a representative of the device, which may reside anywhere in the system and, although dependent on the first situated agent, can act as a situated agent in practice.

1.2.2 Distributed Agents

Figure 8:
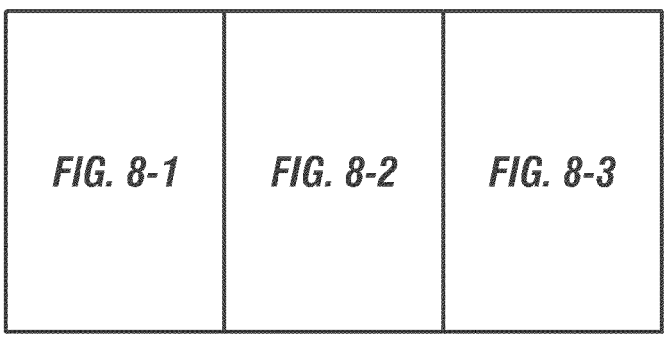
FIG. 8 schematically depicts a physical view of the sample system's expanded Information Model wherein the objects of interest (produced/requested) for each agent are associated. The physical location of the information objects origin/destination is not necessarily on the same machine as the agent of interest.
Figures 1, 8:
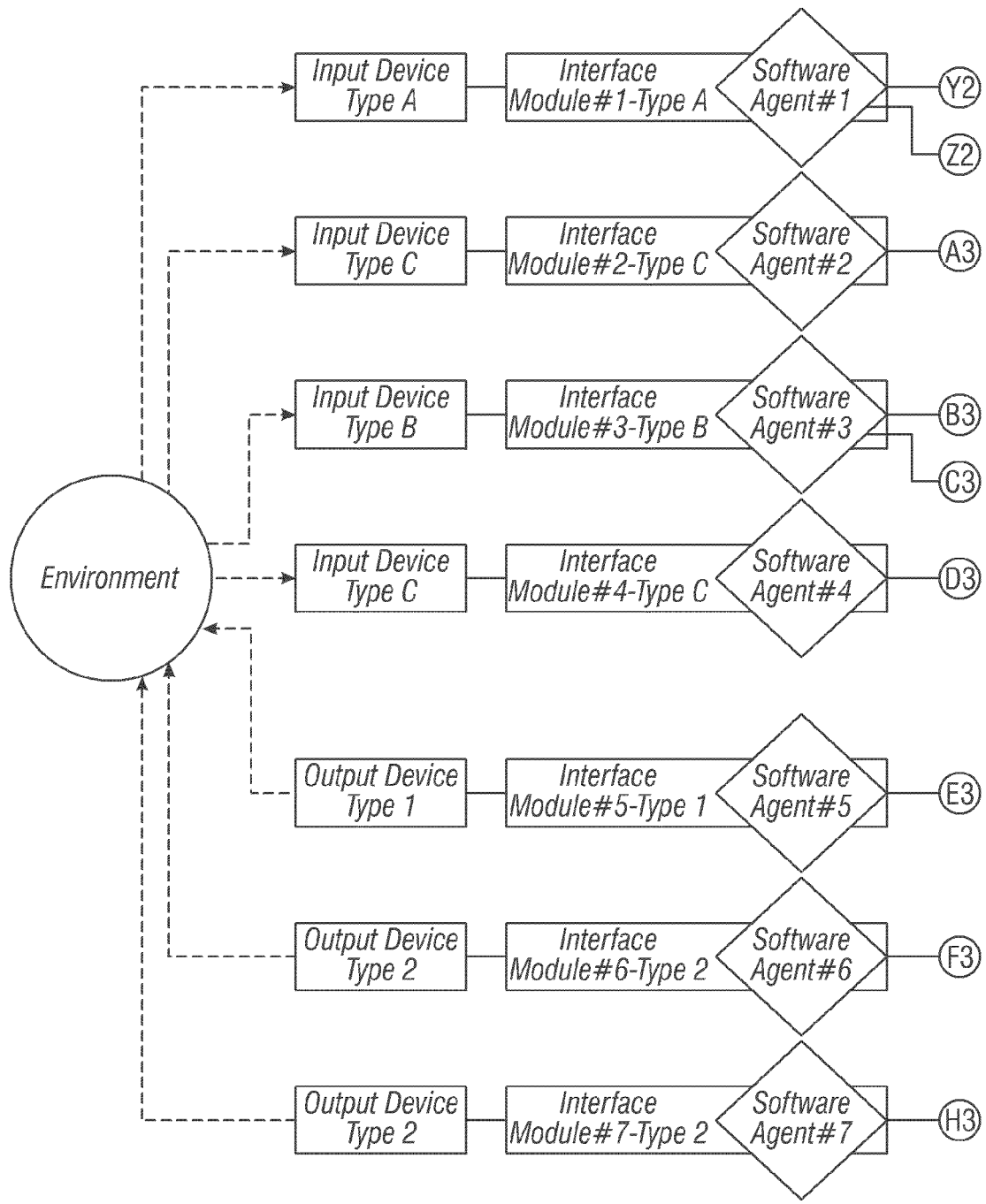
Figures 2, 8:
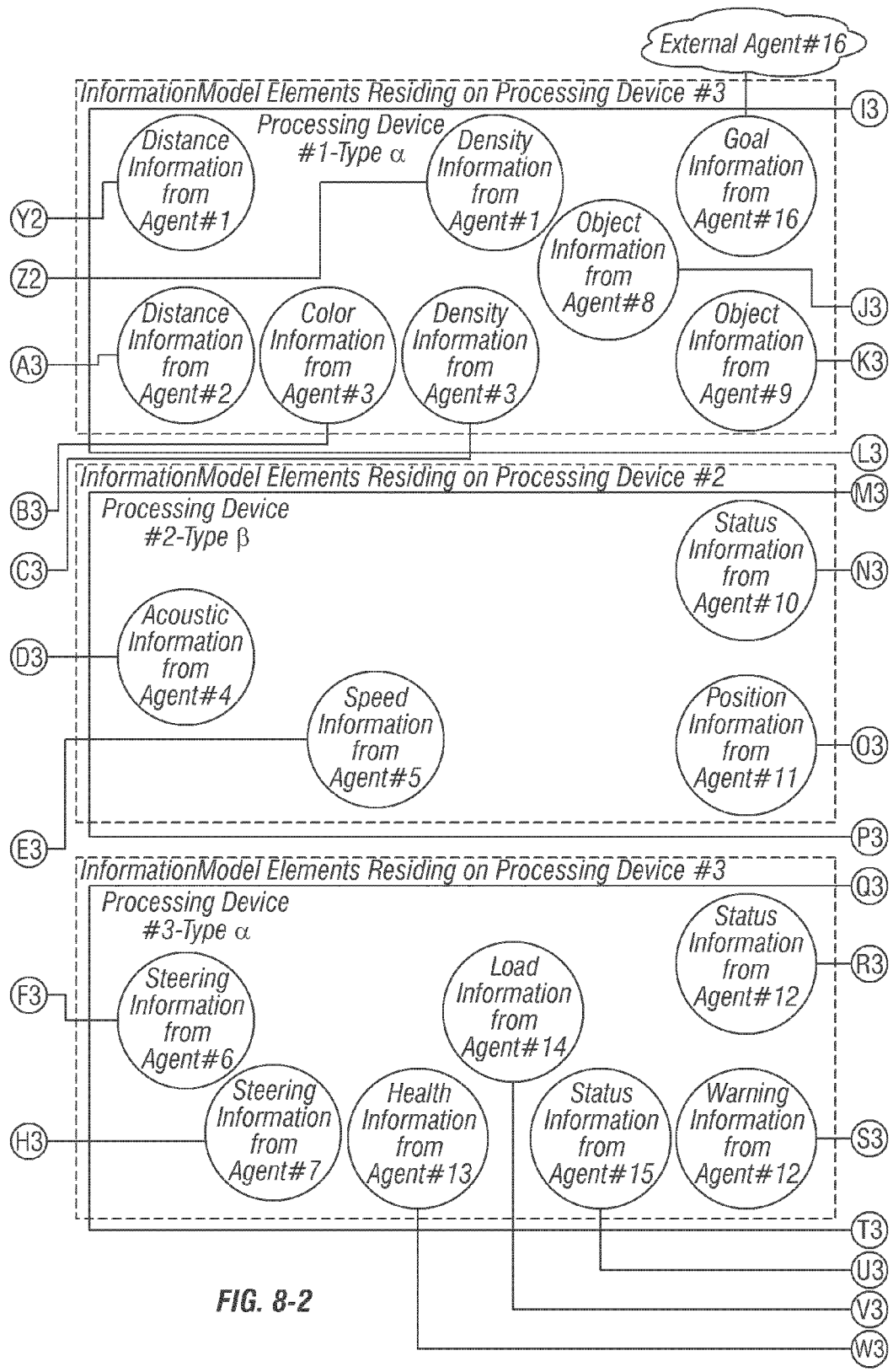
Figures 3, 8:
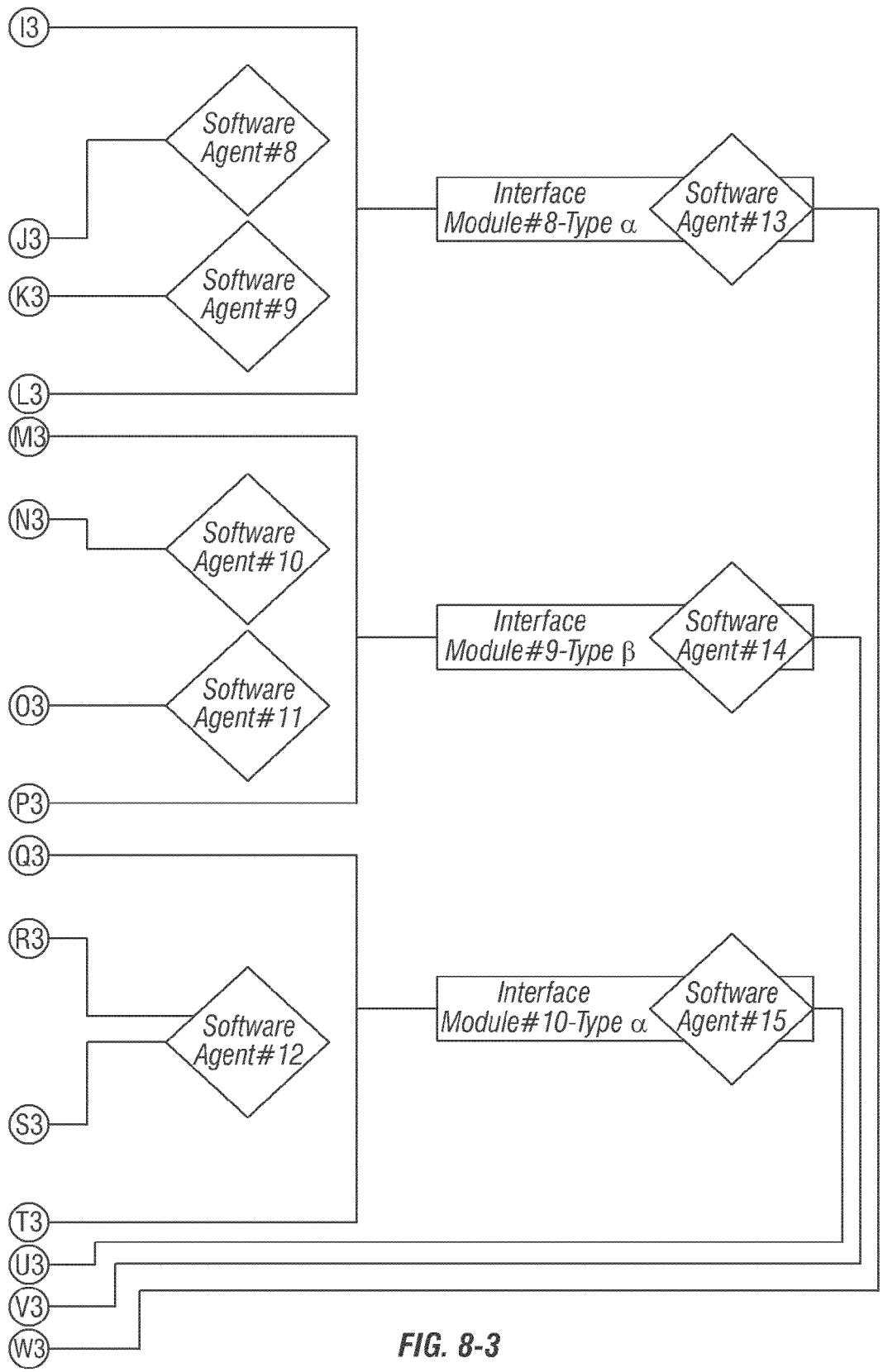

In certain implementations of DIOS, a distributed agent may be configured to be executed on any of the processing devices capable of supporting its processing needs. For example, turning to FIG. 8, several agents in the same system may be split across different processing devices. This may improve or optimize performance, because agents that exchange information frequently (without being dependent on each another) should be placed on the same board for reduced or minimized latency. Because agents may be configured to be mobile and load-balanced for improved or optimal performance, knowing the exact location of any process (except the backbone services in some cases) may be difficult or impossible to predict since agent location is not guaranteed. In some embodiments, it is possible to query and discovery the current location of an agent.

1.2.3 Load Balancing

When a new processing device is added to the system, an existing processing device is removed or goes down, or simply an agent starts using too much processing power, embodiments of DIOS may be configured to automatically detect the imbalance in processing power, and if greater than a configurable threshold (to prevent process thrashing), the Process Managers on the processing devices may swap agents, in a manner such that performance is not impacted, until balance within specifications is reached.

In some embodiments, to address the performance issue, different agents are tagged differently. For example, some are tagged as 'sticky,' e.g., do not move from a certain board, others are tagged as 'group together,' e.g., minimizing the latency for communication. The process manager is able to move some, all, or none of the agents in the group. Additional tags may be defined for more complex implementations of load balancing.

One embodiment of load balancing in the DIOS system is scheduling the agents to run in a particular location. There are various ways of approaching scheduling, but the approach taken in one system embodiment is to define an algebra across the elements being scheduled, and then have a scheduler make decisions and optimizations according to the algebra. Factors that may be useful for consideration include, for example, is the element sticky; how often does it run; how long does it take to produce a result; what other agents does it depend on (and which depend on it). The load balancing process may use such factors and other information to make its decisions and is flexible enough to have new variables defined.

2. Examples of Information Models

In some implementations, all communication in the system is between agents through data model interfaces that are consistent for all sorts of agents. Publishing agents (situated and/or distributed) populate various data models based on a set of features including information type and physical boundaries (both of which could be null or any other value). Subscribing agents (situated and/or distributed) receive all information that matches a set of features based on information type and physical boundaries (both of which could be null or any other value.) As publishing agents come on and off line, the information returned to the subscribing agents changes accordingly based on the available publishing agents. In embodiments of such systems, publisher-specific (whether a publisher is situated or distributed) knowledge need not be required on the subscriber side. In some embodiments, there need not be any subscriber-specific (whether a subscriber is situated or distributed) knowledge required on the publisher side. The subscribing agent may interact with a data model object that returns a set of information (which can be any number of entries, including none if there are no relevant publishers), ordered or not, that matches the features requested. Such system embodiments allow for an similar or substantially identical interface for information regardless of whether the information originated directly from a physical device, is processed information from a physical device, originated from a simulated device, is processed information from a simulated device, or is information from control software.

In such embodiments, by having all information exchanged through a data model, a developer can create a system that is not directly dependent on any device-specific knowledge. For example, in one embodiment, for a system that requires distance information to run properly, a distance measurement producing agent (situated or distributed) should be present. Without such an agent, the system does not have the necessary information (e.g., distance)—regardless of source—on which to function normally. In some implementations, there is no initialization or management of information providing agents: a developer simply specifies a feature (e.g., a type of information or a space of interest) and receives a set of information that is currently available. As the number of producers of this information increases so does the number of entries returned by the data model object. As the number of producers of this information decreases so does the number of entries returned by the data model object. Developers create a system based on information without any knowledge of physical or network topology by simply specifying a set of features. Information is also available regardless of physical location: if the information was originally published on a node that the subscriber is not on, the information is invisibly presented as if it were.

In some implementations, data models may also contain function calls. Function calls in the data object may include query functions or modify functions. Query functions do not modify the state of the object, but only return information about the object. They are run locally within agents that do not own the object that they are part of, which is acceptable since they are not modifying any state. Modify functions are run at the agent which owns the object. The calling agent calls the function within its proxy object, which requests that the function is run within the owner agent process. The function then executes, while possibly modifying the state of the object, and then asynchronously returns the result.

2.1 Default Models

In one example implementation of the DIOS platform, four default data models are used. Illustrative, non-limiting examples of these default data models will be described. In other implementations, fewer or more data models may be used. Functions of the data models may be combined or carried out differently than described below.

2.1.1 WorldModel

This example model is the target for the dynamic information that is shared between agents. This model contains raw information from sensors, extrapolations from data, warnings and conclusions about the environment, task objectives, and records of past events to list a few. Any information that agents share may be organized in this model.

2.1.2 ConfigurationModel

This example model is the target for various device and robot-specific information to be posted to. In one embodiment, this model is created by a single agent, the Configuration agent, and is populated from an XML schema message that the Configuration Agent sends out. The message may contain various configuration values. Other agents may add to this model various calibration and related data, and this may persist to the next running of the system. Because the values of the Configuration Model is provided to the Configuration Agent and/or to other agents, the values are able to be changed at runtime in order to alter the behavior of the system without requiring recompilation.

2.1.3 AgentModel

In this example, there is one AgentModel for each agent. In this model each agent stores any and all variables that it internally keeps track of—both those important to its running and those not. This agent Model may be intelligently synchronized such that important state information is always available on multiple servers so that a failure (hardware and/or software) affecting some or all agents can be mediated by simply having the agent receive the last state update it gave out and rebuild its own state. By storing information in a certain layer, the agent can "send" information between runs of the system so that run-time calibrated variables can persist through restart.

2.1.4 ControlModel

This example model provides an interface for the control aspects of various DIOS services. Control function may include, but are not limited to, system logging, process management, resource management, messaging management, model management, update management, power management of HIMs and devices (including support for processing computers), and data management of HIMs and devices (including support for processing computers).

2.2 Example Model Creation

When designing an agent using embodiments of the SystemBuilder, the developer may decide which fields (or objects) are important to the agent, and "register" (or associate) for those fields in an Information Model Object that the agent accesses. In one embodiment, whether this code is hand or auto generated, the Model Object may be specialized for the specific agent and may use the Messaging Framework which sends out and receives the information of interest, and is not affected by any information not in this set. If a message not of interest is sent though the Messaging Framework, there will be little or no processor time used by the agent to ignore the message. In some embodiments, a new model object may be generated from an existing code source by parsing the existing code source to produce an information representation of the existing code source 2.3 Model Access In certain embodiments of DIOS, by creating specialized models for data access, the process of actually getting and setting the information is rather easy. To use information, an agent simply instantiates the model object, and accesses the information as it would any other object and when changes happen in this object, the changes may be propagated throughout the entire system.

2.3.1 Model Access Example

In one example embodiment, to access (get and/or set) the WorldModel field "Speed" of the Object "VehicleState" under the Refined Layer and Internal group, and object VehicleState, one may make two calls (C++ example):
WorldModel myWorldModel; int l_speed=myWorldModel. Refined.Internal.VehicleState.getSpeed( );
myWorldModel.Refined.Internal.VehicleState.setSpeed (l_speed+1);

If desired, the developer may get a copy of the whole object as well and manipulate it as follows:
WorldModel myWorldModel; VehicleState myVehicleState;
myVehicleState=myWorldModel.Refined.Internal.getVehicleState( );
myVehicleState.setSpeed(1) myWorldModel.Refined.Internal.setVehicleState(myVehicleState);

In this example, it is also possible to be notified when data is updated, so the model supports both a poll and push model. To register for a function in the agent to be called whenever there is an update to a field, for instance the same field as above, the programmer may define a function to be called, where the function name is standardized (C++ example):
private void speedHandler( ) {cout<<"Speed changed";};

In this example, it is also possible to invoke function calls on objects, wherein the function calls may be defined as code instead of as an abstract form. An example invocation of a function to return the latency between setting a speed and the effective increate in speed could be
myWorldModel.Refined.Internal.VehicleState.doSpeedLatencyTest( );.

Additional function parameters could also be specified, such as specifying a time period to sample a latency test, with the form:
myWorldModel.Refined.Internal.VehicleState.doSpeedLatencyTest(90);.

Accessing the WorldModel is relatively straightforward depending on context. In some cases, the AgentModel and/or the ConfigurationModel may change scope based on which project, robot, and/or agent is accessing the models. There are context-insensitive calls such as
myConfigModel.AllProjects.General.SomeObject.getVarOne( );

There also exist context-sensitive calls such as
myConfigModel.MyProject.General.SomeObject.getVarTwo( );
that evaluate 'MyProject' differently dependent on the project.

2.4 Example Model Synchronization

In some embodiments, each agent Process runs in a single thread. Both control activity, and sending and receiving information take place in this thread, allowing for the information model to be updated as information is received. Since updates occur in a single thread, programmers do not have to worry about thread synchronization. In this example, the DIOS agent control flow paradigm provides perceived asynchronous updates to the information model.

2.5 Model Distribution

In some implementations, the example Information Model schematically depicted in FIG. 4 does not actually exist, in its entirety, anywhere on the system. The information agents exchange may be defined as messages that are sent to the messaging server and propagated throughout the system invisibly, creating the illusion that the information exists in some centralized location on each processing board. The actual contents of the Information Model may reside on processing devices where the information originated from and is replicated on the processing devices the system, including some HIMs, in that host agents requiring the information.

Therefore, in some illustrative embodiments, the Information Model may be thought of as a conceptual union of all the partial (custom) Information Models used by each agent, which would exist if all agents were located on a single computer, within a single process. In this way, embodiments of the DIOS framework may be configured to allow agents to invisibly communicate with one another and allows the agent programmer to focus on the agent's task, not the details of information exchange. Also, since this allows for independence from needing to know the sender and/or receiver, an agent can be added to the system that can listen to the existing agents without needing to modify any of the existing agents, e.g., (in some cases) without modifying any existing part of the system's agents' code base.

3. Example Interface Modules

Figure 9:
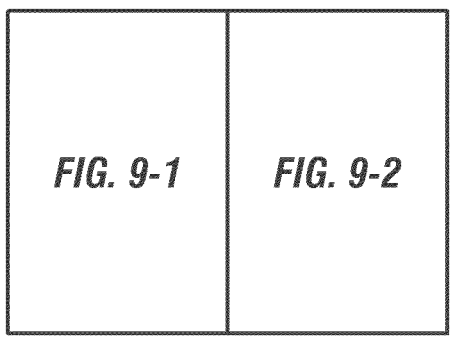
FIG. 9 schematically depicts an expanded view of a second sample system's specific sub-components through which information passes from an input device detection to an output device action.
Figures 1, 9:
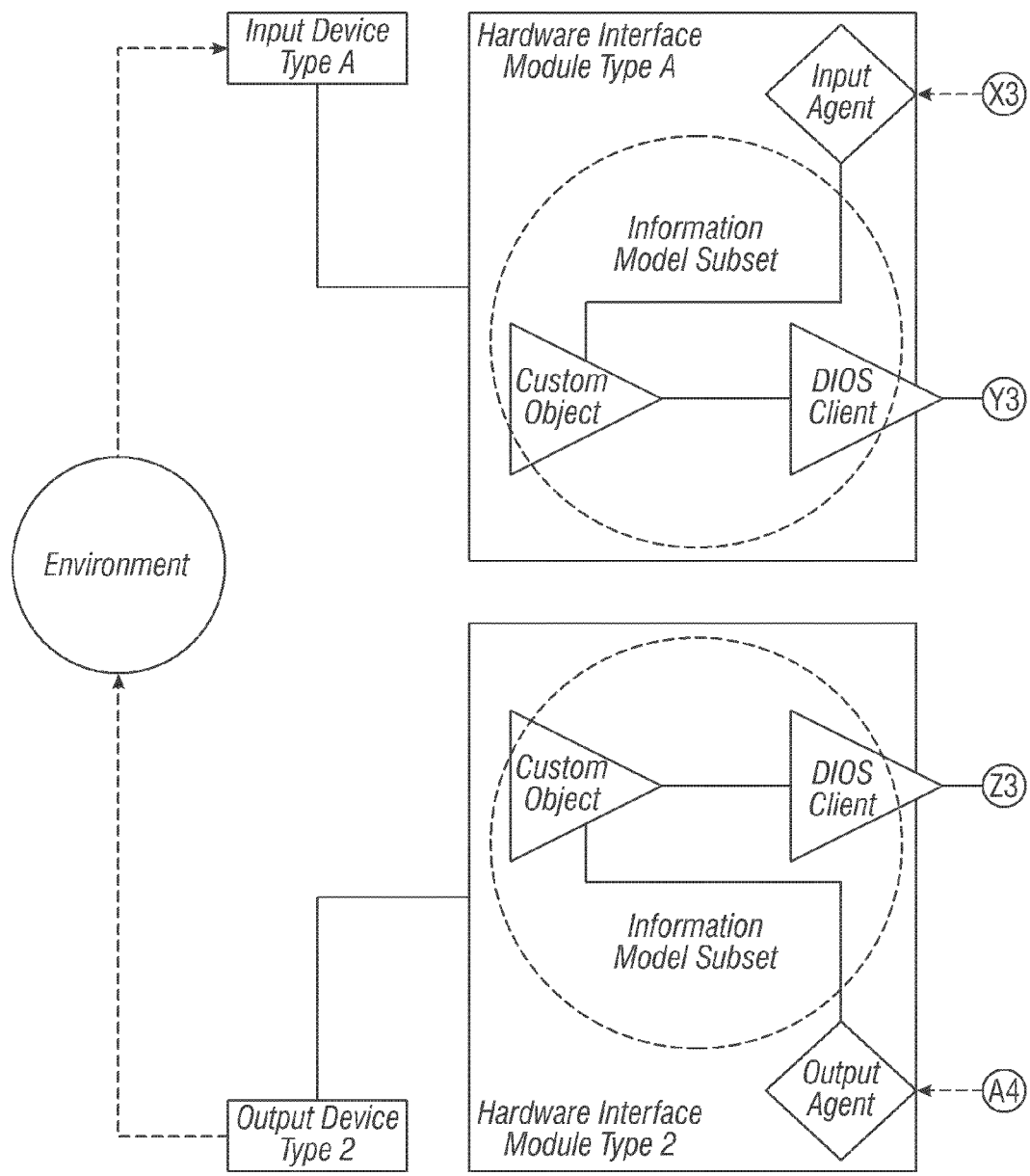
Figures 2, 9:
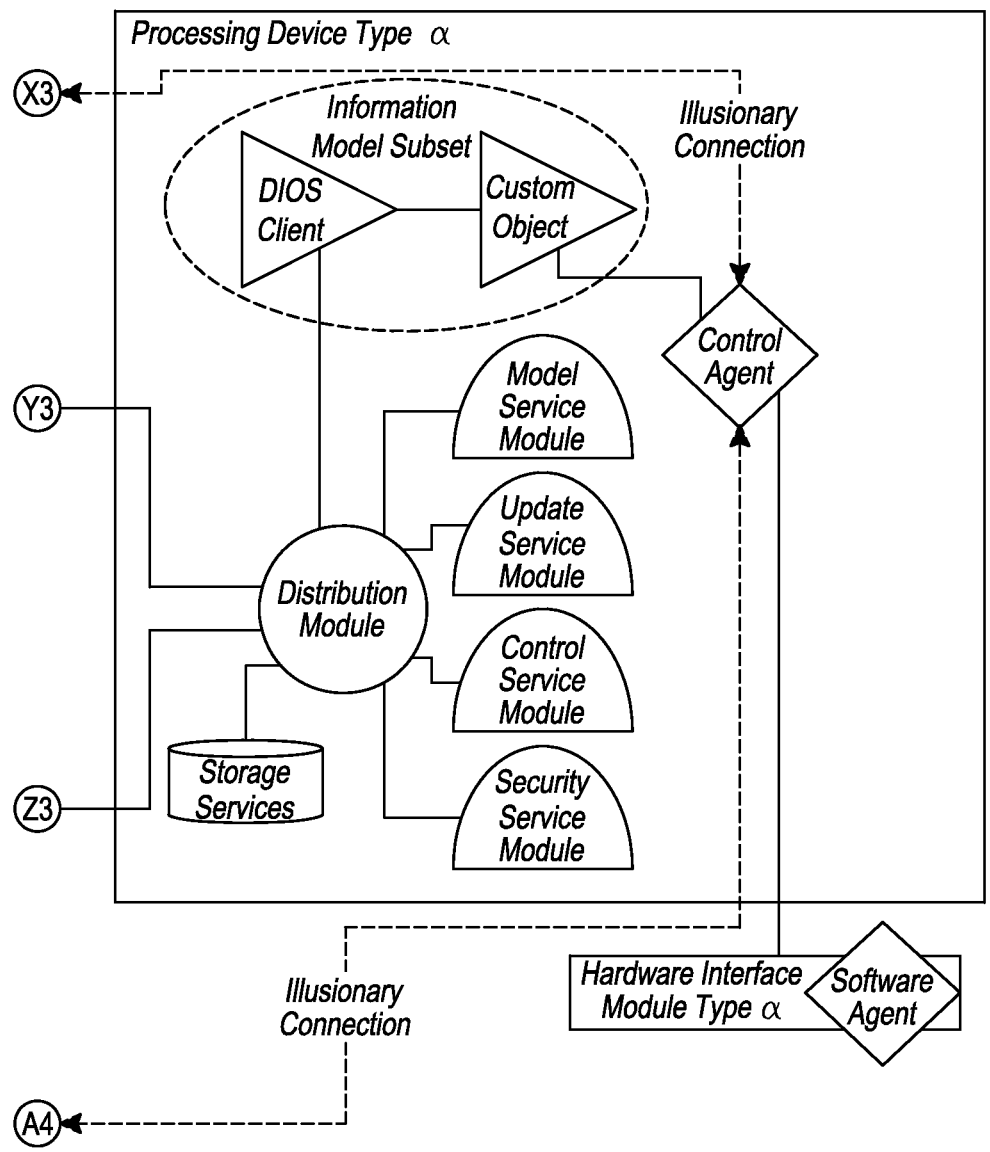
Figure 10:
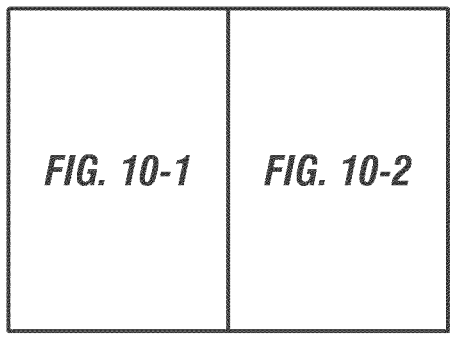
FIG. 10 schematically depicts an expanded view of the second sample system's use of interface modules.
Figures 1, 10:
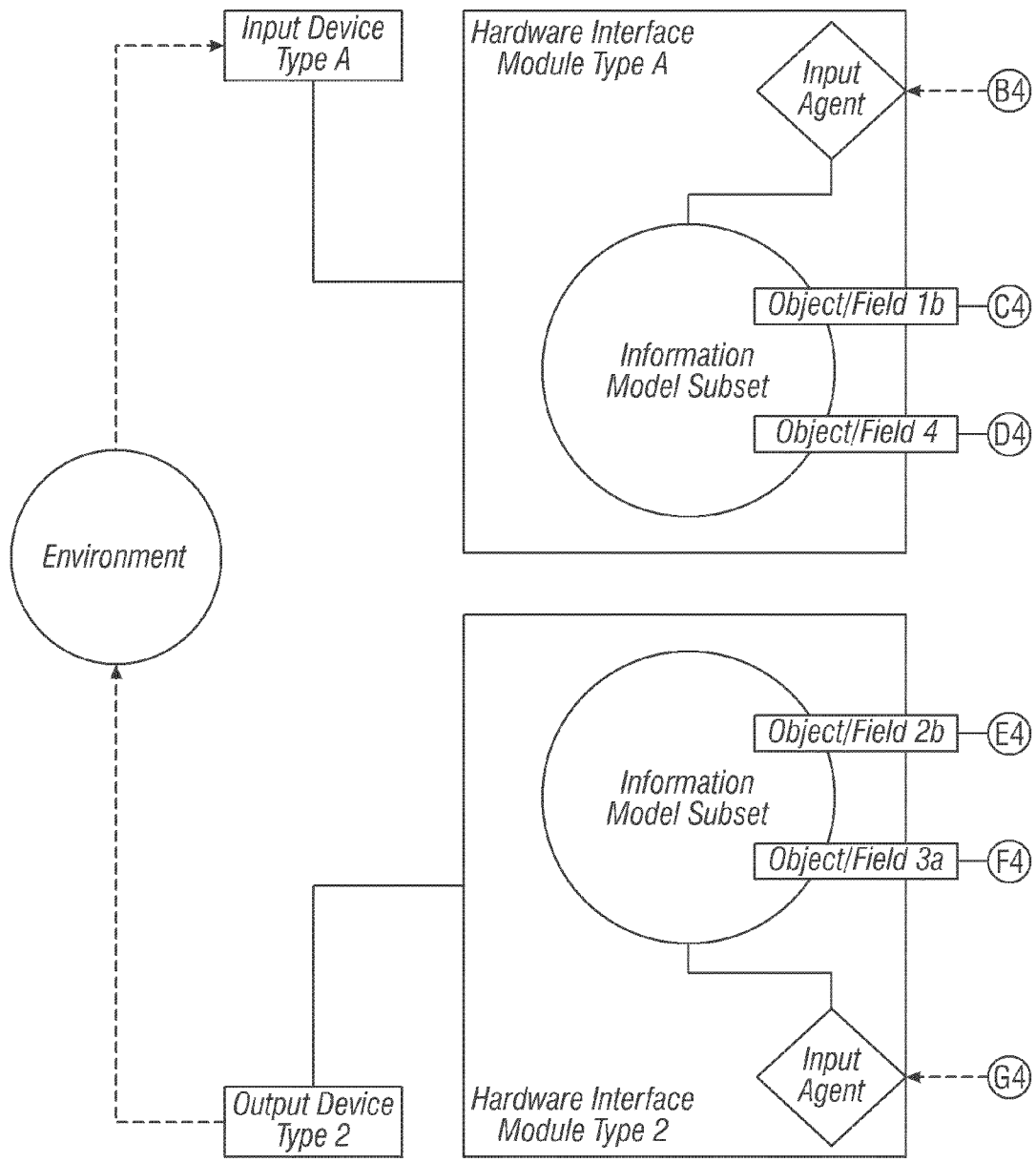
Figures 2, 10:
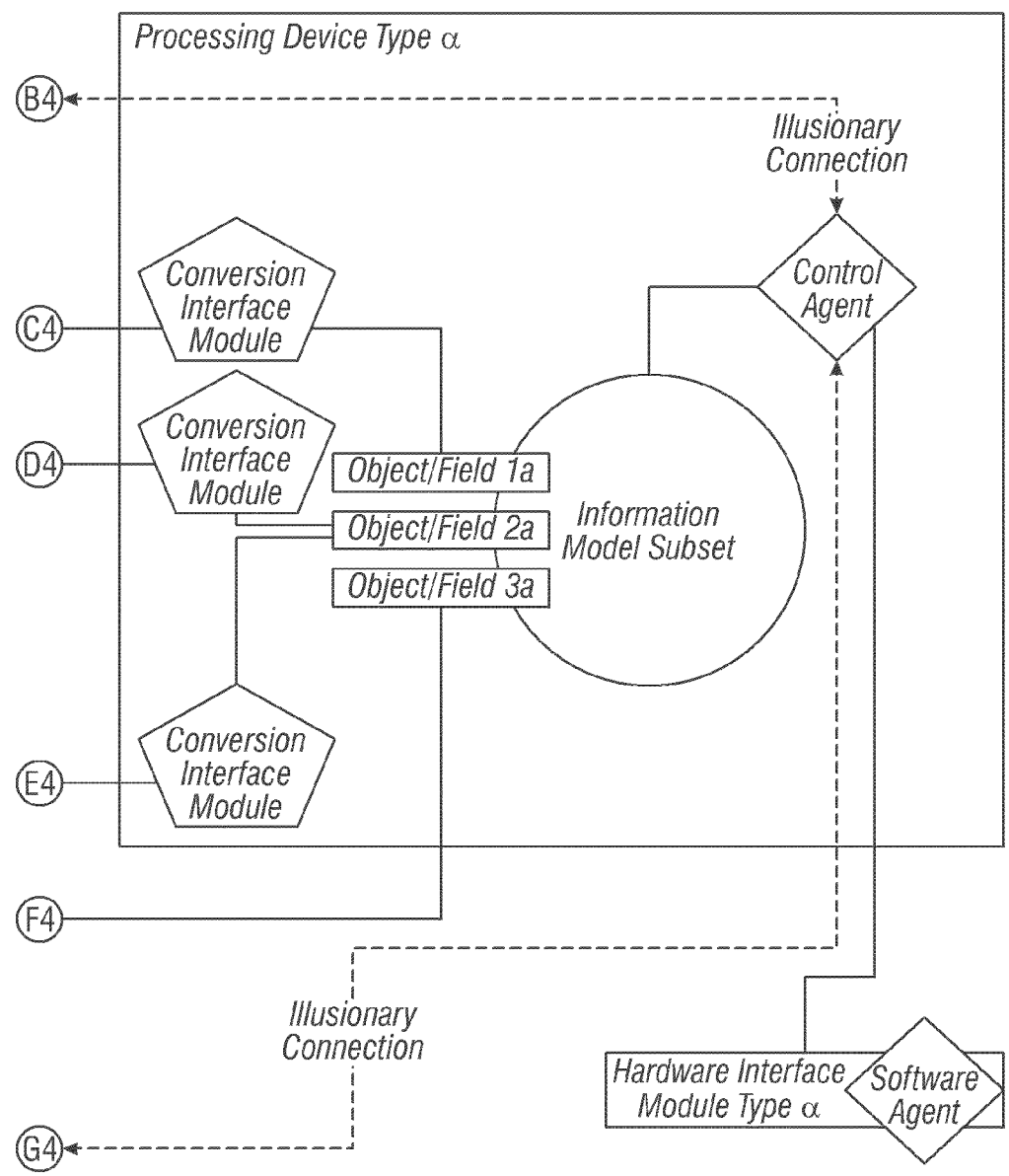
Figure 11:
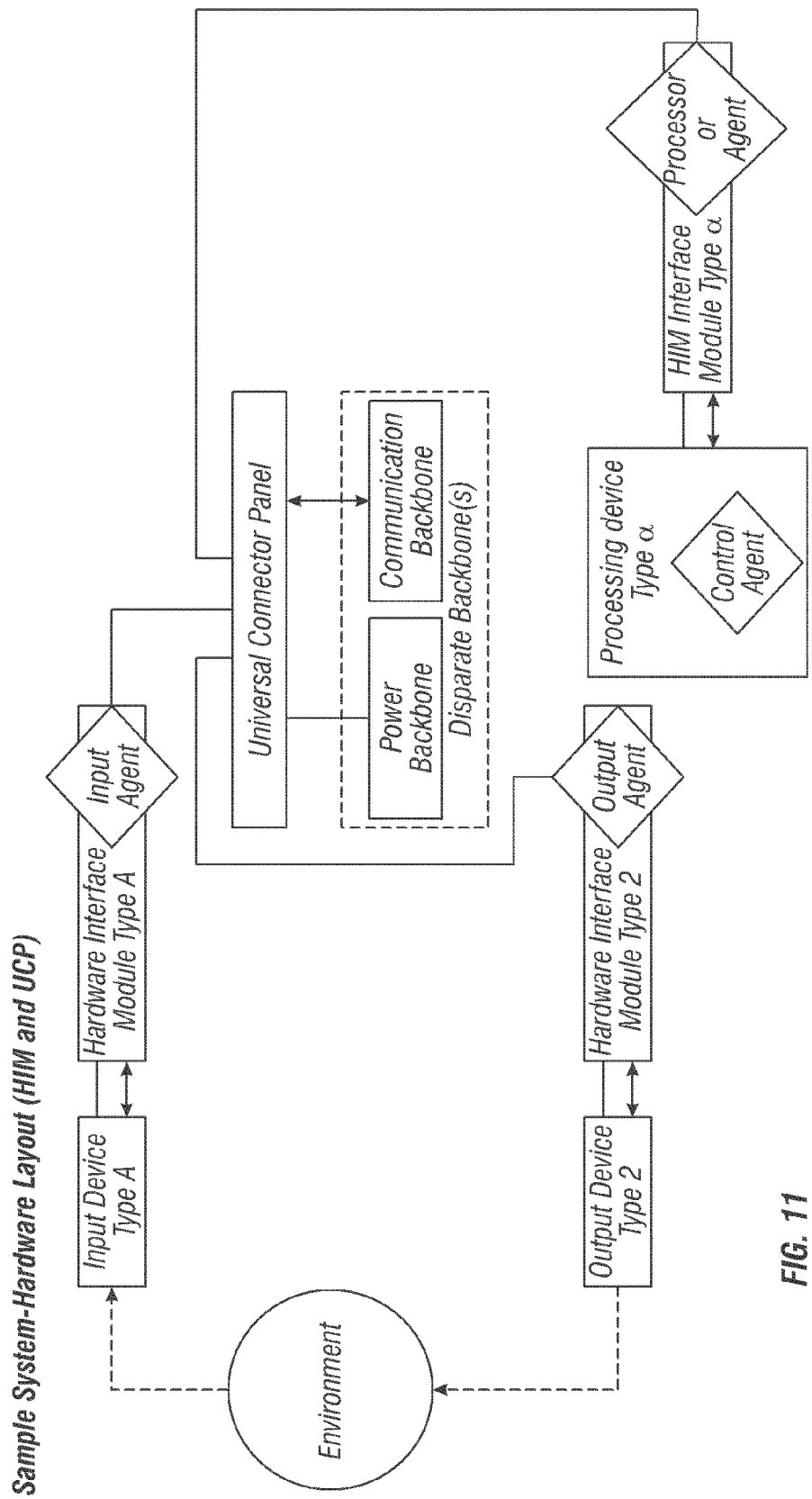
FIG. 11 schematically depicts an example of a hardware layout of the second sample system.
Figure 12:
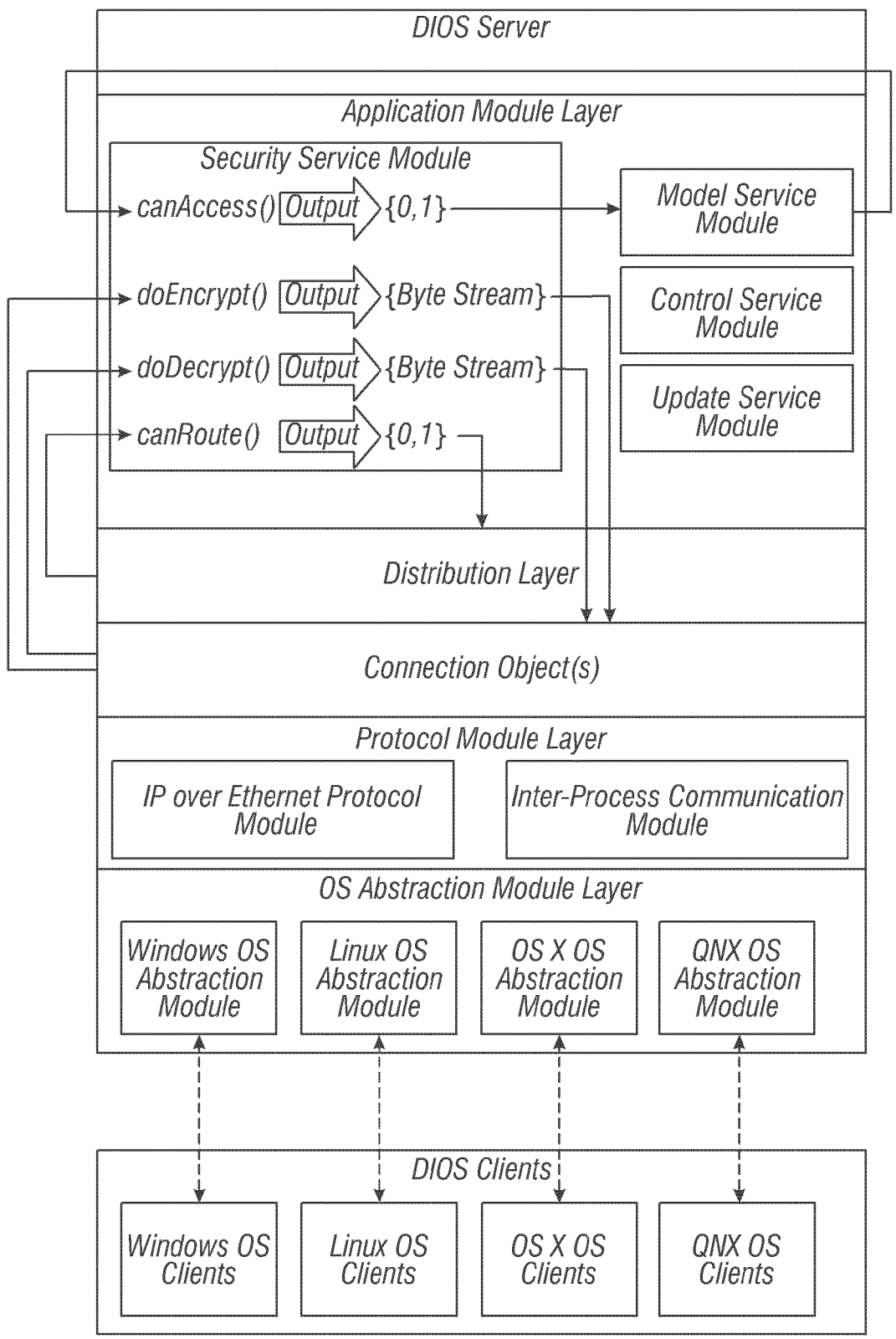
FIG. 12 schematically depicts an example of an architecture for an embodiment of a DIOS Server-Client.
Figure 13:
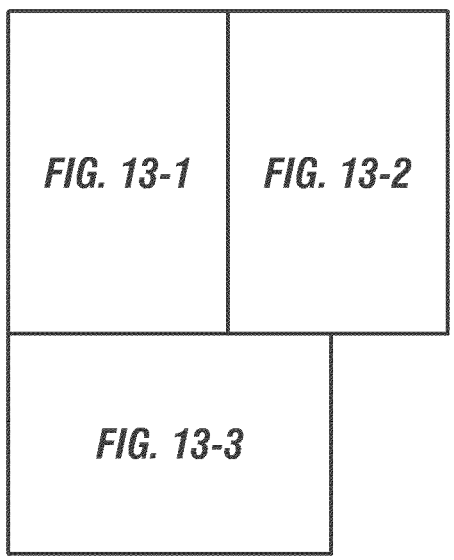
FIG. 13 schematically depicts an example embodiment of a Hardware Interface Module architectural design.
Figures 1, 13:
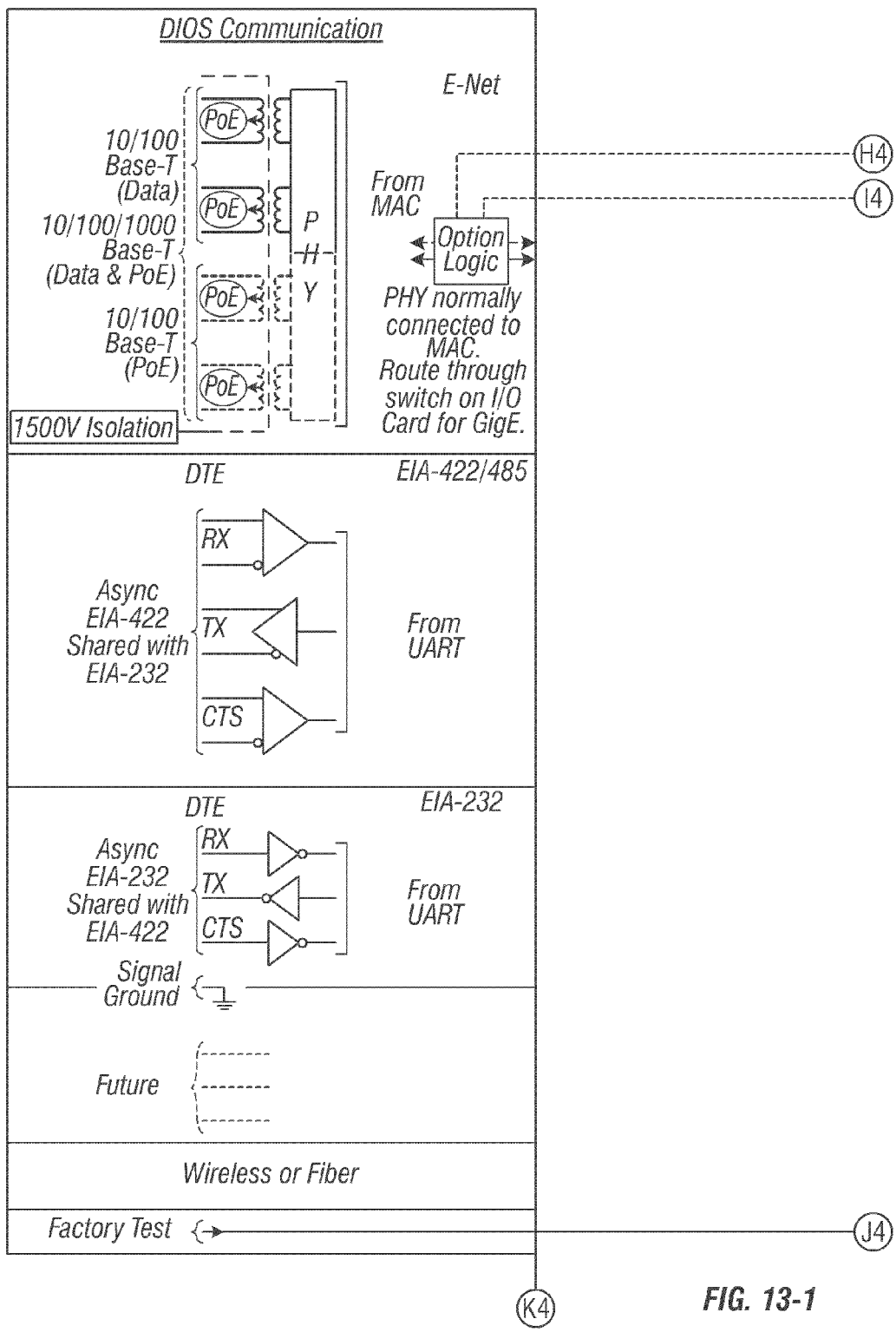
Figures 2, 13:
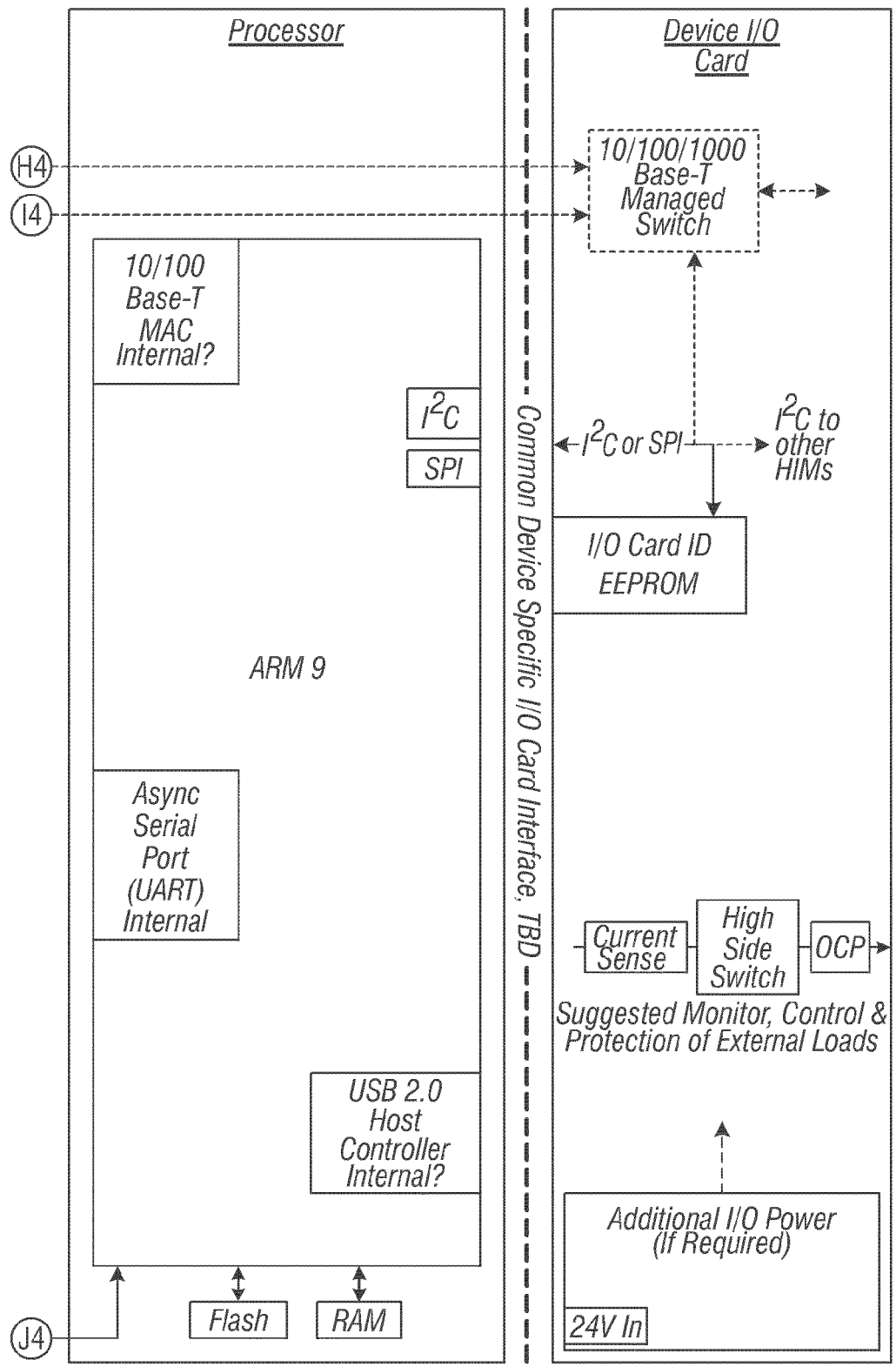
Figures 3, 13:
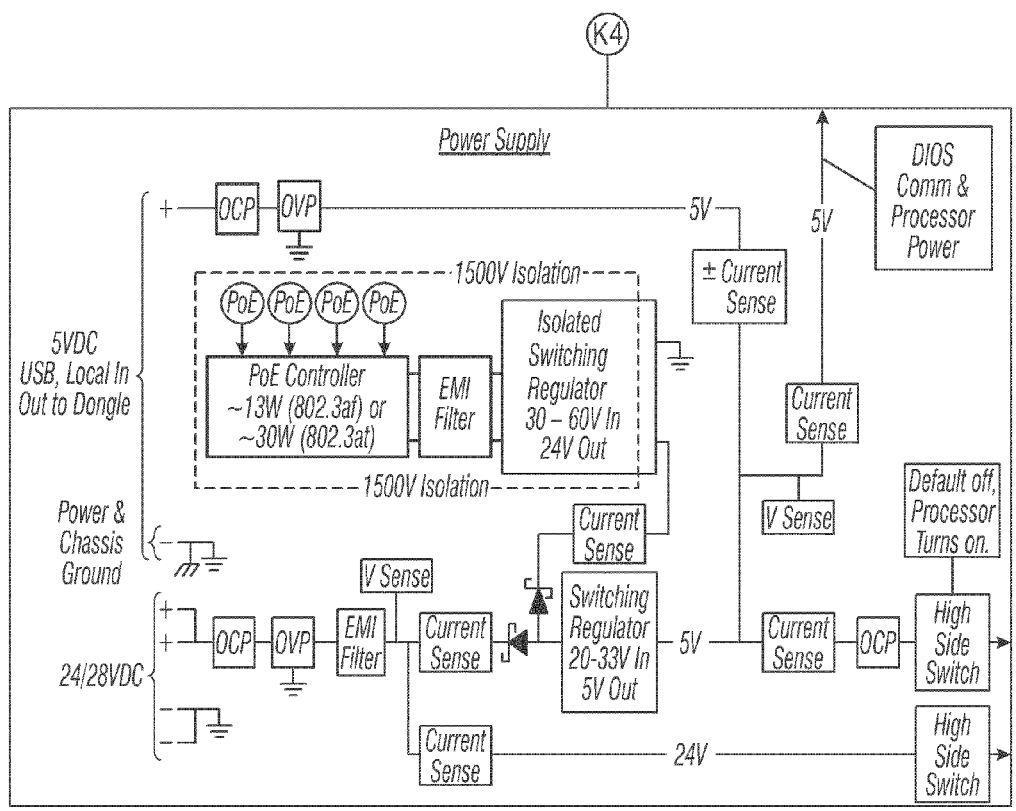
Figure 14:
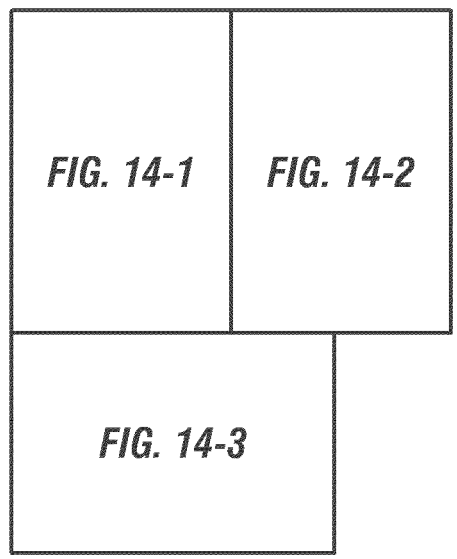
FIG. 14 schematically depicts an example embodiment of a Universal Connector Panel architectural design.
Figures 1, 14:
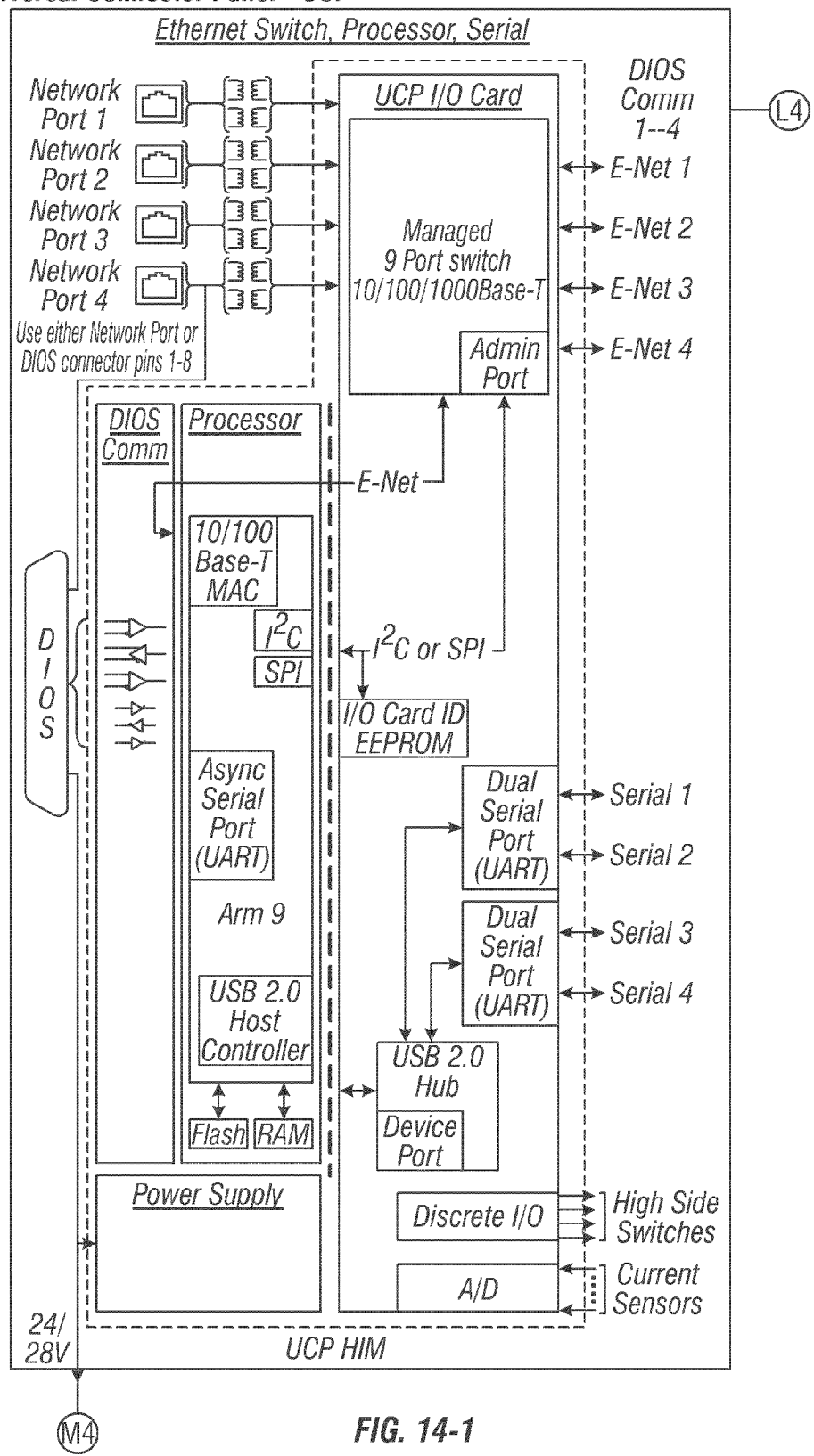
Figures 2, 14:
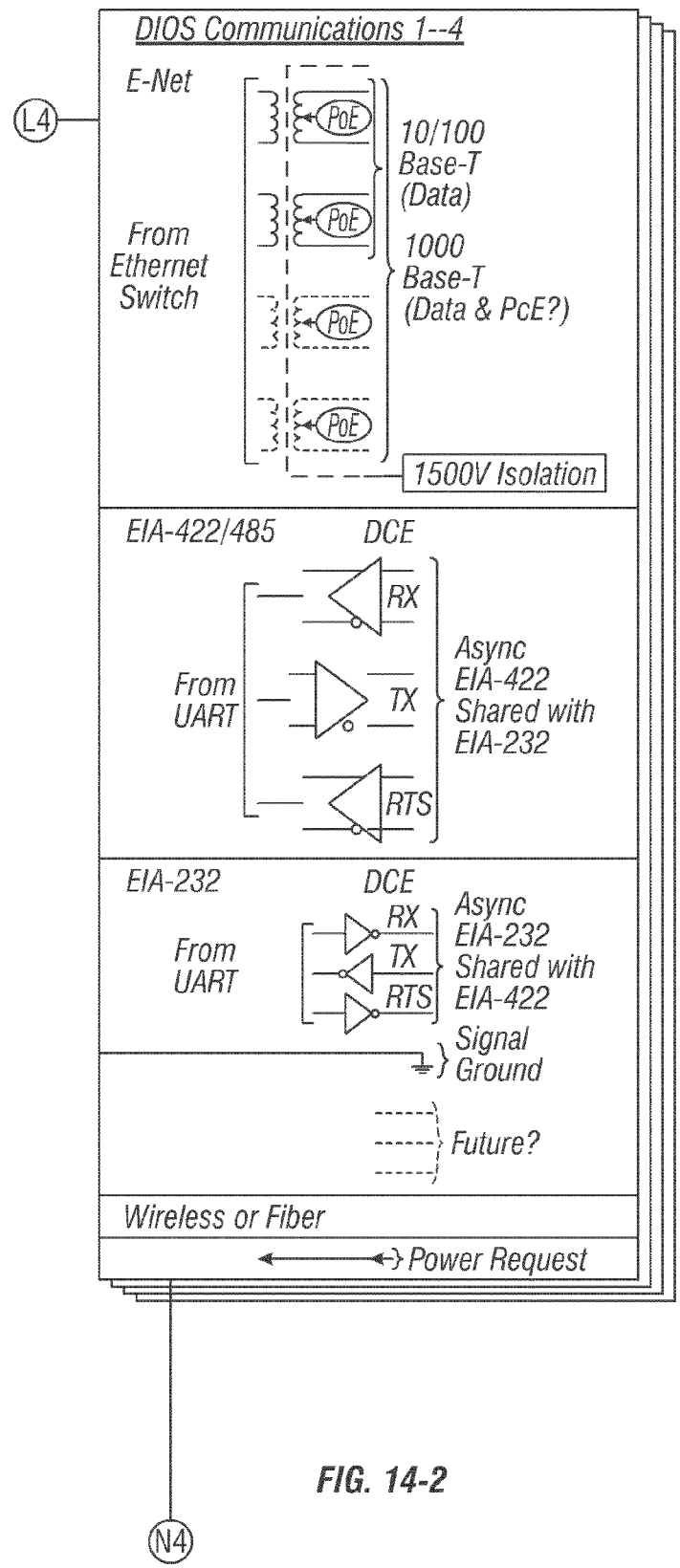
Figures 3, 14:
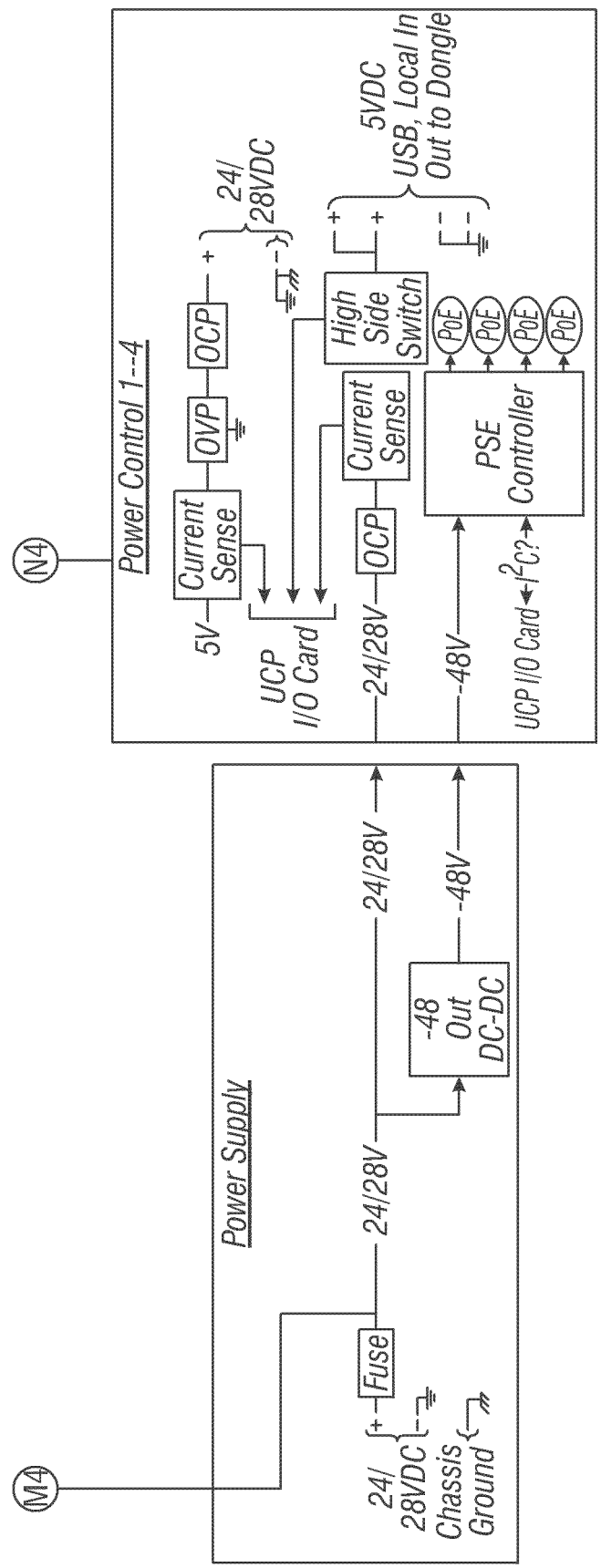

Interface Modules may include, for example, Hardware Interface Modules (HIMs) to abstract specific hardware or interface with legacy systems in a non-invasive manner, Legacy Interface Modules (LIMs) to abstract existing legacy software systems and services, and Virtual Interface Modules (VIMs) to abstract simulated components for testing and simulation purposes. Examples of such modules will now be described. FIGS. 9-11 schematically illustrate sample systems using interface modules.

3.1 Example HIMs

In some embodiments, Hardware Interface Modules (HIMs) are specialized agents in hardware. A HIM may be used to connect a hardware device to a DIOS platform. Whether the device is an output device, e.g., a device that produces some action in the physical world (for instance a motor), or an input device, e.g., a device that measures some property of the physical world (for instance an odometer), it may be accessed and used through a HIM. A HIM acts as a communication abstraction from the device behind it, so that the specific means of communicating with the device does not need to be known. To access the device behind a HIM, the Information Models and standard Messaging Framework may be used, which advantageously abstracts the hardware away from the rest of the system. A software agent may run on each HIM and may accept various information provided by other sources and/or may also provide collected data about the real world, and/or may produce an action in the real world (e.g., input vs. output). The HIM agents may look different in implementation than the software agents depending on the specific style of device (e.g., interrupt based, event based, functional, etc).

One possible example of a HIM implementation comprises a standard board and a device specific board. The standard board includes a processor and communication modules (e.g., Ethernet) that allow it to communicate with a DIOS server. The device is attached to a device-specific board, which provides power to the device and has the appropriate interface (e.g., USB, firewire, etc.) to communicate with the device. The standard board may have a generic high speed interface to the device board in order to communicate with whatever interface hardware is implemented on the device board. The standard board also may have a power supply which accepts, for example, 24/28V power and produces 5V power to run the circuitry while also passing the 24/28V power to the device board. A device board would then have circuitry to convert the 24/28V power to whatever voltage it needs to power its device. In the absence of 24/28V power, embodiments of the standard board can power itself using Power over Ethernet, but can only supply minimal power to the device board.

An agent running in the processor on the standard board is able to use the device specific boards communication interface to either receive or send data to or from the device. The agent may publish and/or subscribe to objects in the information model. In one embodiment, a HIM does not run a DIOS server, but instead connects (using a protocol like TCP/IP) to a DIOS server running on a computer somewhere on the same communications medium (e.g., network).

Figure 15:
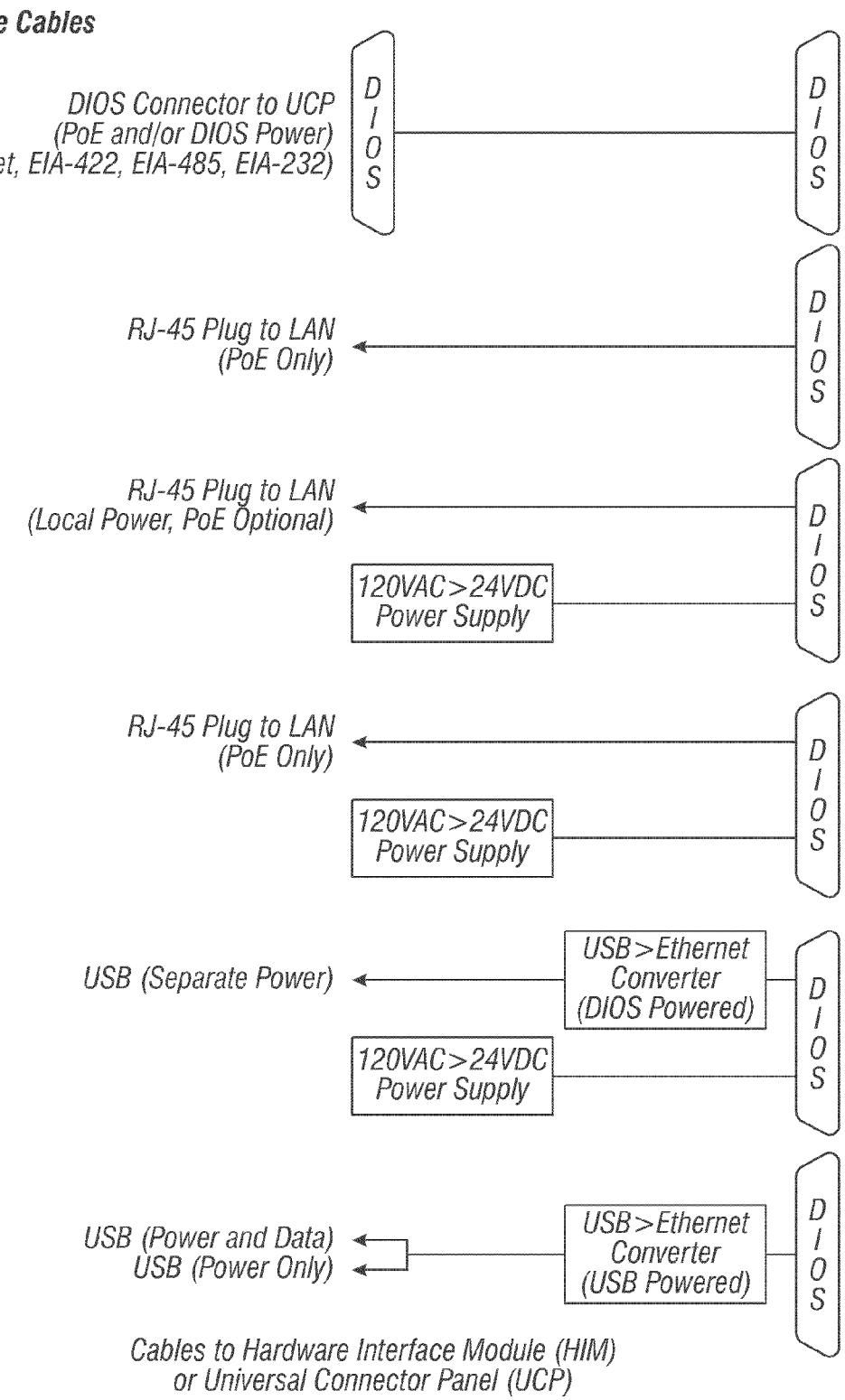
FIG. 15 schematically depicts example cables used by embodiments of a Hardware Interface Module and/or Universal Connector Panel via an embodiment of a universal connector.

A HIM may be connected to a Universal Connector Panel (UCP) via a standard cable with standard connectors (see, e.g., FIG. 15). Proprietary cables may be used in some embodiments. The UCP supplies power to the HIM, as well as a data connection. An advantage of such an implementation is that it allows a new or replacement device to be easily attached to a system as long as it conforms to the standard interface. The UCP itself is connected to a communications network so that the HIMs may communicate with the rest of the DIOS system.

3.2 Example LIMs

In some DIOS implementations, Legacy Interface Modules (LIMs) are agents which interface with existing legacy systems. A legacy agent does not necessarily contain the same messaging loop and timing functions as a traditional agent, because the LIM may need to integrate into an existing control loop. The SystemBuilder will provide the user with a customized DIOS interface file in the specified language (as well as other characteristics) and function calls into that file that need to be inserted at key points in the legacy system, along with instructions pertaining to where they need to be inserted. Information Model files will also be created, in substantially the same way they are created for traditional agents. In one example implementation, the user can insert function calls to implement the following functionality in the legacy code: (A) Information Model initialization, which initializes the DIOS client's connection to the DIOS Server. This may occur at the same time the legacy system is initialized. (B) Information Model synchronization, which receives any updates to the Information Model from the DIOS Server. This may occur from time-to-time or at period intervals, with the period being as often as the user desires their information model to be synchronized.

The user will also be able to access and write information into the information models from within their legacy system in the same manner as they would in a traditional agent. The generated DIOS interface file will also contain any registered callback functions to offer event-driven capabilities to the developer.

3.3 Example CIMs

In some embodiments, Conversion Interface Modules (CIMs) are a set of functions, in one embodiment implemented as agents, that convert between multiple forms of an object and/or between multiple objects in the Information Model. A user defines a CIM in the SystemBuilder by either specifying that an object has multiple forms (e.g., different data structures, different dimensional units, different names for fields, different formats, etc.) or by selecting two or more objects and marking them as equivalent. In some cases, multiple forms of an object may have incompatible properties including, but not limited to, a programming language, an operating system, a hardware architecture, a security model, and/or a network topology. The SystemBuilder is then able to allow a user to select the conversion functions that they wish to define, and which language in which to define the conversion. For a set of two objects, two conversion functions may be defined (A→B and B→A). If the conversion functions are transitive, then if there are three objects, then only four conversion functions need to be defined in some cases, rather than six (e.g., A→B, B→A, B→C and C→B as opposed to A→B, B→A, B→C, C→B, A→C and C→A). Given a reduced or minimal set of conversion functions, the CIM will automatically figure out how to chain them together to convert from the input to the desired output. In some embodiments, if there are two forms of an object (a first form and a second form), and the first form has a first property and the second form has a second property that is incompatible with the first property, then the system may convert from the first form to the second form without needing to match either the first property or the second property.

In some implementations, each conversion function takes the object it is converting as an argument, and returns the desired output object. A user may supply in the body of the function with any necessary logic to convert from one form of the object to the other. Once the user has defined all of their conversion functions in their language of choice, the CIMs are deployed to the system and are usable from agents written in any language and running on any architecture on any processing device in the system, though this use is not explicitly known by the agent(s). When an agent publishes an object in form A, any agents that are subscribed to objects of form B will automatically receive the converted object. In one embodiment, the conversion between the two (or more) forms of an object may be automatically generated by a module that determines relationships; one example is converting between two fields with the same name but implemented as an int and a double, though this simple example is not intended to limit more advanced mechanisms such as statistical analysis of message exchange or artificial intelligence.

3.4 Example VIMs

In some implementations, a Virtual Interface Module (VIMs) is a specialized agent that is tagged to represent a typical agent but is to be used for testing and simulation purposes. The purpose of VIMs include, but are not limited to, testing a resource-dependent (e.g., simulating a hardware or external system) complete system offline to determine problems or testing any complete system online where individual components are tested for correctness and performance within the running system without adversely affecting the remaining running system. In such cases, VIMs may only communicate with other agents that have been configured (in one example DIOS Server such that agents do not to be re-compiled) to explicitly receive VIM agent information. In other cases, the information of VIMs is still published in the same manner as other agents, but the change to the relevant objects is not propagated.

4. Agents

In some implementations of DIOS, an agent is a functional unit for control. Using an agent-based approach, DIOS embodiments are able to easily integrate some or all of the following functions: self-healing, recovery, and dynamic hardware and software allocation of resources to the platform, as well as other functions. In various implementations, an agent in a DIOS platform may be described by some or all of the following example design properties. Agent embodiments may have other design properties in other implementations.

1. Simple: agents perform a single, simple part of a larger task: when chained with other agents a very complex behavior can be created from simple functional units.
2. Autonomous: agents have their own user-defined motives that determine their actions and internal state without direct intervention from external sources.
3. Social: agents listen to data given from other agents and give back results for other agents to listen to, without needing to necessarily know the address or unique identity of the sender and/or receiver.
4. Reactive: agents perceive their environment (e.g., area of responsibility) and act dynamically based on how their information of interest changes.
5. Proactive: agents do not simply respond to their environment, they also take initiative that is not preceded by some outside factor.
6. Consolidating: agents may receive updates to data at various times, but primarily only send out processed data (e.g., consolidated summaries) at suitably timed intervals, except in certain event-based situations.

In some embodiments, an agent is an implementation of a behavior and is not necessarily a software design principle. For example, the agent may be a hardware design principle. In effect, inside each agent resides a control system implemented with the purpose to produce a behavior that the agent is responsible, e.g., whether providing sensory information to the rest of the system, formulating plans based on sensory information, or affecting control actions based on formulated plans, etc. Non-limiting examples of properties that may be used for various embodiments of agents will be described below. Not all agents need implement each of these properties. Agents may implement additional and/or different properties. None of these example properties is required for an agent. Many variations of agents may be used in embodiments of the DIOS systems and methods.

4.1 Simple

In some implementations, an agent implements only a small fraction of the functionality of an entire system. The main advantage of this is that functionality can be compartmentalized and an agent can be swapped for another version or implementation of the agent without affecting the rest of the system if the same functionality (the agent produces the same information) is maintained. This example approach is also highly extensible and upgradeable because forcing the implementation of a system into smaller parts allows for a chain of command to be established. When a given agent is to complete some task, it makes its own decisions about how to do so and how to handle unforeseen problems. However, if a problem is encountered that spans beyond what the agent can handle, it can "push" this problem to some other unknown (to the "pusher") agent whose specialty is to solve the problem by raising a flag that another agent listens for.

By separating out un-related functionality to another agent, each agent is easy to understand and its purpose is unobstructed by tasks that are not its area of specialty. In this way the solution is crafted in one place and can be used whenever that same problem occurs instead of being re-created in several different agents. By "pushing" the problem to an agent that is listening for the problem, whose specialty it is to correct the problem, we can increase the likelihood that decisions on what to do are made by those best able to do so and not re-solved over and over again.

In this example, each agent has a functionality that it is responsible for and is not responsible for functionality beyond that; any new functionality that is to be added to a system, so long as it is not a correction of improperly implemented functionality, takes the form of a new agent and not a modification of an existing agent. Each agent may be a specialist in a very small problem domain.

Keeping agents simple and "pushing" problems to those who can best handle them effectively creates exception handling for robotic control systems. When an unknown event (exception) is encountered that the agent cannot handle, it passes it to an, albeit anonymous and not guaranteed, exception handler.

Although an agent may be designated as representing a single component, it may in itself be complex in how it accomplishes its simple task.

4.2 Autonomous

In some implementations, an agent may be thought of as a single entirely self-encapsulated module that exists without necessarily requiring any external support or dependencies. An agent defines certain information that it uses to do its job and also identifies certain information that it produces after completing its job. An agent is autonomous because it can make its own decision about what to do without interaction with a human or another process, e.g., it can still use external information as long as it is at its own discretion. Except for Supervisory agents (if used) that oversee the status of other agents, agents generally do not rely on a priori (built in at compile time) knowledge of other agents. Agents do assume that there will be other agents to interact with (something is producing the data accessed), so the rules for these interactions may be built into the agent.

Agents can be tested without any dependence on any other agent as it makes its decisions based on the information it uses, its "environment," not an outside decision maker. This modular property accelerates the development process, and allows for new functionality to be added to the system (potentially) without having to modify any existing agents if their interface with the system is kept intact with the system guidelines. In some cases, an agent is similar to an Object in the object-oriented design sense, but, different from an Object, an agent may self-regulate over time and evaluate its situation even when not being told to.

Agents may be configured to have control over their internal state so that data changes in the rest of the system do not affect an agent, they only affect available data. Agents can choose to only consider data each timing interval (see the "Reactive" subsection below for more information on timing intervals) or can register to be notified each time a value changes. Depending on internal requirements, an agent can act on or ignore the change in data and update its state or continue on as if nothing happened. Except for Supervisory agents (if present), an agent may not be able to force a change in another agent's state unless the second agent chooses to listen to (it is implemented such that) a specific message from the first agent that elicits such a change. Information, from the agent's point of view, is simply accessible, not accessible from a specific source, such that if an agent that populates some information is replaced by another agent that can do the same job, the original agent may never have knowledge that a change occurred at all. Each agent is its own "protected process" that is not modified directly by any "other process".

Note that autonomy may be different from the distributed nature of the DIOS system. In some implementations, an agent is not autonomous because it is a separate process but rather because its actions are not directly influenced by any outside entity: an agent may have complete control over its state.

4.3 Social

In some implementations, an agent may communicate with other agents in order to access the information used for doing the task at hand. It does not matter to an agent how the information it needs comes into being. How to discover other agents is handled by the Messaging Framework. Agents can exchange information with each other and gain knowledge about any other agent on the system if requested.

In some implementations, information is shared between agents and each agent does not need to (necessarily) care where or how the information gets to the agent, nor (necessarily) who gets the information it sends out. Agents may use an abstracted way to access data that does not require knowledge of the rest of the system. In some DIOS embodiments, Model Objects that agents may modify and access are updated and synchronized behind the scenes.

In some embodiments, the source of information can be found if so desired. An agent advantageously should not be dependent on information from a specific other agent. An agent may in some case not assume that some data is specifically tied to some other agent, but it can query the source of the data and process it specifically along with various other metadata.

4.4 Reactive

In some implementations, an agent may perform a task if it has access to information. As information changes, the specific work the agent does may change. However, an agent may not be implemented in some cases as a simple data transform. Agents may (but are not required to) have an imposed time limit to do their work. Agents may (but are not required to) be given a timing interval (e.g., time deadline) for which they may produce information for others to use. In some real-time systems, the luxury of taking as long as needed to process information is not an option. An agent's timing interval (if used) may be determined by how frequently the data needs to be updated for the system to function normally, e.g., how much time can elapse between updates before an unacceptable error occurs. In some cases of event driven processing, a process may not be scheduled to operate periodically, but rather operate when an event happens, such as, e.g., an update to data. If an agent does not complete its work during the specified timing intervals (periodic or from event occurrence), warnings may be given and used during development to determine if the agent needs to be made simpler (e.g., have functionality moved into another agent).

In some illustrative implementations, an agent may be considered as situated, the agent does work depending on its environment. When new information about how its environment has changed the agent may use the information to form a new internal state and act accordingly.

4.5 Proactive

An agent may be implemented not merely as a function that has a deterministic output that loses state after each call, the agent may be configured so that it can remember the past and can look for patterns over time. If an agent expects some pattern of the data to occur, but it is not updating according to prediction, the agent can choose what to do about it. Dependent on the agent, it may be able to handle the problem on its own or push the problem to another agent to handle it (as described in the "Simple" subsection above).

An agent may be configured to predict what future input should look like based on what has already come in. If data from some hardware device is expected to fall within some reasonable limit but the data, although not unreasonable, is failing to comply with the expected changes, a warning can be sent out or an action can be taken on the part of the agent before the data is completely useless Likewise, if an agent expects that certain information is supposed to be updated on some regular basis but it has not been, then it can also send a warning about this issue.

In this manner, an agent may be implemented so that the agent does not just process the data it is given but also "questions" and analyses it for problems. If problems arise that it can correct then those are dealt with, and for those that are becoming a problem or have become a problem, the agent can change from its normal task of processing the data in question to attempting to correct the problem or find someone who can (by posting the problem).

In some cases, agents do not need to be told to solve a problem in order to start solving it, they can detect changes in their environment and act of their own accord to solve it. An agent is told higher level objectives and does not need to be told low level commands. An agent takes action because it was told something of interest has changed (e.g., to simulate proactive behavior, polling may be used based on its timing interval change) and the action it takes may be so loosely related to the stimulus that, looking from the outside, the agent is exhibiting a proactive behavior. In some cases, agent embodiments are not only data driven but also re-evaluate their surroundings and, upon detecting a problematic pattern, will actively try to correct the problem or notify some other agent that there is an issue.

4.6 Consolidating

In some implementations, an agent is not only data driven: it will run and decide what is to be done based on available information and not just on information change. Agents may have timing intervals that indicate when they are to finish their task and update the information they provide. In some cases, aside from emergency situations, this is the only time that an agent should send out information. An agent does not only consolidate information by reducing the forwarding of information, but also by sending out processed data that is more refined than that which it takes in.

An agent's task, for example, may be to complete the work assigned to it by the system designer, use whatever information it needs to do so, and report back with summary information that is of a less granular and more integrated form than the lower-level data. Some or all agents in the system may finish within the specified timing interval. If a system of agents is consistently unable to finish within the specified timing interval, (which may be caught at design time), a Scheduler can slow down (e.g., elongate) the timing intervals of some or all agents. The effects of elongating the timing interval may affect the capabilities of the robotic control system, and as such, if agents are configured to be simple, an agent is responsible for coordinating any new constraints added to the operation of the vehicle when running at a reduced system speed (e.g., increased time delay).

In some cases, an agent's output is its synthesis; the output is created with received data from other agents along with its own knowledge, then put through a consolidating algorithm.

Although various examples of properties of agents have been described above, agents may be implemented differently in different embodiments. Also, some or all of the properties described above may be implemented differently. No single property is essential for operation of system embodiments. Agents may be programmed to have any suitable combination of the properties to meet the needs of a particular system implementation. Many variations are possible.

5. Example System Tools

In order to simplify the creation and/or modification of a DIOS-enabled system, several graphical user interface tools are provided. In various implementations, some, all, or none of these tools may be utilized. Many variations are possible.

5.1 Example SystemBuilder

In some embodiments, the SystemBuilder provides an interface allowing the user to edit the information models and agents in their system. The user is able to define an information tree containing data objects at various points in the tree. The data objects can be specified to have multiple formats, and functions to convert between the formats can be specified in any supported programming language (for the CIM). They are also able to specify that two different objects are equivalent to one another, and then define the conversion functions. The user is able to associate metadata with an object, which describes the data that the object contains. An example of this could be a trust value, which indicates the level of trust that should be placed in the data.

Once the information model has been created, the user is able to define a number of agents. Objects can be associated with the agents for publication or subscription via a drag and drop interface. The user may also specify the platforms supported by the agent, and which programming languages it will be implemented in. Once a system has been completely specified, the user is able to generate the necessary code for their agents and then build them from within the SystemBuilders interface.

5.2 Example SystemManager

In some embodiments, the System Manager provides the capability to dynamically map the topography of a running system and visually display it. Topography refers to the physical and logical layout of the components of the system. The topography can be captured and stored, and components can be manipulated either on or off line. The components in the topography includes servers, nodes, and devices. The manipulation capability may be like self-balancing optimization except that the manipulation does not have to create an optimized or balanced layout. The typical suite of Move, Add, Change (MAC) features may be supported. The SystemManager may be instrumented for Information Security (e.g., Authentication/Authorization, Encryption, and Access Control) in order to regulate the use of features that could potentially damage a running system. Health Management may be a part of the capability of the System Manager. Health Management may include the ability to snoop on the messages in the system. The System Manager embodies configuration management—like the System Builder, but is primarily used as an operator tool—as contrasted with the designer tool that the System Builder is.

5.3 SystemValidator

In some embodiments, the SystemValidator is a tool to aid in the validation of an application which has been developed using embodiments of the DIOS platform. The SystemValidator can be configured to embody criteria for international standards such as D0178B and ISO 15408 (Common Criteria). The SystemValidator can be used by certifying labs as an aid in determining whether a configured DIOS application is safe, secure, etc. The SystemValidator uses statistical methods to certify that a non-predictive agent based system as configured and evaluated, will operate in a safe or secure fashion. In some implementations, validation takes place at each step of the DIOS development process, e.g., design, code generation, configuration, and deployment. Hardware, firmware, and components of other SystemTools are leveraged for validation. A configured and running application that has been developed for DIOS can be validated using agents deployed in validation mode, and with "helper" agent tester agents. Through stepwise validation, an entire system can be validated in some implementations.

5.4 Example SystemOnline

In some embodiments, SystemOnline is an online repository of DIOS-enabled software agents that allows distribution of agents across organizational boundaries. The agents can be either open or closed source and can be downloaded with cost or for free, depending on the desires of the agent developer.

5.5 Example Code Generation

The information model in some embodiments of the DIOS system is defined in the SystemBuilder and saved to a configuration file. The configuration describes various things like the names of the objects, as well as what data types they contain. A compiler may parse this configuration and generate code to implement the objects in various languages such as, for example, C++, C, Java, Python, etc.

The code generation is based on a common framework, which means that adding support for a new language is simply a matter of doing a small amount of customization and writing a template for the generated code (which is stored in an XML file). In one embodiment, the system works by having a common idea of what an object (or whatever piece of code is being generated) is, and what needs to be done to generate the code for it. Then, depending on which language it is generating, it opens the appropriate XML file which contains templates that can be used to generate the appropriate code. In this embodiment, the code generation tool is written in Python, making it platform independent.

In some implementations, for each object defined in the system, a message and an object file are created. The object file is a data container which holds the variables defined for the object and methods to access them (in languages where this makes sense). The message file contains functions which can serialize the data in the object to a binary format using the features of the language being generated. Next, for each agent an agent skeleton is generated. This skeleton file contains function stubs for things like a timing action, agent initialization and message callbacks. The skeleton file is implemented in an appropriate manner for each programming language (e.g., a class in object oriented languages, etc.). Associated model files are also generated for each agent. The model file is the interface to the messaging system, and contains the code which uses the DIOS client libraries to send and receive messages. It also allows the agent to access information from the DIOS information model in a manner that is appropriate to the specific programming language (e.g., getters and setters in C++, properties in python, etc.).

An advantage of using embodiments of code generation tools is that it increases programmers' productivity. This is due to decreases in the amount of time to add a new message, as well as decreases in the number of defects and bugs. For example, the code for each message is responsible for storing the message data as well as converting the data into a form suitable for sending over a communications link and vice versa. In addition, the code necessary to do this in C++ is different from the Java or Python code, and thus a separate implementation is typically used for each supported language. Writing all of this code by hand would take time and would likely result in bugs that would have to be found and fixed. With some embodiments of the code generation system, the implementation in each language is generated automatically and is much more likely to be bug free. The developer may describe what kind of information the object should carry, which they can do in the SystemBuilder. In one embodiment, the Information Model is used by a tool to generate CORBA, SOAP, and/or other standard compliant code in addition to DIOS code.

In some implementations, some or all of the above tools are used. Additional and/or different tools may be used.

6. DIOS Server and DIOS Client

In some implementations, embodiments of the DIOS systems and methods use a client-server architecture in which each client communicates only with a DIOS server. The DIOS servers communicate among each other to handle data distribution between the clients and servers in the system via a message distribution mechanism.

In some embodiments, communication from the client to the server and among servers occurs via an abstract communications layer which takes care of connection setup and data transfer. In some embodiments, data is sent through the communication layer as discrete datasets, with a guarantee that the same discrete datasets will be received by the remote end of the connection. A client process connects to a server on initialization. The communication layer supports any protocol through the use of protocol module abstractions. Each protocol module is responsible for auto-discovering servers if possible and setting up the connection as well as any protocol specific communication details.

Each server has a number of different application modules which perform various tasks. These modules include, but are not limited to, message distribution, process management, resource management, and the update service.

In one example embodiment, an example DIOS Server's data flow and delivery comprises some or all of the following functions or operations. The OS Abstraction Module receives data from an I/O interface and passes the information to the associated Protocol Module. The Protocol Module receives the data from the OS Abstraction Module, and determines the Connection Object (an internal representation) the data is associated with. The Protocol Module passes the data to the Connection Object via the object's receive ( ) function. The Connection Object calls doDecrypt ( ) on the data, to return the data to plaintext. The Connection Object then re-assembles the incoming data into proper data sets from the incoming stream. This may require more than one receive ( ) call in some embodiments.

In this example, when a full data set has been received, the Connection Object passes itself and the full data set to the Distribution Layer. The Distribution Layer passes the Connection Object and full data set to the Model Service. The Model Service receives the data and treats this is a request to do something. The request may result in various actions. The Model Service determines whether the senders are allowed to send via canAccess ( ) and if successful for "Allowed to Publish", the Model Service will populate a list of target Connection Objects. The Model Service determines whether the recipients are allowed to receive via canAccess ( ) for each of the listed Connection Objects, and if successful for "Allowed to Subscribe", passes the data to the Connection Objects. The Distribution Layer chooses which (0 or more) Connection Objects will be given the data, and calls canRoute ( ) on the Connection Objects and if successful for "Allowed to Route" (through the hardware and protocol), the Distribution Layer passes the data to the Connection Objects for sending. The Connection Object calls doEncrypt ( ) on the data, to convert the data to ciphertext. The Connection Object then passes the data to the associated Protocol Module. The Protocol Module sends data to a network interface via the appropriate OS Abstraction Module.

In other embodiments, data flow and delivery may be implemented differently than above. Additional and/or different features and/or techniques may be used. Functions and operations may be combined and/or separated.

6.1 Example Message Distribution

In certain embodiments, the messaging framework comprises four (which implemented as three or as another number) basic functions that embodiments of DIOS clients (agents) can perform: publishing messages, subscribing to messages, and sending and receiving messages. For an agent, each of these is a single function call to the messaging client library. A server process handles subscription management and message delivery. When the messaging system is operational, there is at least one server process running in the distributed system.

In some embodiments, when a client wishes to make a subscription, it sends a subscription request to the server via the communication layer. The server will keep track of that client's subscriptions and deliver any matching incoming messages to the client. The server will also subscribe to all of the servers it is connected to. They will then subscribe to all servers that they are connected to, and so on, so that the subscription is propagated throughout the system which allows messages to be delivered appropriately.

When sending a message, the client sends the data through the communication layer which handles delivering the data to the server. The server is responsible for determining who the subscribers are and using the communications layer to ensure the message is delivered.

The client is able to receive queued data from the server, which the communication layer reassembles into datasets. The datasets are passed to the distribution layer, which determines what type of data they are. If the dataset contains a message, it is passed to the messaging system, where it can be handled by the client. The client determines the message type, and it is then passed off to the appropriate handler in the generated information model.

In some embodiments, the message server maps subscription requests to connections via subscription keys. Messages are received (with a message key which is the type and group.) Message keys and subscription keys may be similar. The message server receives messages and uses the map to pass them to the client connections. Subscriptions are propagated to other message servers. There is some optimization in the system to avoid the equivalent of a broadcast storm, e.g., the message servers ignore messages or subscription requests that they have already received. There is also some local optimization to avoid this type of an issue (e.g., things going around in circles.)

In some embodiments, messages can also be marked as "to be saved" so that a copy of the message is distributed and stored in each server process. The message may be stored dynamically or persistently based on client specification.

Although embodiments of the Messaging Framework allows the various agent processes to communicate through message passing, in some implementations it may be limited to computers in the same DIOS system. Information can be configured for delivery to external systems using the System-Manager.

6.2 Example Update Service

To easily allow for updates to new versions of a system and to allow each component to be hot-swappable, some embodiments of the DIOS platform use a single process to deploy the entire system. In each system, a Control HIM is the only component that has specifically-configured information necessary for the specific application and specific vehicle it is running on. The Update Service is responsible for determining the software and firmware, and how these are configured, for every device in the DIOS system.

In some embodiments, the software/firmware for each HIM, both the processing boards and device boards, loads is available on via the Update Service such that any developer or customer is able to quickly update the system and run it across all production computer systems and robots by doing nothing more than turning them on.

Setting up a new processing device or input/output device (or replacing a broken unit) is a matter of plugging it in and connecting it to the network. Once it is turned on, the deployment system takes care of installing all applications necessary for operation. Embodiments of the DIOS Update Service allow for an easy way to reconfigure some or all DIOS-enabled components on a specific vehicle.

In some implementations, the process managers can be remotely told to change the set of agents running live to a new configuration and new agents can easily be placed on the processing boards via the same process above. Any agent can be hot-swapped out, added, or removed, without needing to affect the rest of the system and this can be done remotely or by addition of a new processing board that contains updated programming.

6.3 Example Control Service

In some implementations, the control service may utilize some or all of the following: Process Management, Resource Management, and Health Management. Additional and/or different management systems may also be used.

6.3.1 Example ProcessManager

In some embodiments, the process manager is responsible for starting and stopping processes either on a specific processing node or somewhere on the distributed system (the process manager can pick an appropriate node to start the process on). Once a process is started by the process manager it will continue running until somebody tells the process manager to stop the process. If the process dies or becomes deadlocked, the process manager will restart it. If a node dies, all of the processes that were running on that node will be redistributed in the system by the remaining process managers. The process manager also provides an interface to gain information about the running processes in the distributed system. In some configurations of a DIOS system, if a module fails it can be replaced transparently. Modules that are not failing, but merely being upgraded, can also be replaced.

Figure 6:
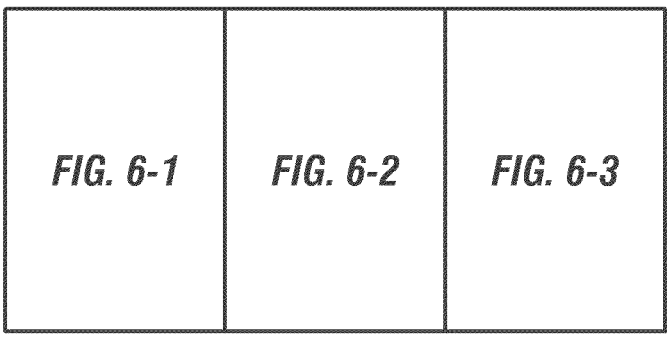
FIG. 6 schematically depicts an architecture view of an example of a core distributed system (both server and client) for the sample system shown in FIGS. 4 and 5.
Figures 1, 6:
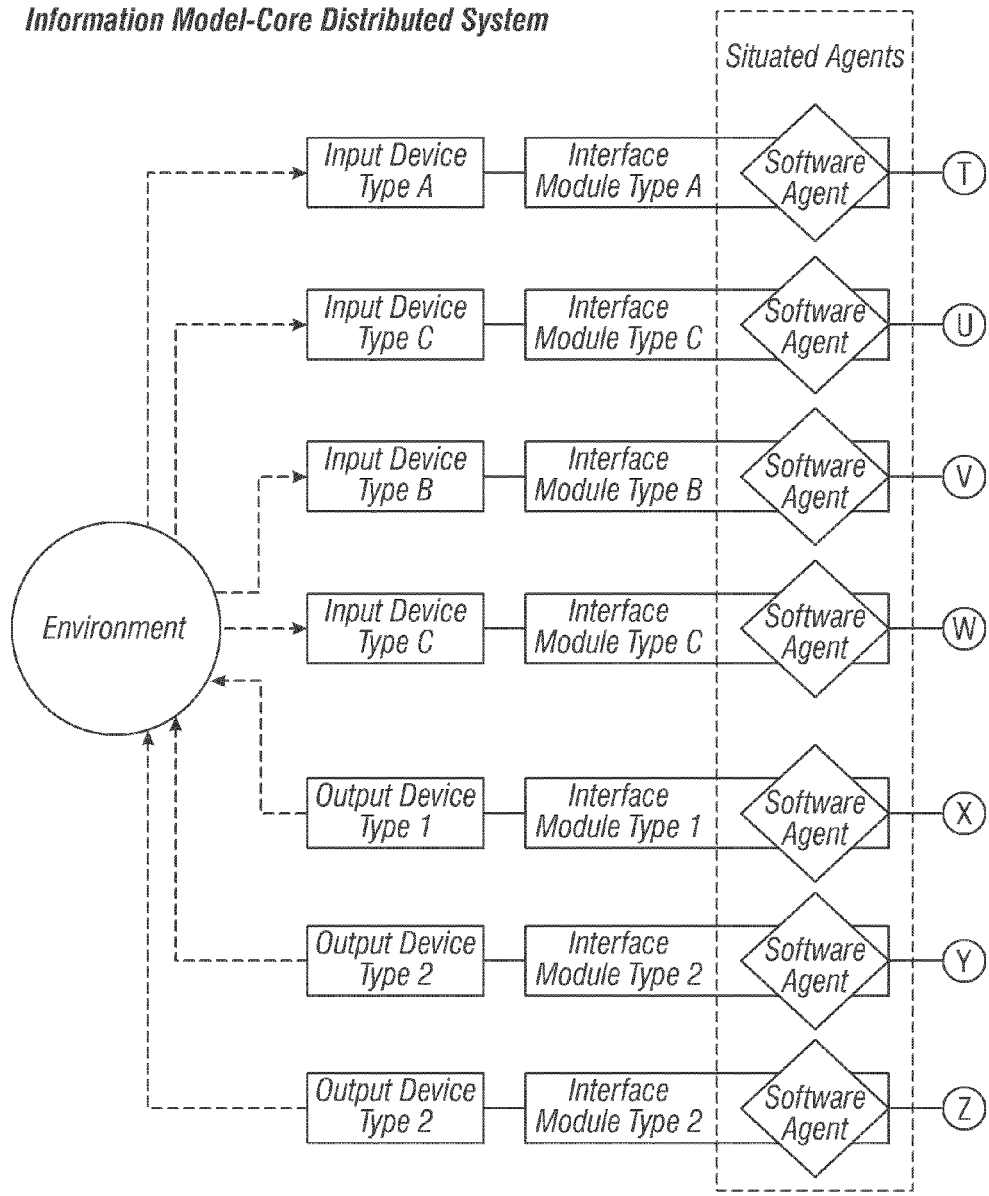
Figures 2, 6:
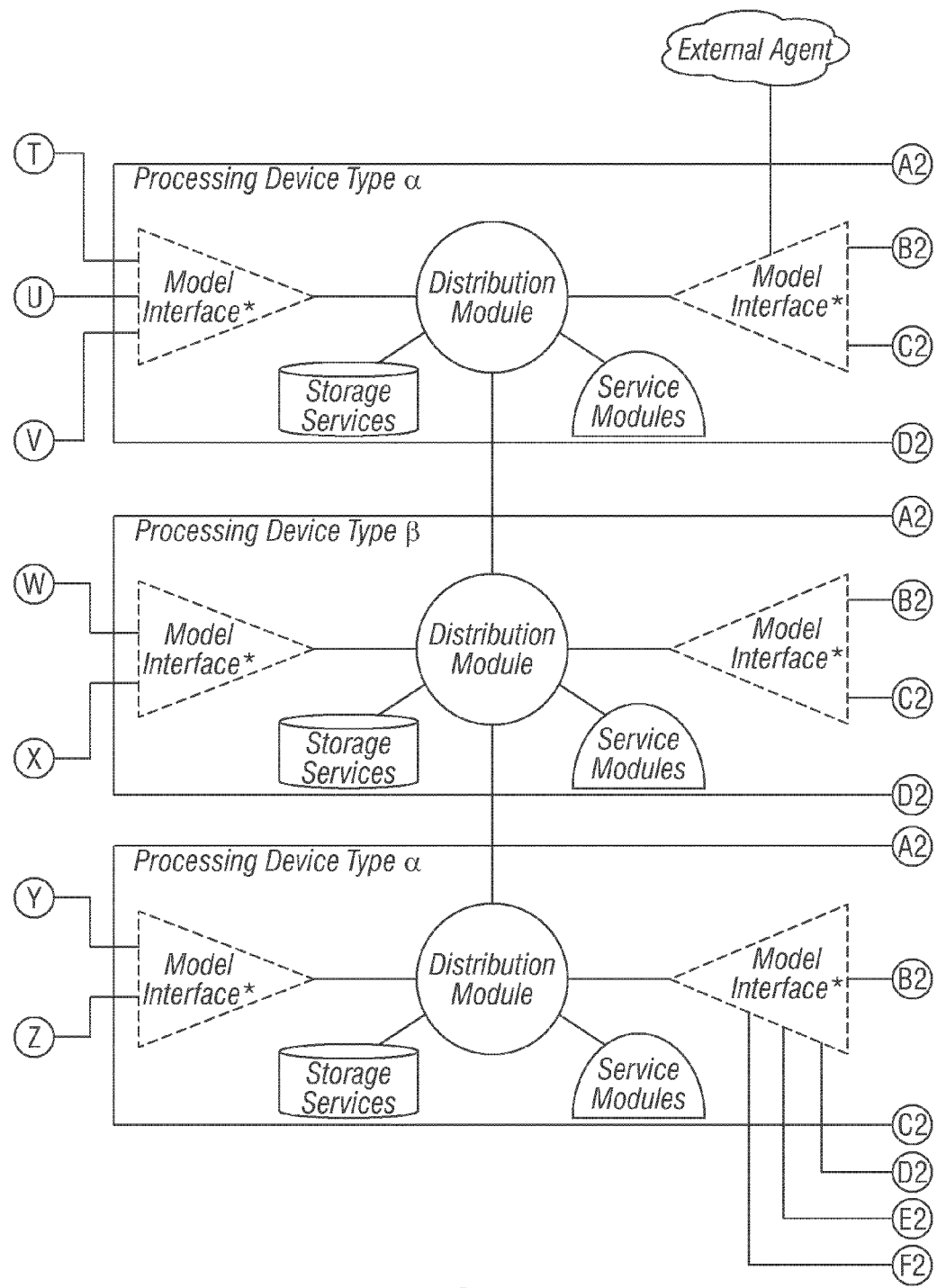
Figures 3, 6:
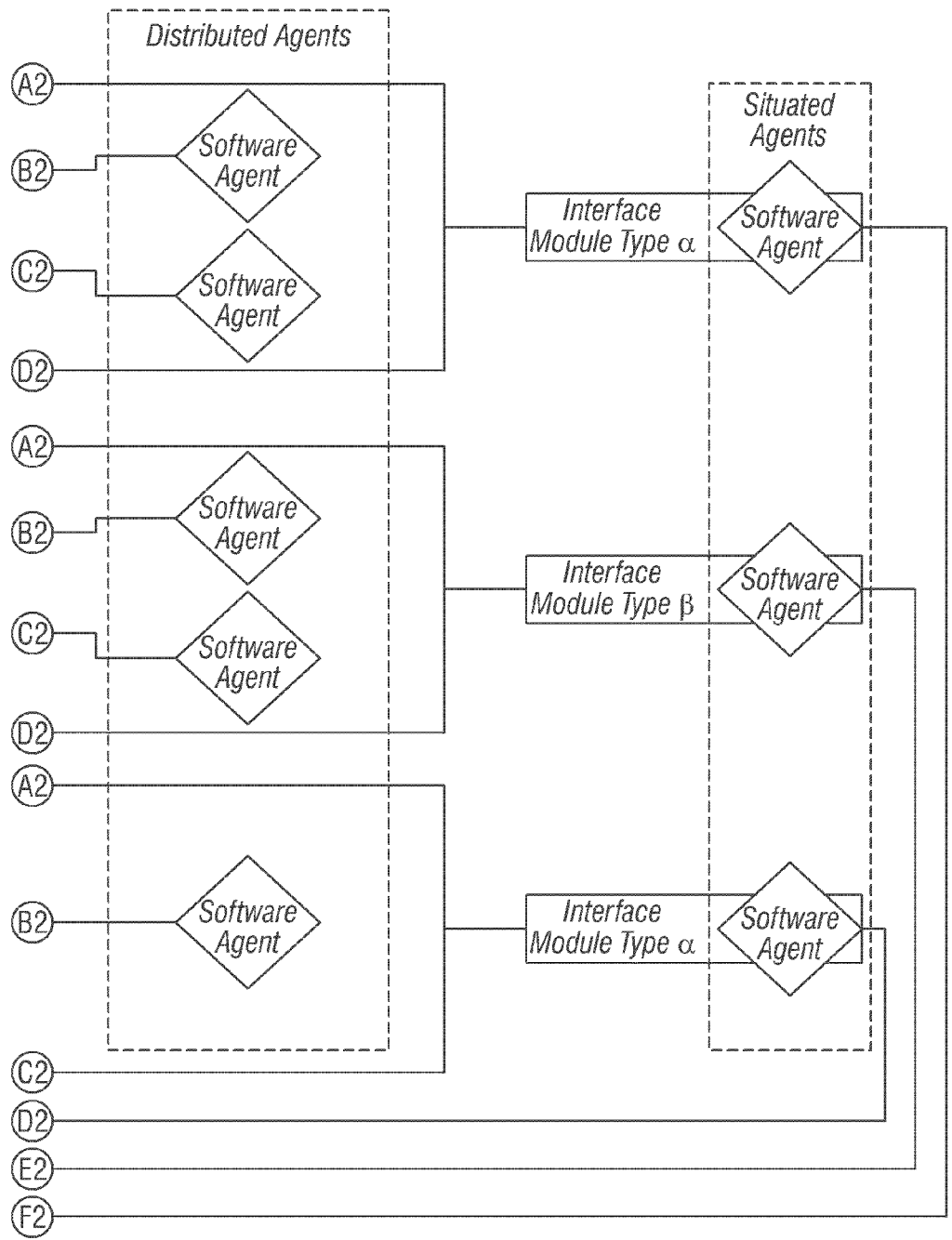

Prevention and recovery from error—both hardware and software—may be important for real-time applications. It may be advantageous if a piece of hardware can be accessed over a network so that any other piece of hardware can communicate with it and therefore any processing device can run processes that talk to the device. Embodiments of the system may detect when this hardware goes down. There is little change if a redundant device that can do the same task is available: if the needs of the system are maintained, then it adapts to the reduced redundancy, if not, then some higher-level decisions need to be made in order to ensure minimal operation. FIG. 6 schematically depicts two types of agents: situated agents that cannot be moved around because they are tied to specific devices (e.g. HIMs) and distributed agents that are able to exist on any suitable processing device. Extending this approach into software, if a process hangs or dies, it is restarted on the same node. If the process saved its state before it died by sending the state as a saved message, then when it restarts it can recover its previous state from the model service. In the example shown in FIG. 6, the Model Interface is shown with a dotted line and is depicted as a single entity residing between an agent's connection to its server's distribution module. In other embodiments, some or all of the agents may comprise a custom object that comprises a client that implements the agent's Model Interface. In such embodiments, FIG. 6 could be modified to illustrate a Model Interface drawn within the diamond-shaped block depicting the agent.

This example approach also allows for multiple versions of the same agent to be running as well as multiple copies to prepare for failures. By running multiple copies of an agent, when one goes down the system can simply give the "right to publish" to the running copy that was duplicating the work of the original but simply not publishing any of its decisions (copies can either run in a read-only mode to prevent duplicate messages or have a second copy only started when needed). By having multiple versions of the same agent registered with the Process Manager, if an agent keeps crashing because of some uncaught exception (perhaps some data that was not expected) or some overseeing agent sends complaints about the validity of the data, the Process Manager can switch to the alternate version of the agent without a disruption of service. By combining both approaches, the system gains high availability and resistance to both external physical failures and software failures.

In some implementations, because the Process Manager presents a single point of failure for the fault-recovery capabilities of the system, there are many levels of health checks in place. First, all process managers communicate with one another and auto discover in the same way as model servers. Second, each Process Manager has a "guardian" process manager that watches over and ensures the process manager is working properly and if not, restarts it—in turn the process manager also watches the guardian in the same manner. If both processes die before being able to restart the other, the process managers from external systems also watch each other and upon losing connection to a node's Process Manager, they will all attempt to restart the remote process.

Fault tolerance may include more than recovering from hardware and software failure, but also about the detection and correction of hardware or software error. It may be useful to provide that there are several agents who watch for certain conditions that highlight problems before they cause a failure and act to correct problems in predefined ways.

6.3.2 Example Resource Management

In some embodiments, the resource manager is responsible for providing monitoring and management on various resources (excluding processes) on nodes through on the distributed. Specific tasks may include monitoring and managing data flow through one or more networks and monitoring and managing power comprising of monitoring of voltages, current, and resistance and limiting of power flow including on and off for each connected hardware platform. On some HIMs, the monitoring and management functionality of data and power resources is implemented in specific hardware; on non-HIMs, a specific version of the resource manager offers the best capabilities available that the hardware supports. On some processors in particular, the resource manager keeps track of status information including: processor usage, process uptime, system uptime, system operating system version/details, and identifies resource conflicts.

6.3.3 Example Health Management

Even with redundant hardware, sometimes all of the redundant hardware devices fail or a single device fails that has no redundancy. If this is the case, in some embodiments, software can be used to get the same information from another device instead—for instance, if a laser scanner can be used for collision avoidance, but if it becomes unavailable and sonars point in the same direction of the laser scanner, the sonars can also be used. Whenever the optimal device is not available, the system will need to change to accommodate the less favorable device, such as, e.g., by slowing down or simply not acting in a way that can no longer be detected by available sensors. Health management may be implemented through the Process Management and Resource Management by an algorithm implemented as a special agent.

6.4 Example Model Service

Figure 7:
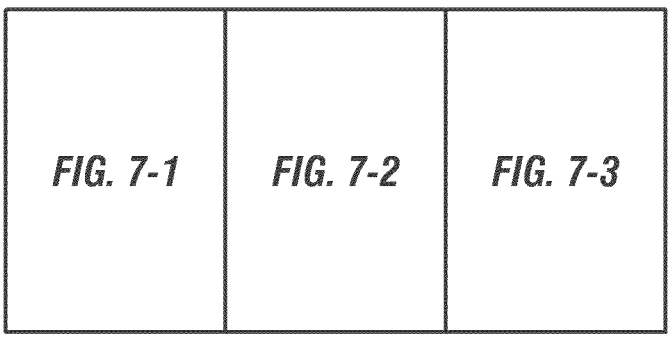
FIG. 7 schematically depicts a logical view of the sample system's expanded Information Model in which objects of interest (produced/requested) for each agent are associated. In this example, the associated objects in the Information Model form a customized software object for the agent.
Figures 1, 7:
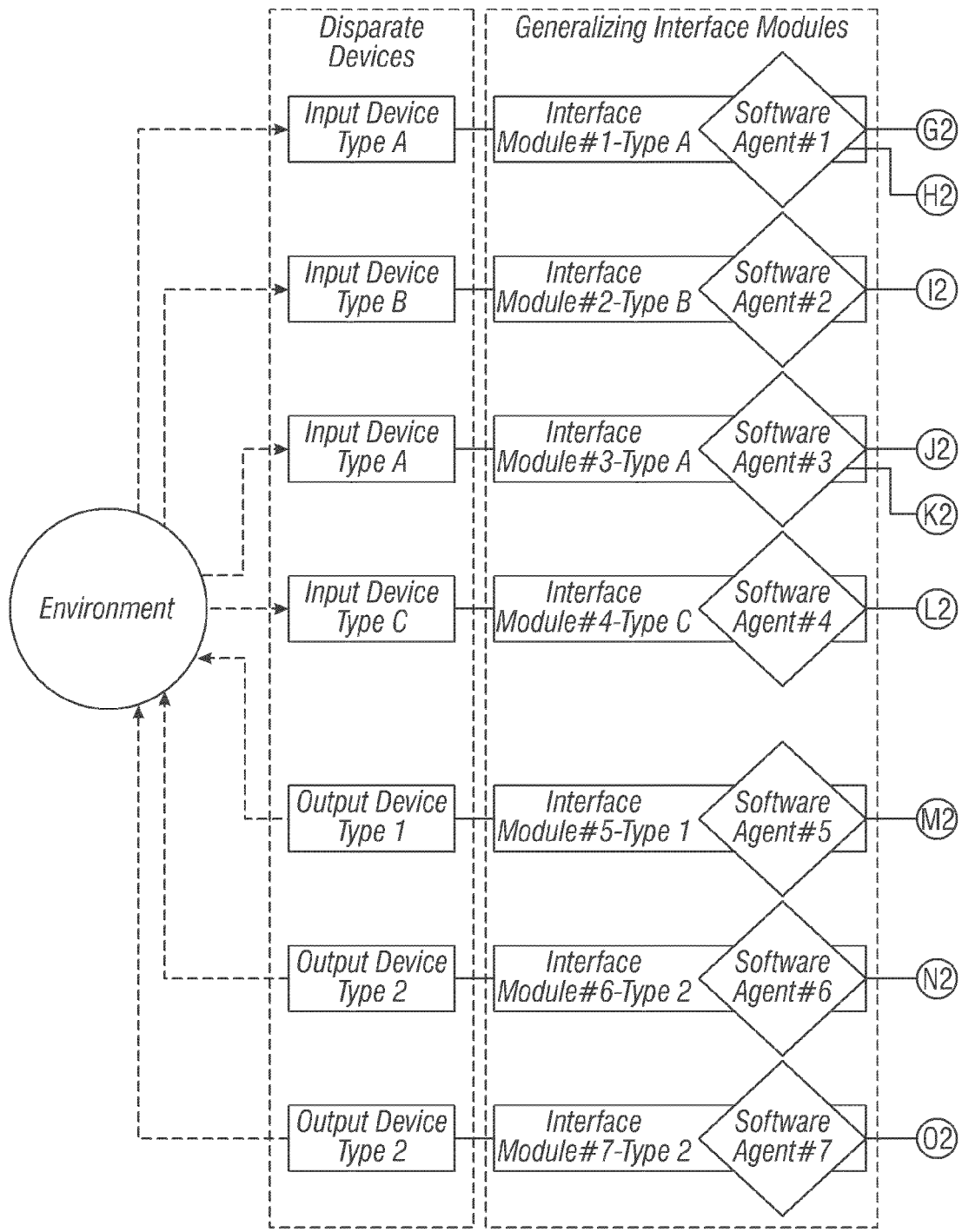
Figures 2, 7:
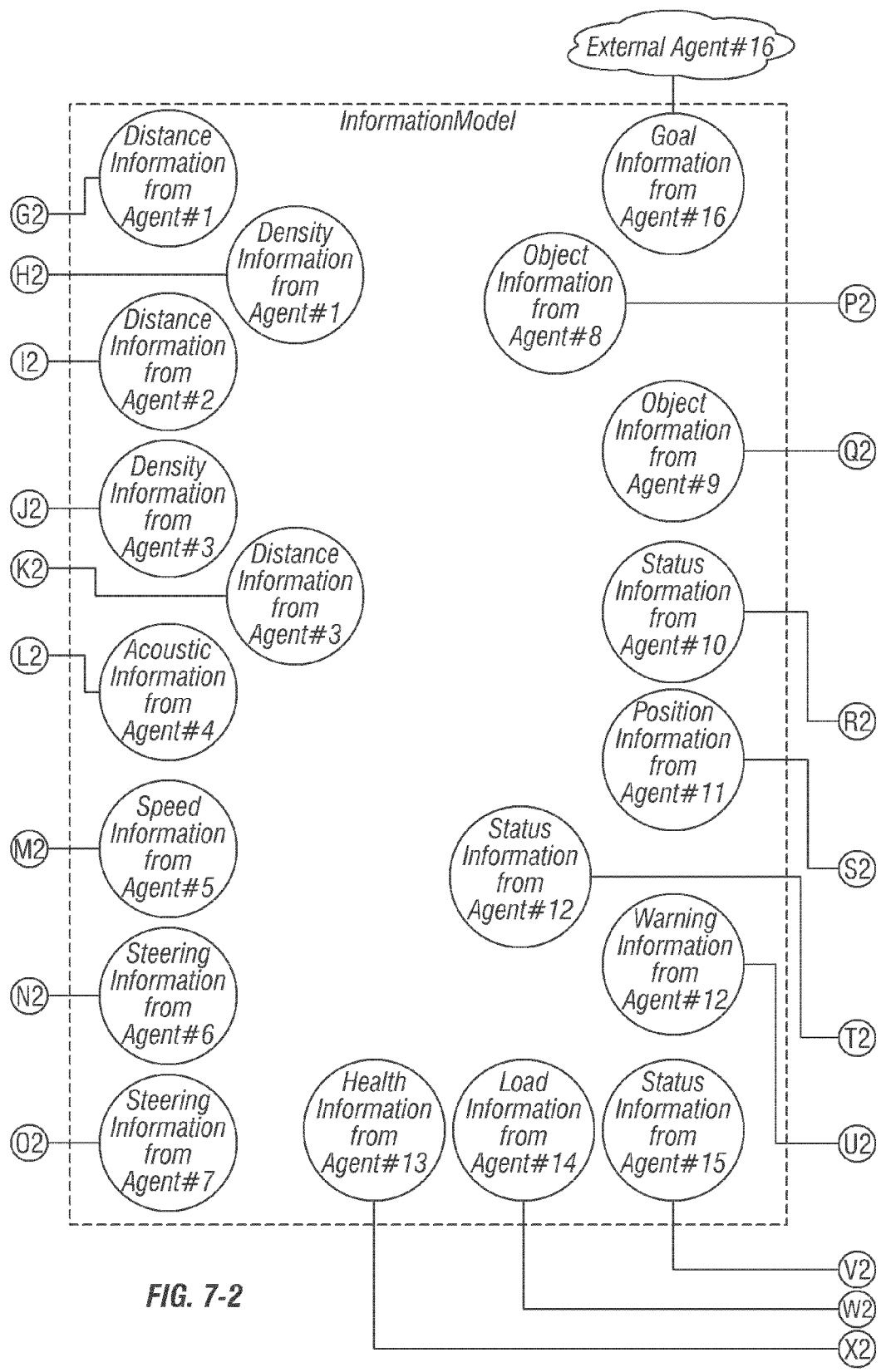
Figures 3, 7:
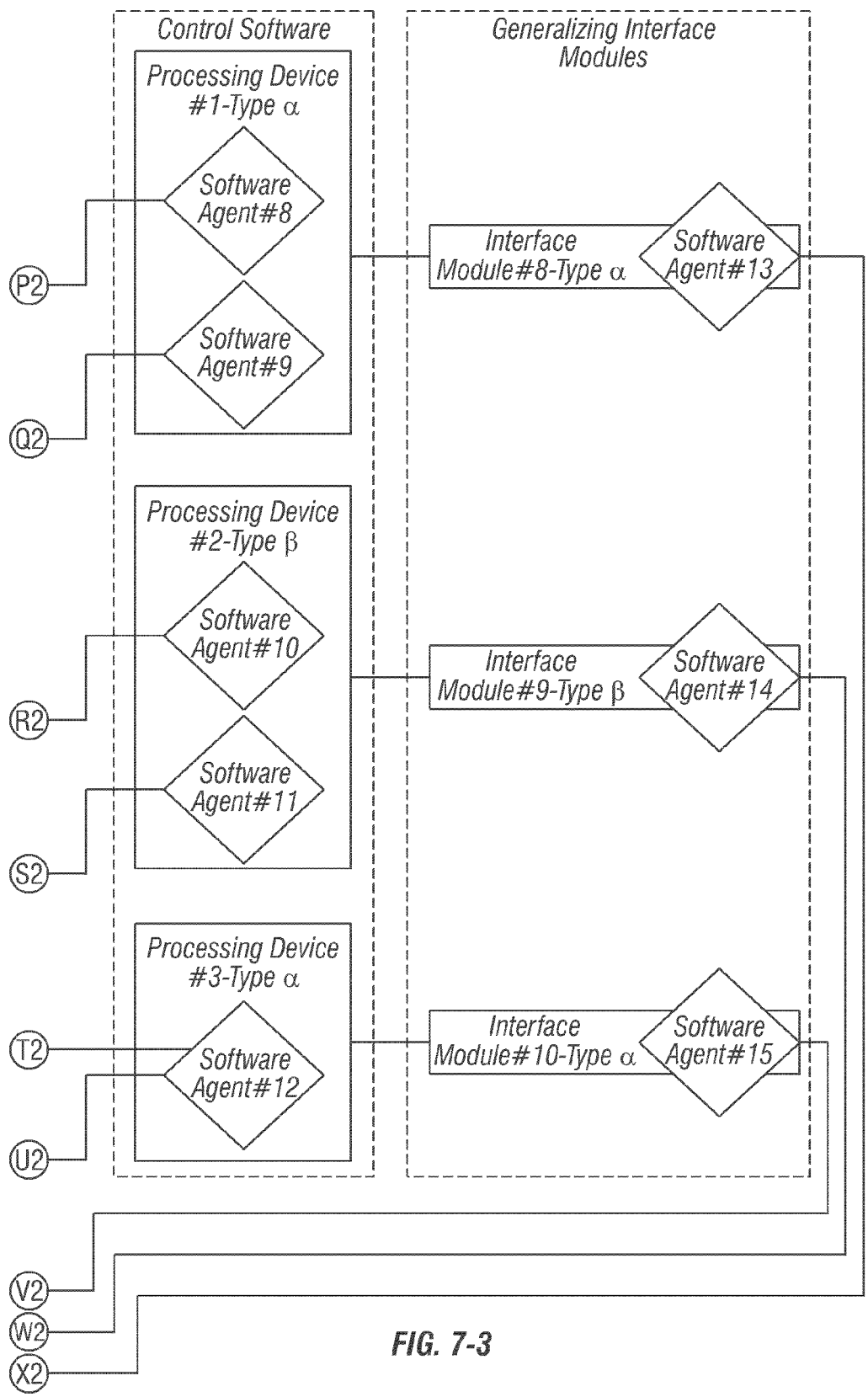

In some DIOS implementations, the information model of the Model Service provides a framework to organize a set of distributed objects. Each object is owned by an agent which publishes new state for the object. Subscribers have local copies of the state which serve as a proxy for the distributed object. The publisher asynchronously updates the state by sending out messages which are delivered to the subscribers. In various embodiments, the information model allows some or all of the following features. For example, the information model may support distributed systems, illusion (for programmers) that information exists in a centralized location, fault recovery so that if a node dies its messages are saved, and so the state is saved. Embodiments may permit the swap-out of components or addition of new components without modifying the existing system. Also, agents may be configured to have access to the parts of the information model that they need, and nothing else. In these embodiments, agents are not sent information that they do not care about, which may improve performance. Agents may communicate via the Information Model and may not need to poll a publishing agent. Agents may be distributed throughout the system to provide improved or optimal balance in terms of performance, etc. (see, e.g., FIGS. 7 and 8). In some embodiments, information models can be statically and/or dynamically configured Embodiments of the DIOS Server may employ a data-driven approach to deliver information from those who produce information (publish) to those who request it (subscribe). This process is invisible to the average user of some DIOS systems as this is abstracted behind embodiments of the DIOS Object (an implementation of the model service model interface), which is a custom software object generated for a specific agent (an agent is any self-contained component). For example, a DIOS Object may be interacted with simple setFoo ( ) and getFoo ( ) calls, doFoo ( ) remote (or local) method calls, and onFooChange ( ) Event handlers.

In some embodiments, the Model Service is configured to broker an information exchange between agents. In some embodiments, the Model Service is configured to establish a peer-to-peer connection between a plurality of agents having customized objects that broker the exchanges established by the Model Service.

6.5 Security Service

In some embodiments, a security Service is a module that is responsible for authorizing which Information Model objects go from client to client, client to server, and server to server in the DIOS System. The various layers of the DIOS Server may ask specific questions of the Security Service before information can be sent from one entity to another entity. The Model Service may invoke the canAccess ( )method on the Security Service and relies on the Security Service to determine if this request is allowed. The Distribution Layer invokes canRoute ( ) to determine if the hardware and protocol are capable of transmitting the data. The Connection Object invokes doEncrypt ( ) and doDecrypt ( ) to encrypt or decrypt the data respectively. In some such embodiments, the Security Service makes its determinations using the information defined in a Server Security Object and the Client Security Objects; both are similar to a DIOS Object.

Several possible methods of enforcing the security of the system can be used. For example, in some implementations, objectives of the security scheme in one possible order of priority may include preventing access to the processing boards and the network as a whole by unauthorized users, preventing malicious third-parties (who are able to gain access to the network) from sending messages which could disrupt the operation of the system, allowing an agent to discover which agent or HIM sent a message with some degree of confidence (e.g., preventing spoofing), and preventing an outside listener from eavesdropping on the messages being sent. Additional and/or different security objectives may be included in other embodiments. Also, the priority of the security model may be different in different embodiments.

7. Example System's Information Model Representation

The sample system of FIGS. 4 and 5 is used as an example to show some of the more advanced capabilities afforded by certain embodiments of the Information Model. Some, all, or none of these advanced capabilities are used in various embodiments of the DIOS systems and methods.

Figure 16:
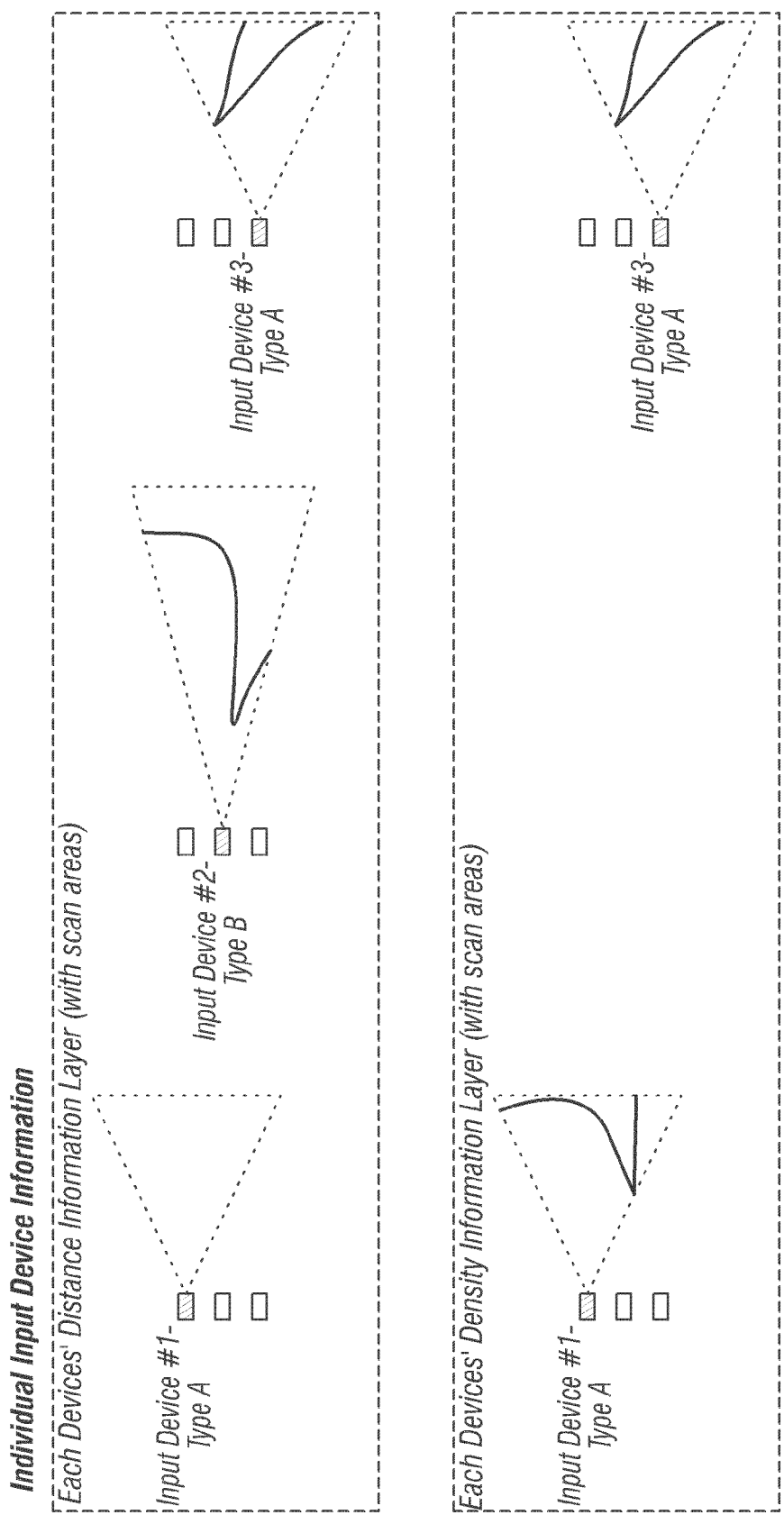
FIG. 16 schematically depicts one embodiment of the first sample system's input devices' sensed information.

In the example in FIG. 16, three input devices and the information that they produce are schematically depicted. Information about the external world is stored based on the physical location of the information provided. Device #1, and Device #3 are of a theoretical type A that provide both distance and density information—two different information types—and Device #2 is of theoretical type B that provides only distance information. As all three devices produce distance information, comparison of this information (note that the line drawn is a merely a representation of the information provided by the devices) can be made and shows that the devices measure different 'opinions' (information) about the distances that they sense; the major discrepancy is due to the offset between the devices—Device #2 is physically centered in-between Device #1 and #3. In the second half of FIG. 16, it can be seen that the information stored about the density of the detected objects is incident on the distance information provided by the same sensor. Although different types of information may be radically different, the property still holds that information is stored in a physical-object-centric manner such that if a point (or area) in space is specified, all information available about the point (or area) is stored at the same location as the detectable reference.

Figure 17:
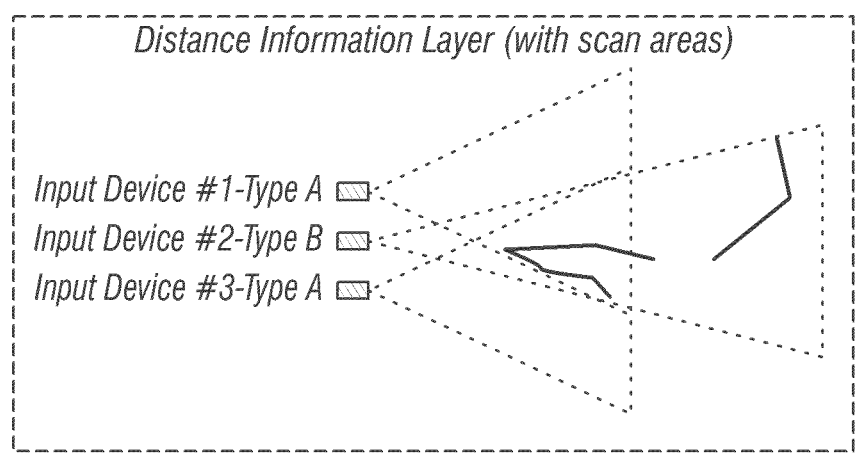
FIG. 17 schematically depicts an example of the first sample system's input information from various devices in a physical layout as it is represented in a layer in an embodiment of an Information Model.
Figure 17:
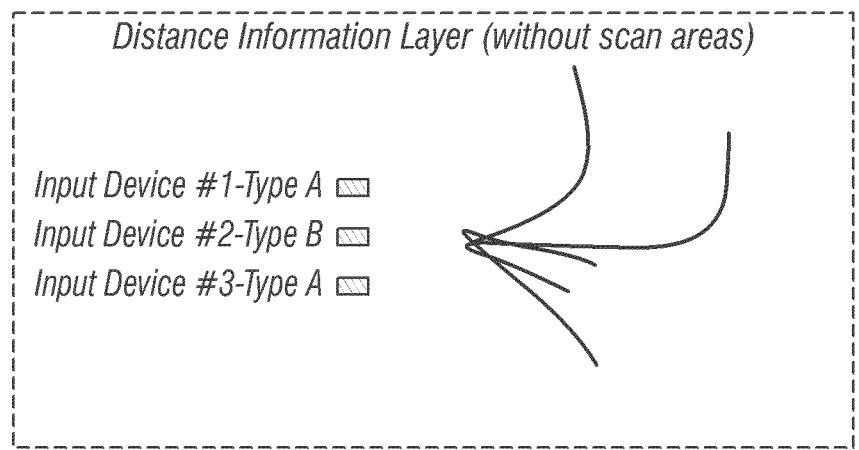

FIG. 17 shows the information in FIG. 16 combined into a single diagram, with the information of 16 corrected for the origin into a single coordinate system. As more information is available about a certain physical space, this information is overlapped (three sources overlap in FIG. 20).

Figure 18:
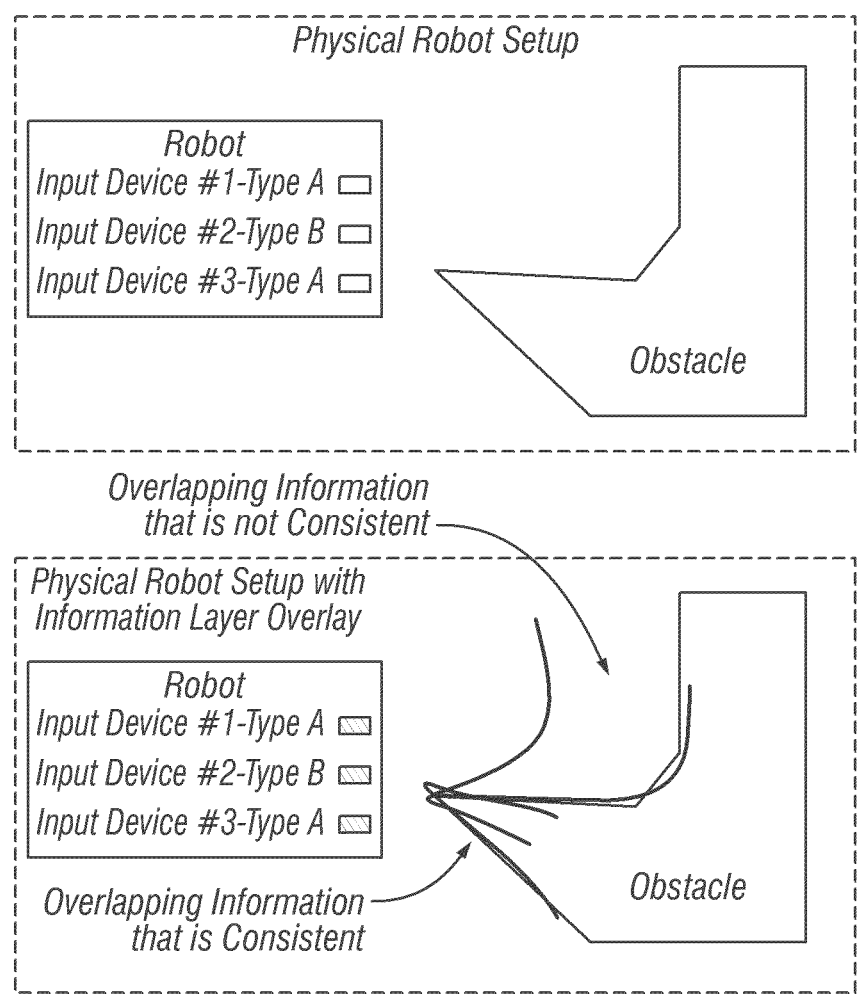
FIG. 18 schematically depicts the first sample system's input information in comparison to an object in an environment the input devices are sensing.

FIG. 18 schematically illustrates a mapping between the vehicle and object in physical space to the information provided by the input devices; note that this standard information representation is only a manner by which to encapsulate the information and is not a processor. In FIG. 18, there are two parts of the information highlighted: one that is consistent between all available devices and another that is not consistent. Regardless of its accuracy, the information of a specific type from all available sources, organized by the physical counterpart, is combined in an Information Model layer.

Figure 19:
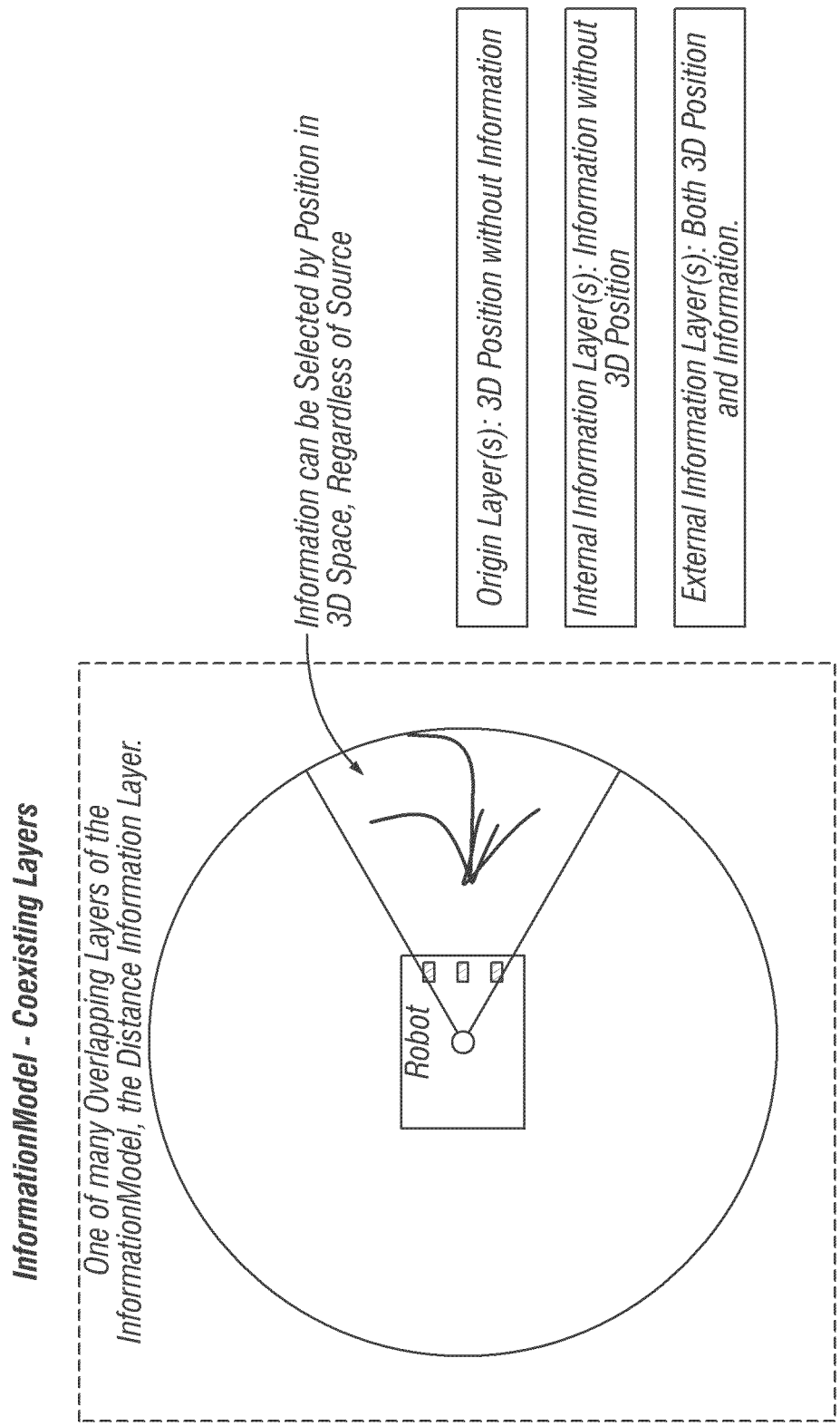
FIG. 19 schematically depicts an illustrative top view of the first sample system's information represented in a single layer (sphere) within the Information Model.

FIG. 19 provides another possible interpretation of the Information Model layer(s) representation. In this example, information of a specific type is organized centric to the vehicle and can be transformed to a global reference. An agent can request information of a specific type in a specific space, and all sources of information that matches that search will be returned. There exist many different layers that overlap and coexist over the same physical mapping—one for each type of information. By selecting a single type of information (or combination thereof), a view of all information of said type can be returned in a manner similar to selecting only the red or green or blue components (or combination thereof) in a photograph: a partial view of the complete picture is returned, and when all layers are considered the entire picture is returned.

Not all information is necessarily physically-dependent. For example, in some embodiments, there are three types of layers: Origin Layer(s) which have a position but no information, Internal Information Layer(s) that have information but no position, and External Information Layer(s) that have both position and information. The Origin Layer(s) serves as a reference point for the other layers that build upon the reference(s); the Internal Information layer(s) stores information such as agents' status, goals, warnings, etc; the External Information layer(s) store attributes about the external environment.

In this example, the Information Model allows for a given layer—a type of information—to have overlapping information that may or may not agree. With each element of information (information object) in a given layer, there is a trust value associated with the element. An agent may use this trust information as a means by which to discriminate between the information discrepancies or another trust decision regarding information included in the information object.

7.1 Example Information in a Data Model:

Consider a laser measurement scanner (LMS) that uses a single line scan and returns distances at each degree for 181 measurements. If the cost for an LMS was prohibitive, a number of sonar sensors could be used instead and a HIM developed that produced the same information at the LMS; the sonar HIM could provide a 181 measurements and simply populate the areas that the sonar detects with the same value and perhaps even use some intelligence and extrapolate a greater number of data points than sonars produce by considering overlaps based on detection area. However, this seems a bit contrived and does not scale well as it depends on converting each sensor to an agree-upon standard.

If, instead, each sensor and HIM could produce the full spectrum of capabilities and still be used by software that has never seen the sensor before, then the information that the sonars can produce that the LMS cannot would not be lost. The suggested method for this is to define features that sensors can detect and have software agents listen to all the features available that meet their need. In the current example, both the LMS and sonars offer distances. The LMS also offers reflectance value and the sonars also offer reflectance power. The LMS only scans a line while the sonars detect a cone. By creating multiple layers for a single point in space, the available information of a given sensor can be fully described and by being vigilant in ensuring that the same information is classified as the same feature, an existing system looking for a feature in a given spatial area can use the information regardless of the device.

Using this physically-bound feature map, an agent could request information features of distances that occur in the front half of the tank. Now, the agent receives a list of 3D mappings of the data various sensors have detected in the environment. As the agent only cares about distances, it doesn't matter if a given sensor provides one line in the area or a cone: the agent cares about any and all distances. The physical area request could be further refined to, for instance, only return distance data in front of a left wheel.

In some implementations, a physically bound feature map from a sensor may comprise, for example, the feature, the set of data points that comprise the measurement, the position and orientation of each data point relative to the sensor, and errors for each, the time of each measurement, and error, and the position and orientation of the sensor (relative to the robot). Additional and/or different features may be included in other embodiments.

Embodiments of the feature search may have limitations in some cases, such that if a new sensor is added that detects a new feature that the system does not use, it may be challenging to integrate this new type of information for use by existing agents without an entity (agent) that "transforms" the information using some sort of calculation method. Generally, new features that are not known at design time are not used.

Figure 20:
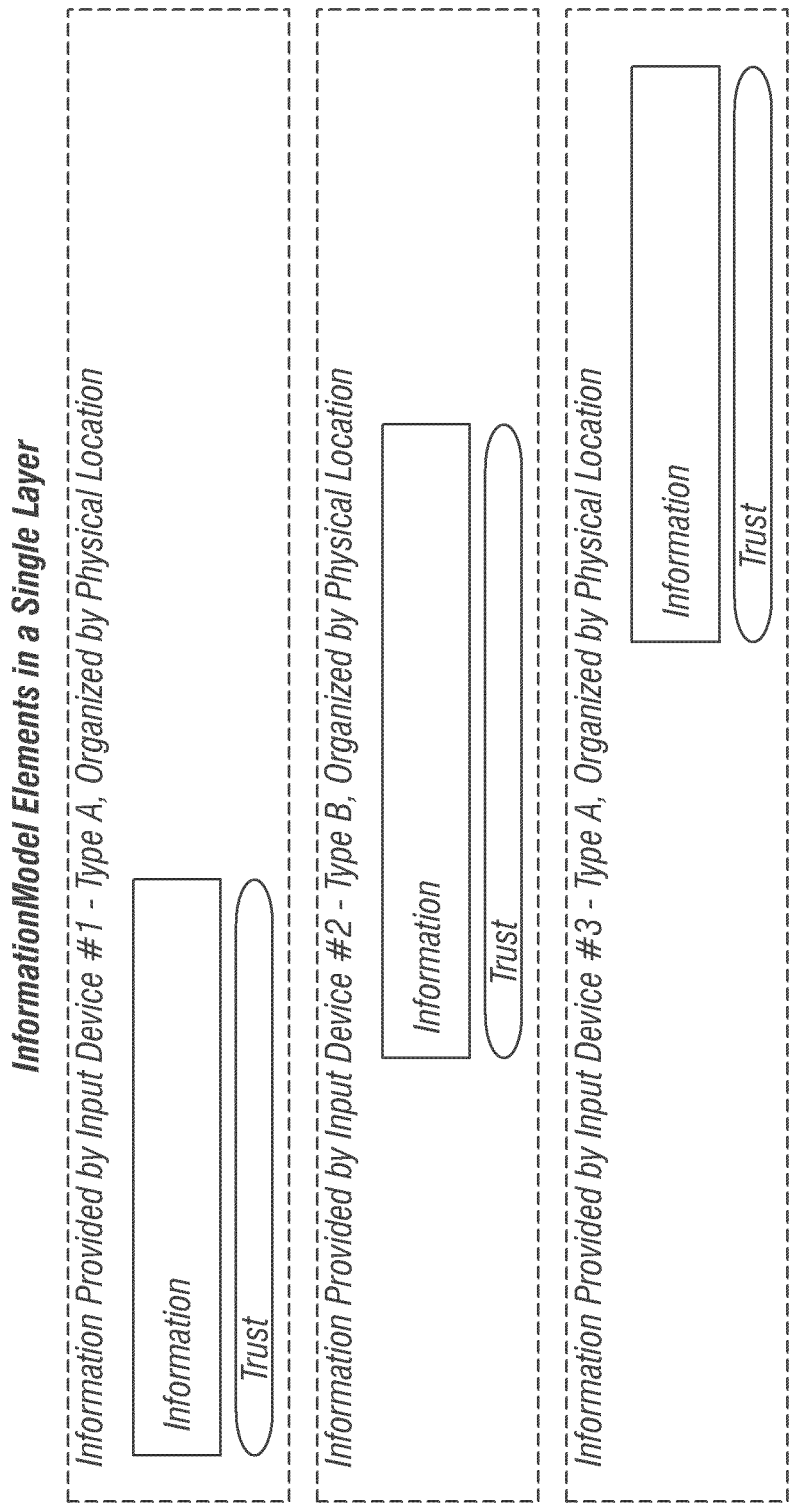
FIG. 20 schematically depicts an illustration of the first sample system's information represented in overlapping layers (spheres) within the Information model, and how a second layer (e.g., trust) is coincident on the first layer (e.g., information).

One possible benefit of feature search is in the speed of implementation—once a HIM is developed, the agents using information supplied by the HIM do not need to be changed as the data is "ignorant" not only of the specific device that sent it but also the type of said device. Redundancy becomes trivial: to protect against the failure of a sensor, one need only add a duplicate of it or another sensor that detects the same feature—perhaps in a different way to protect against sensor-specific blinding. By attaching various sensors around the vehicle with different sensing capabilities, different strengths and weaknesses, redundancy by duplication and specialization, a multi-layered feature map is created that surrounds the vehicle (an example is shown in FIG. 20). By adding a new sensor, existing feature layers are extended and a rich multi-layer feature net is created around the vehicle that is independent from a source in any manner except that it is populated by some source.

The word module used herein refers to logic embodied in hardware or firmware, or to a collection of software instructions, possibly having entry and exit points, written in a programming language, such as, for example, C or C++. A software module may be compiled and linked into an executable program, installed in a dynamically linked library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Moreover, although in some embodiments a module may be separately compiled, in other embodiments a module may represent a subset of instructions of a separately compiled program, and may not have an interface available to other logical program units. The modules may be stored or implemented in any type of computer-readable medium or other computer storage device. For example, a computer-readable medium may include, but is not limited to, volatile memory, nonvolatile memory, magnetic storage, optical storage, and electronic storage. A processor may include executable instructions to carry out the functions of one or more modules. All of the methods and processes described herein may be embodied in, and partially and/or fully automated via, software code modules executed by one or more general purpose computers or processors. The software code modules may be stored in any type of computer-readable medium or other computer storage device. Some or all of the methods and processes may alternatively be embodied in specialized computer hardware. Also, functions and features may be combined differently than described herein.

Embodiments of the disclosed systems and methods may be used and/or implemented with local and/or remote devices, components, and/or modules. The term "remote" may include devices, components, and/or modules not stored locally, for example, not accessible via a local bus. Thus, a remote device may include a device which is physically located in the same room and connected via a device such as a switch or a local area network. In other situations, a remote device may also be located in a separate geographic area, such as, for example, in a different location, country, and so forth.

Reference throughout this specification to "some embodiments" or "an embodiment" means that a particular feature, structure or characteristic described in connection with the embodiment is included in at least some embodiments. Thus, appearances of the phrases "in some embodiments" or "in an embodiment" in various places throughout this specification are not necessarily all referring to the same embodiment and may refer to one or more of the same or different embodiments. Furthermore, the particular features, structures or characteristics may be combined in any suitable manner in one or more embodiments, as would be apparent to one of ordinary skill in the art from this disclosure. As used in this application, the terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Additionally, although described in the illustrative context of certain preferred embodiments and examples, it will be understood by those skilled in the art that the disclosure extends beyond the specifically described embodiments to other alternative embodiments and/or uses and obvious modifications and equivalents. Thus, it is intended that the scope of the claims which follow should not be limited by the particular embodiments described above.

What is claimed is:

1. A distributed robotic control system comprising:
one or more processors each configured to execute at least one agent stored in a non-transitory computer storage medium, the at least one agent comprising an implementation of a behavior based at least in part on an information representation of data available through access associations between information representations of other agents, one or more agents configured to exchange information through an information model comprising a hierarchy of information objects, wherein each agent is associated with a subset of the information objects in the hierarchy;
an input device configured to receive an input signal from an environment in which a robot operates and, in response to the received input signal, to provide input data;
wherein one of the one or more processors comprises a first client processor configured to receive the input data, the first client processor executing a first input agent configured to provide a first input information representation of the input data;
wherein one of the one or more processors comprises a first server processor configured to communicate with the agents executed on the one or more processors, the first server processor comprising:
a distribution module for communicating with access associations of the agents and distribution modules of other processors;

a model service module configured to synchronize information exchange between each of the one or more agents' access associations and between the one or more processors; and a first control agent configured to provide a control information representation based at least in part on the first input information representation;

an output device configured to output an output signal for causing an action by the robot in the environment, the output signal generated in response to output data;

wherein one of the one or more processors comprises a second client processor comprising a first output agent configured to receive the control information representation and to provide the output data to the output device.

2. The distributed robotic control system of claim 1, wherein an agent comprises an interface providing access to the information model, the interface comprising a customized software object that includes a client configured to communicate to a server.

3. The distributed robotic control system of claim 1, wherein the control agent is configured to be capable of being executed on processors other than the first server processor.

4. The distributed robotic control system of claim 1, wherein the first input agent is configured to be executed on the first client processor and not on other processors or the first output agent is configured to be executed on the second client processor and not on other processors.

5. The distributed robotic control system of claim 1, wherein the first input information representation provided by the first input agent comprises minimally-processed input data and a processor other than the first client processor is configured to execute a second input agent that receives the input information and further processes the minimally-processed input data.

6. The distributed robotic control system of claim 1, wherein the model service module is configured to broker an information exchange between agents or is configured to establish a peer-to-peer connection between a plurality of agents having customized objects that broker the information exchange established by the model service.

7. The distributed robotic control system of claim 1, wherein the first control agent comprises a plurality of control agents, the plurality of control agents capable of being executed on processors other than the first server processor.

8. The distributed robotic control system of claim 1, wherein the first server processor is configured to execute a second input agent and to receive the input data from the input device, the second input agent configured to provide a second input information representation.

9. The robotic control system of claim 8, where the first input information representation and the second input information representation are the same.

10. The distributed robotic control system of claim 1, wherein the first server processor is configured to execute a second output agent that is configured to receive the control information representation from the control agent and to provide the output data to the output device.

11. The distributed robotic control system of claim 1, wherein the input device or the output device comprises a software system.

12. The distributed robotic control system of claim 11, wherein the software system comprises a legacy software system, a virtual software system, or a simulated software system.

13. The distributed robotic control system of claim 1, wherein at least one of the first client processor and the second client processor comprises a hardware platform that comprises a standard board and a device-specific device I/O board.

14. The distributed robotic control system of claim 13, wherein the standard board comprises a control partition, a communication partition, and a power partition,
the control partition comprising a processor to host one or more agents, a data and memory bus, and is configured to mediate communication and power flow between the communication partition, the power partition, and the device I/O board;
the communication partition comprising hardware for supporting connections for monitoring and management of data flow through one or more networks and for bridging control of the hardware to the control partition;
the power partition comprising hardware for supporting management and transfer of one or more power sources to the device I/O board, wherein supporting management and transfer comprises monitoring voltage, current, and resistance, limiting power flow including on/off and bridging control of the hardware to the control partition; and
wherein the device I/O board comprises device-specific power and communication physical connectors and supporting hardware for device-specific communication protocol and power source requirements.

15. The distributed robotic control system of claim 14, wherein the hardware platform further comprises a universal connector comprising a physical connector having power lines for the power partition and communication lines for the communication partition.

16. The distributed robotic control system of claim 14, wherein the standard board and the device I/O board are implemented as the same board.

17. The distributed robotic control system of claim 14, wherein the device I/O board is implemented as a separate expansion board from the standard board.

18. The distributed robotic control system of claim 14, wherein the standard board comprises a universal connection device comprising hardware circuitry and software control to convert upstream power and data sources to meet communication and power needs of the standard board independent of upstream power and data sources.

19. The distributed robotic control system of claim 14, wherein the standard board comprises a universal connection device comprising hardware circuitry and software control to monitor and manage data flow through one or more networks and to monitor and manage power comprising monitoring voltages, current, and resistance and limiting power flow including on and off for each connected hardware platform.

20. The distributed robotic control system of claim 13, wherein the first client processor comprises a first hardware platform comprising a first standard board and a first device-specific device I/O board, the second client processor comprises a second hardware platform comprising a second standard board and a second device-specific device I/O board, wherein the first standard board and the second standard board are implemented as the same board and wherein the first device I/O board is implemented to be specific to the input device and the second device I/O board is implemented to be specific to the output device.

* * * * *

UNITED STATES PATENT AND TRADEMARK OFFICE
CERTIFICATE OF CORRECTION

PATENT NO.        : 8,521,359 B1
APPLICATION NO.   : 13/295993
DATED             : August 27, 2013
INVENTOR(S)       : Trytten et al.

Page 1 of 1

It is certified that error appears in the above-identified patent and that said Letters Patent is hereby corrected as shown below:

In the Specification

Column 3 line 38, Change "etc)." to --etc.)--.

Column 16 line 6, Change "source" to --source.--.

Column 23 line 3, Change "useless" to --useless.--.

Column 30 lines 29-30, Change "configured" to --configured.--.

In the Claims

Column 35 line 50, In Claim 9, change "robotic" to --distributed robotic--.

Signed and Sealed this
Thirtieth Day of September, 2014

Michelle K. Lee
*Deputy Director of the United States Patent and Trademark Office*